United States Patent [19]

Hogg et al.

[11] 4,281,216

[45] Jul. 28, 1981

[54] KEY MANAGEMENT FOR ENCRYPTION/DECRYPTION SYSTEMS

[75] Inventors: Gerald J. Hogg, Tempe; Robert A. Newman; Robert F. Pfeifer, both of Phoenix, all of Ariz.

[73] Assignee: Motorola Inc., Schaumburg, Ill.

[21] Appl. No.: 25,951

[22] Filed: Apr. 2, 1979

[51] Int. Cl.³ .............................................. H04L 9/00
[52] U.S. Cl. .............................. 178/22.08; 340/149 R; 178/22.09
[58] Field of Search ............... 178/22; 375/2; 364/717

[56] References Cited

U.S. PATENT DOCUMENTS

| | | | |
|---|---|---|---|
| 3,790,768 | 2/1974 | Chevalier et al. | 364/717 |
| 4,120,030 | 10/1978 | Johnstone | 178/22 |
| 4,151,404 | 4/1979 | Harrington et al. | 364/717 |
| 4,182,933 | 1/1980 | Rosenblum | 178/22 |
| 4,193,131 | 3/1980 | Lennon et al. | 375/2 |

OTHER PUBLICATIONS

*Conference on Computer Security and the Data Encryption Standard,* Natural Bureau of Standard, Preprints, Feb. 15, 1977.
*Random Number Generator,* Jensen, Technical Digest No. 39, Western Electric, Jul. 1975, pp. 21–22.
*A Bibliography on Random Number Generation,* Nance et al., Computing Reviews, Oct. 1972, pp. 495–508.

Primary Examiner—Howard A. Birmiel
Attorney, Agent, or Firm—M. David Shapiro; Eugene A. Parsons

[57] ABSTRACT

In a data encryption/decryption system providing for security of data communications channels, a sub-system for generating, transporting encryption/decryption keys and for introducing those keys into the system while at the same time providing a high level of security for the keys and, hence, the encryption/decryption system.

12 Claims, 106 Drawing Figures

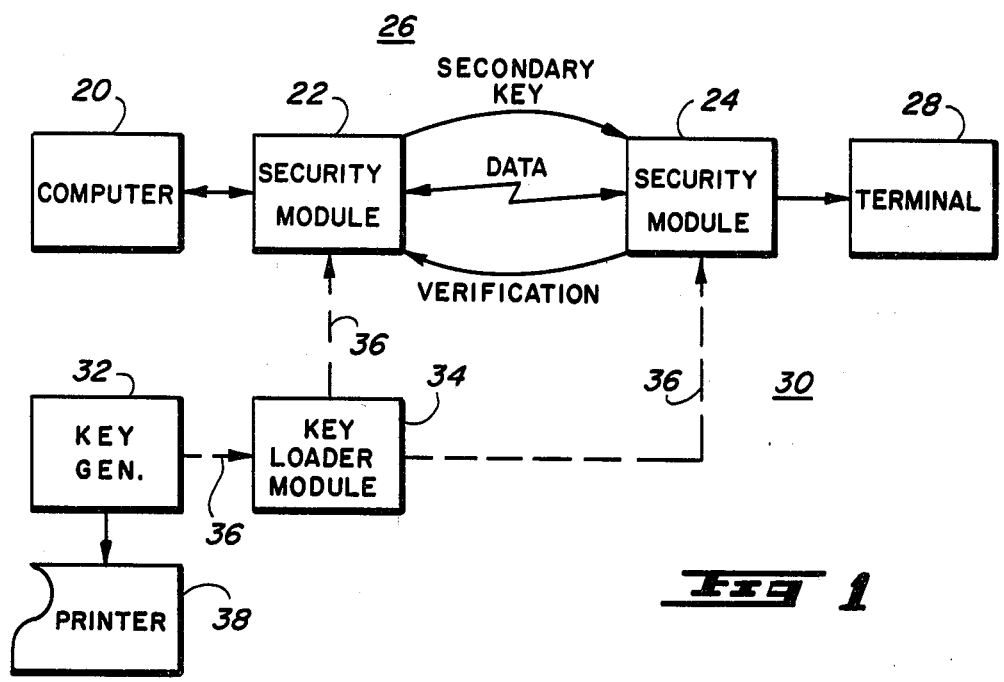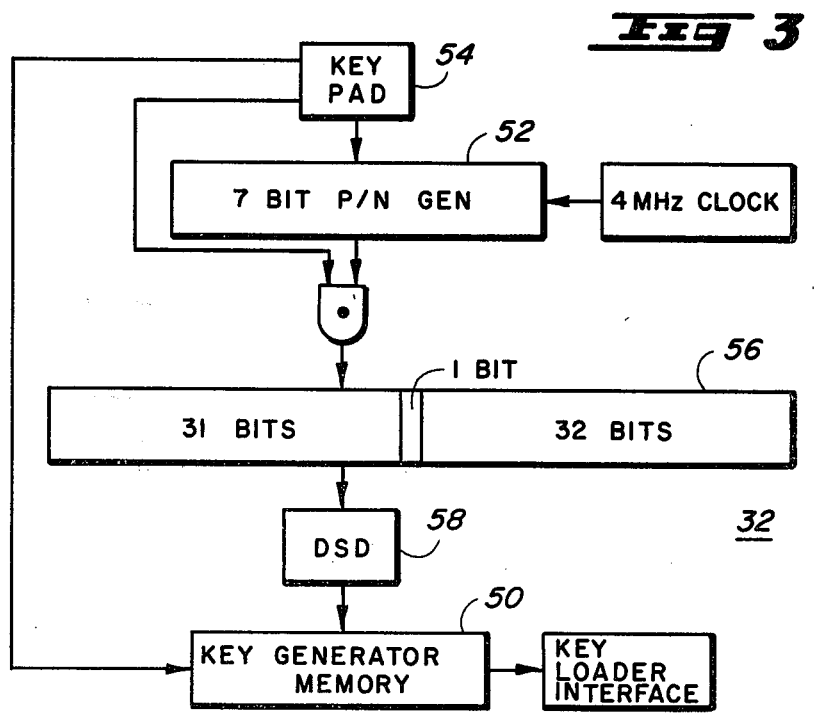

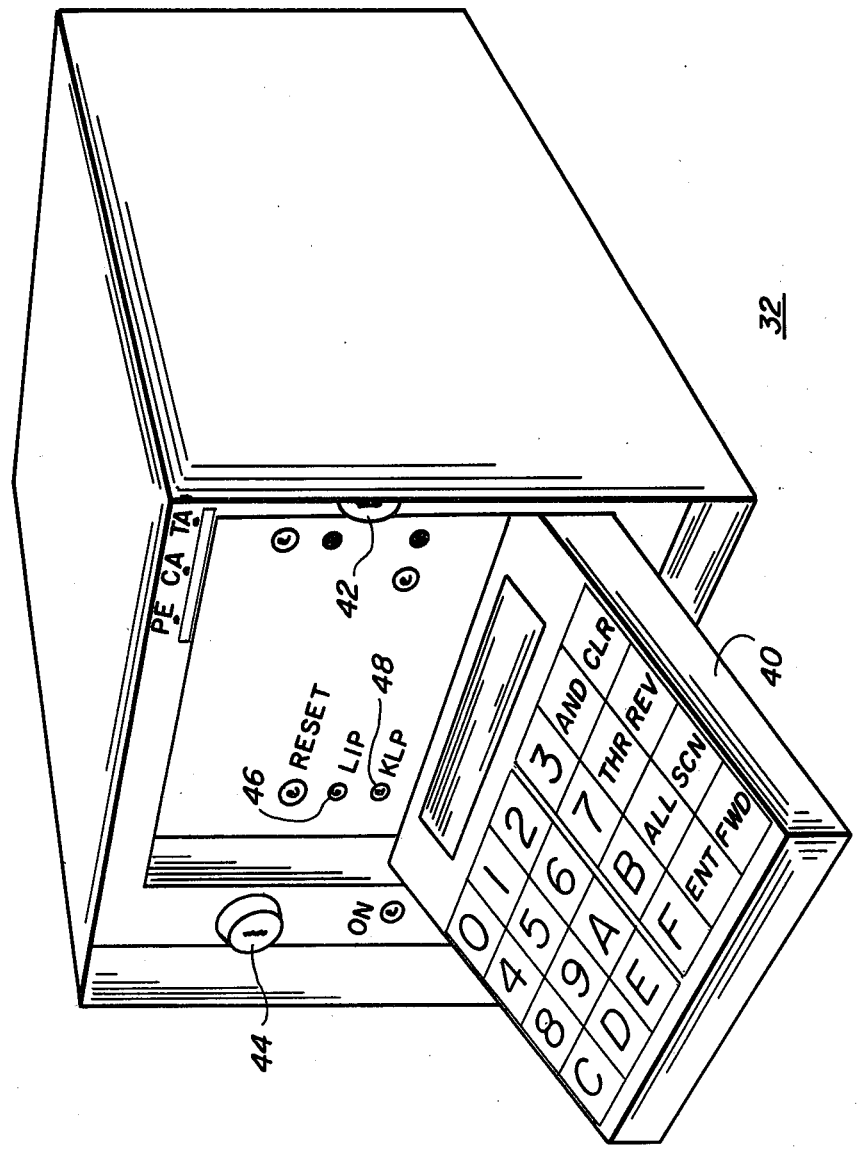

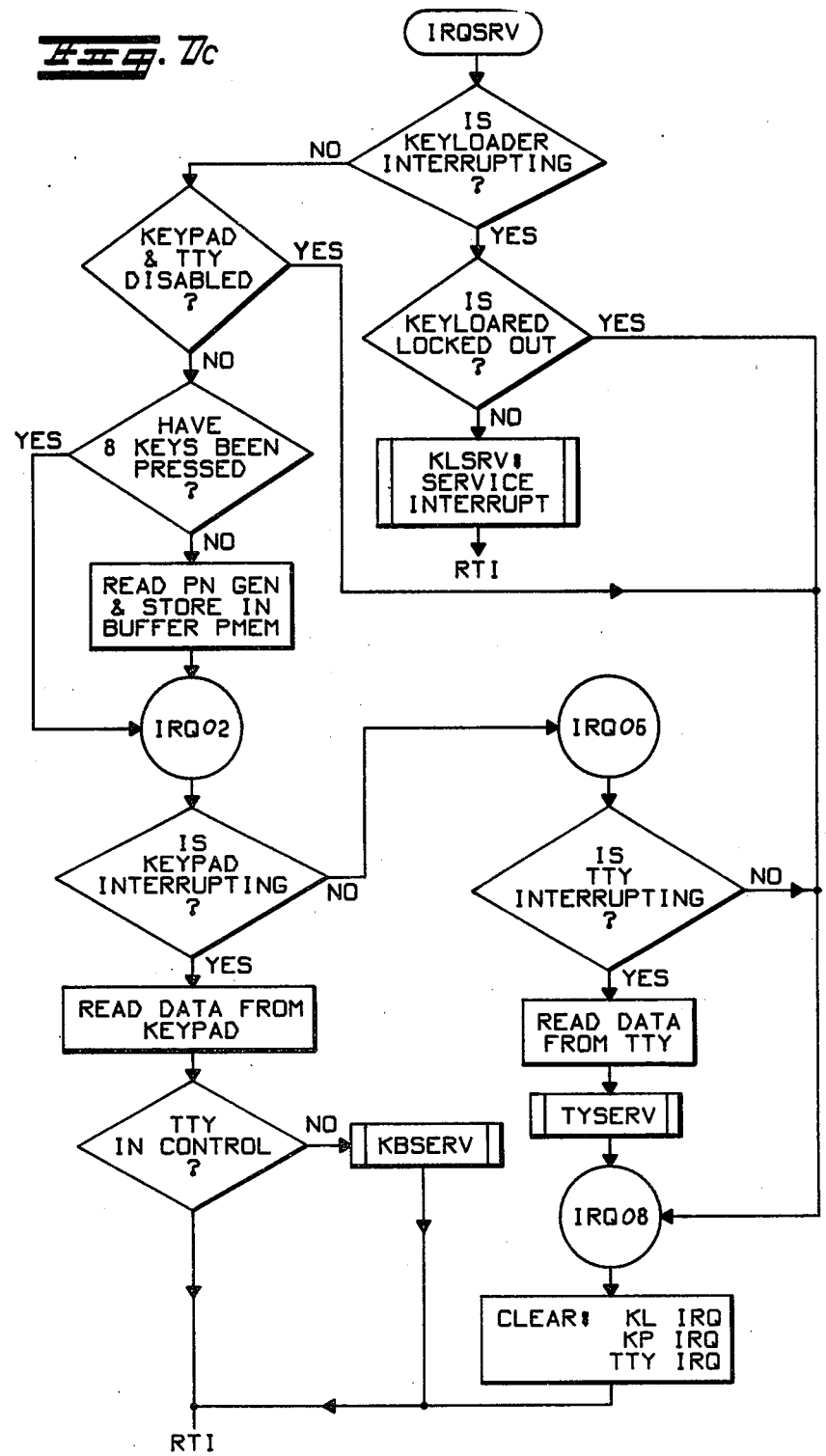

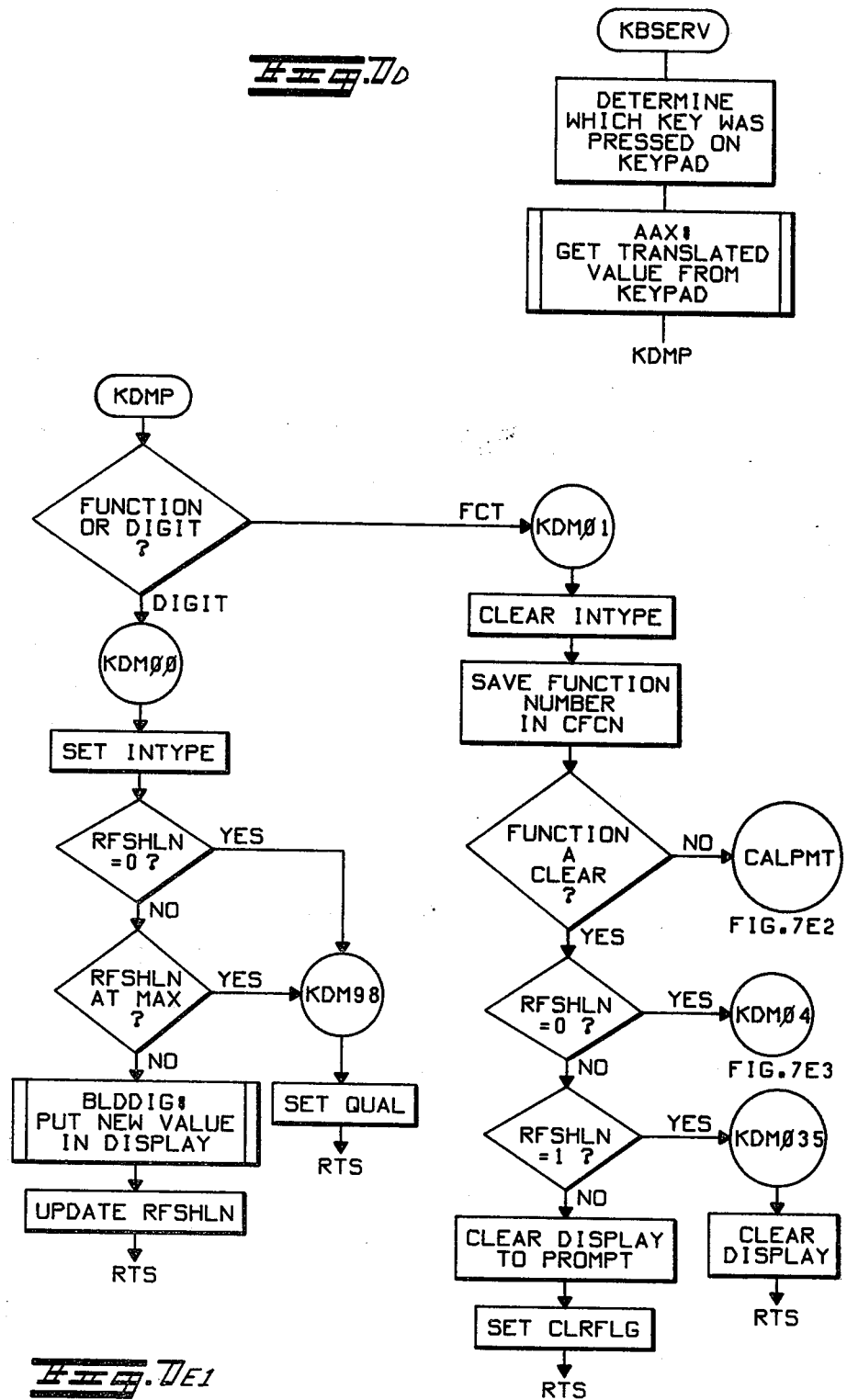

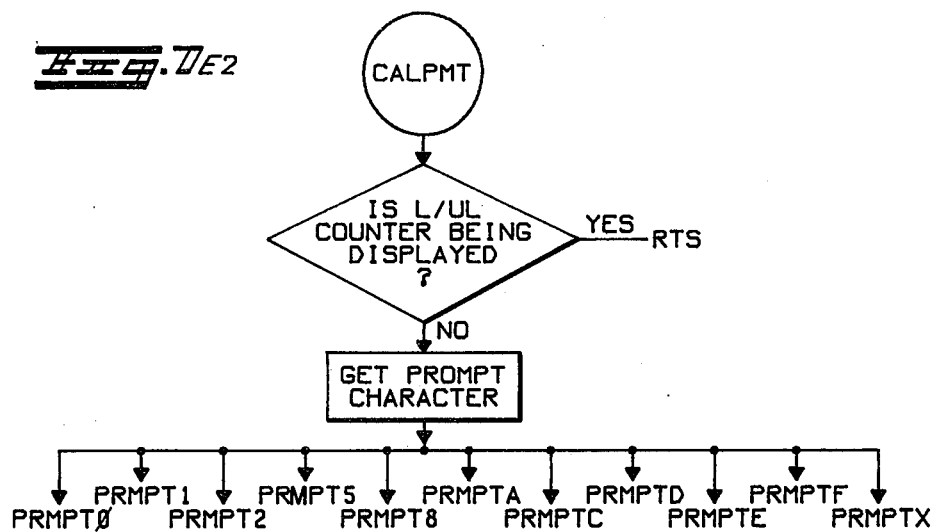
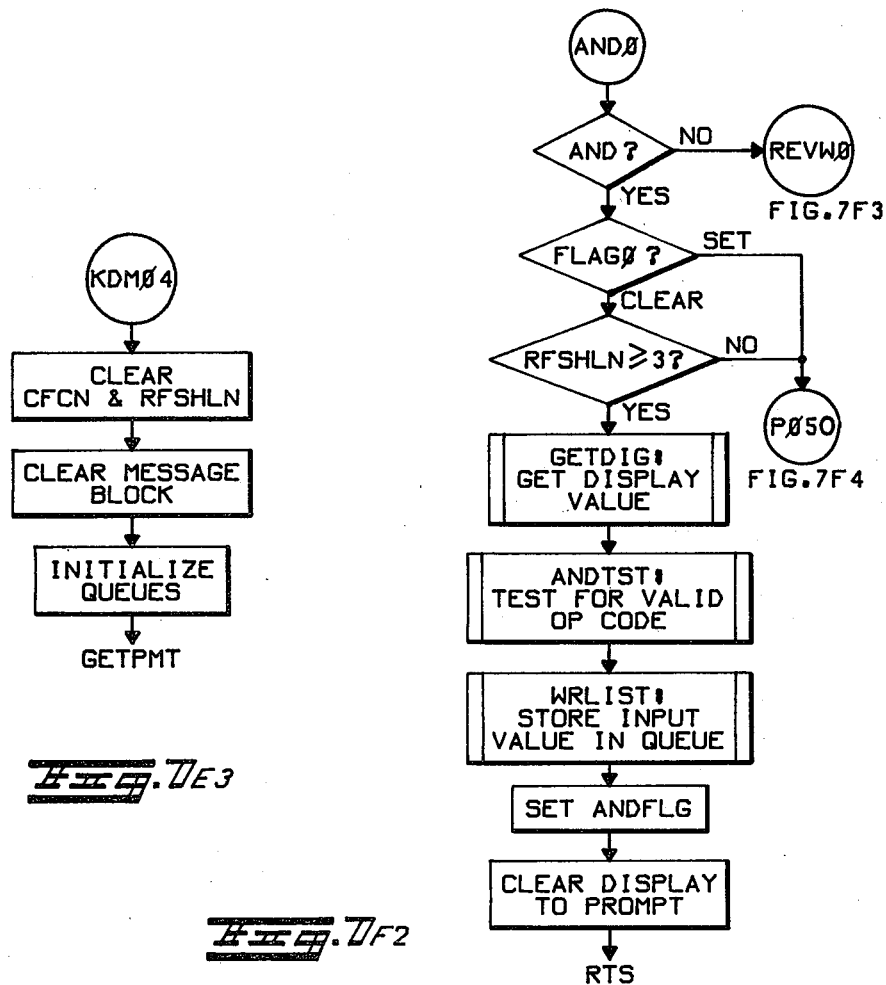

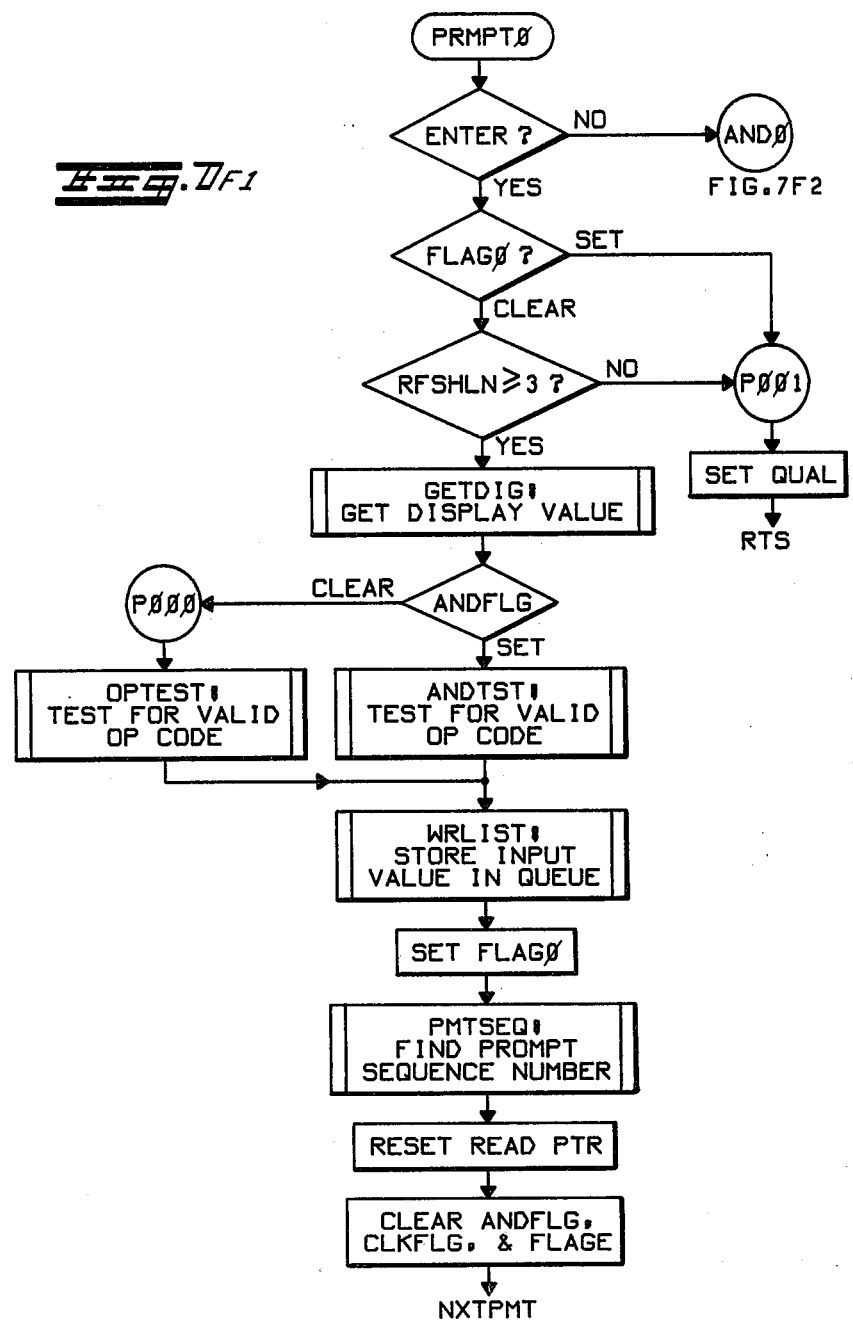
Fig. 7F1

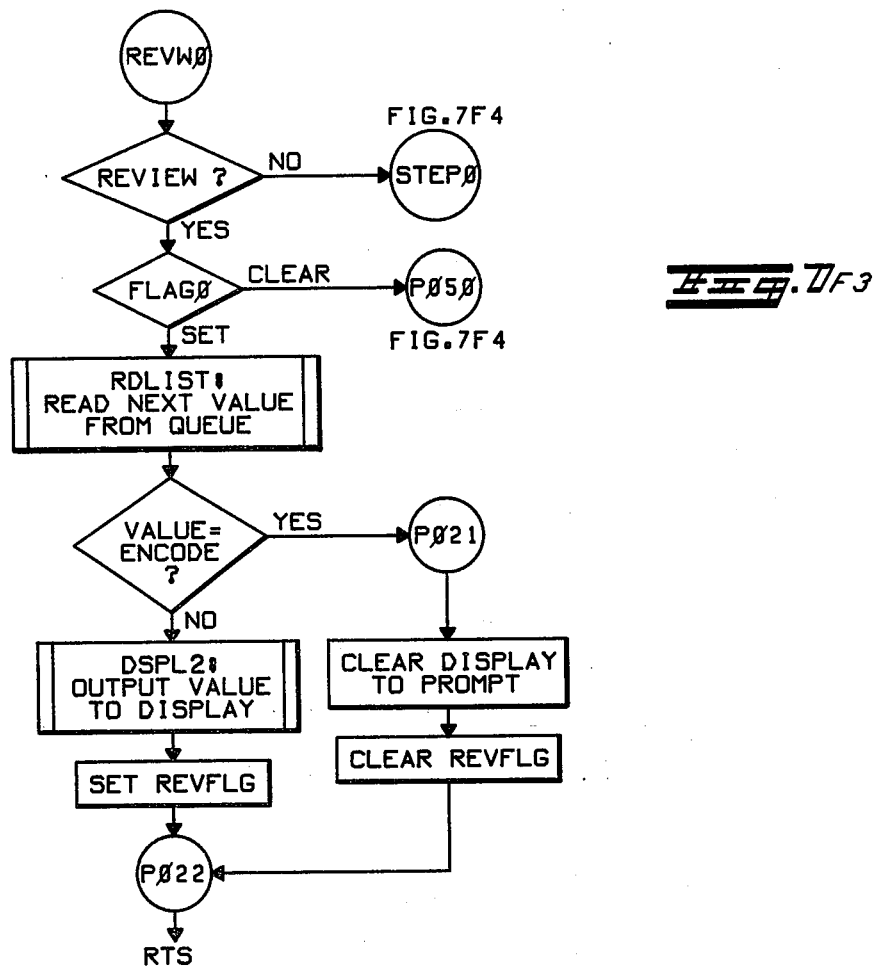
FIG. 7F3

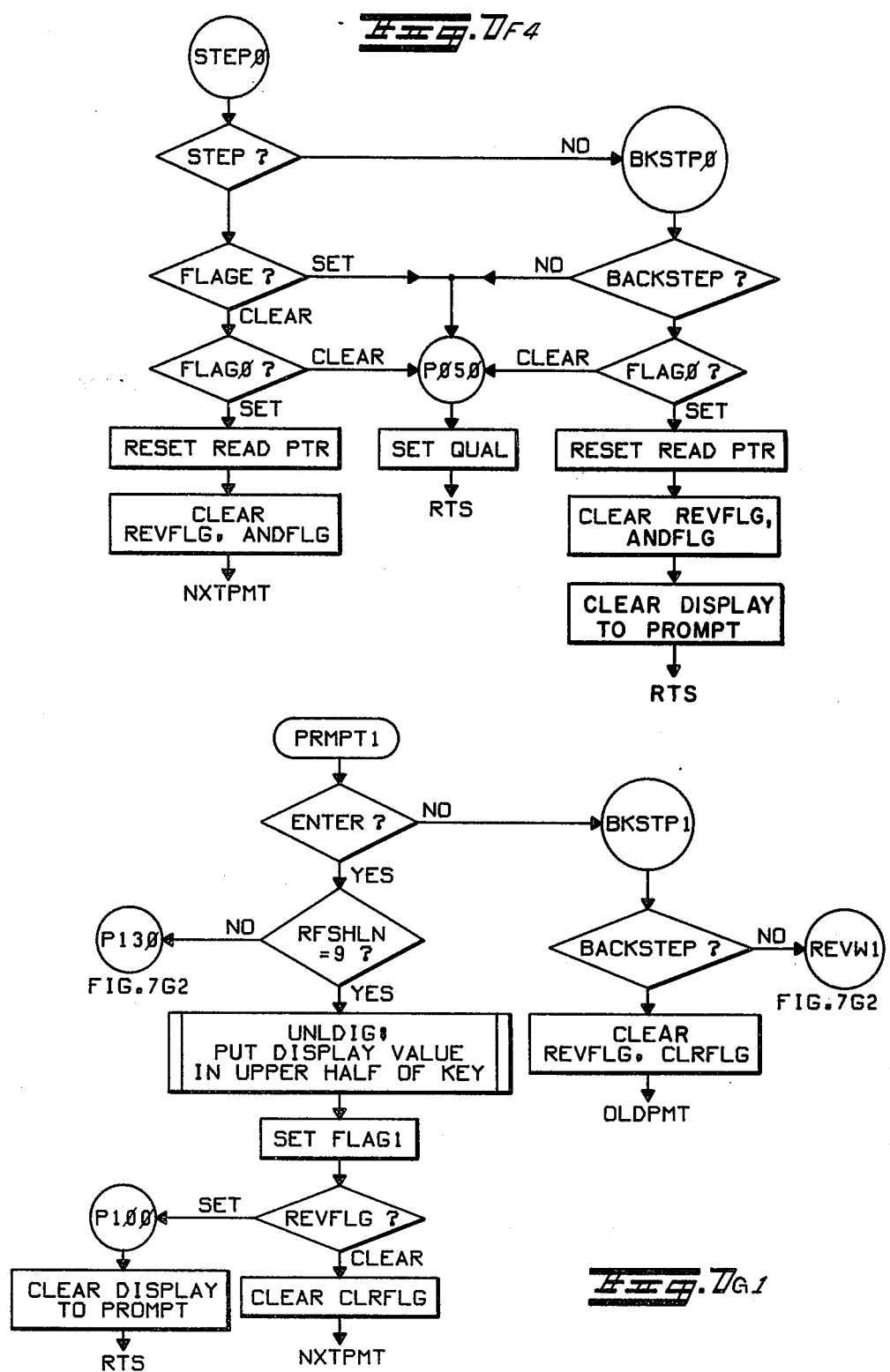

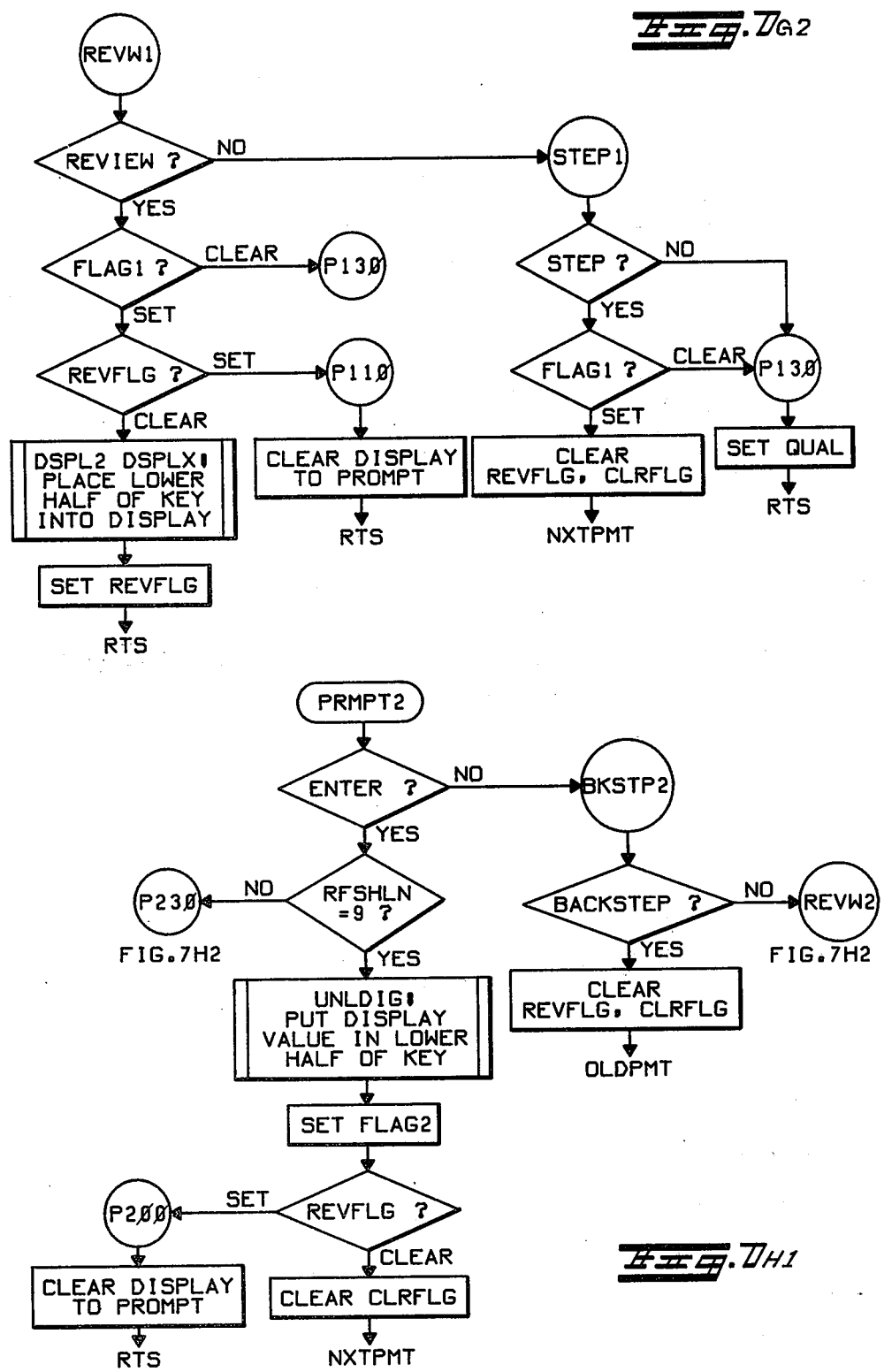

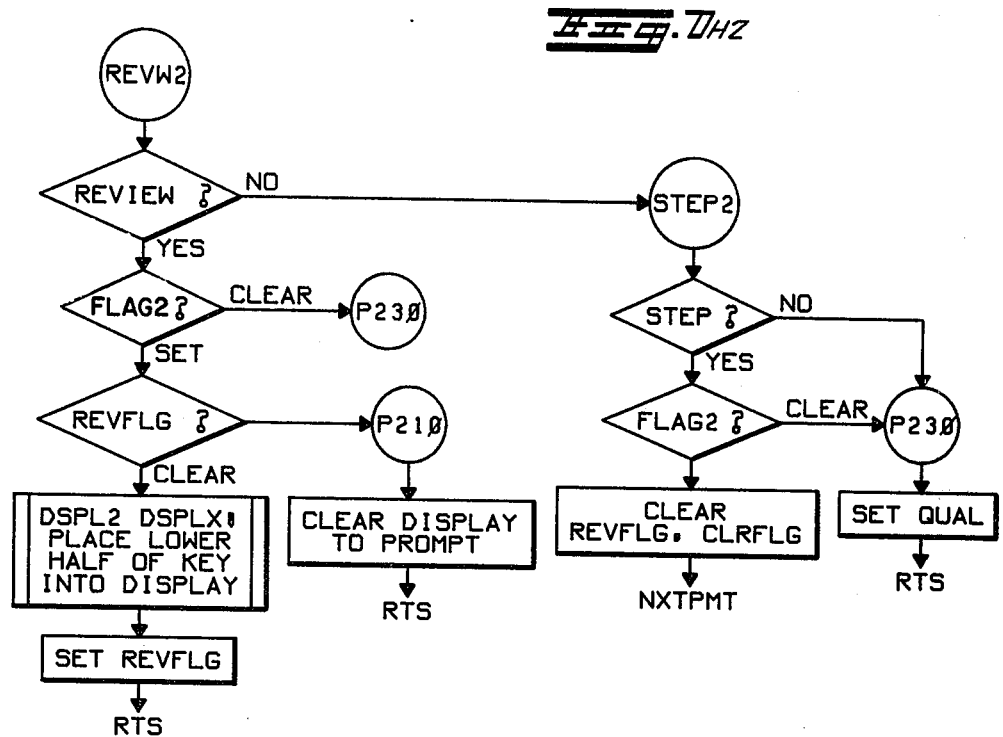
Fig. 7H2
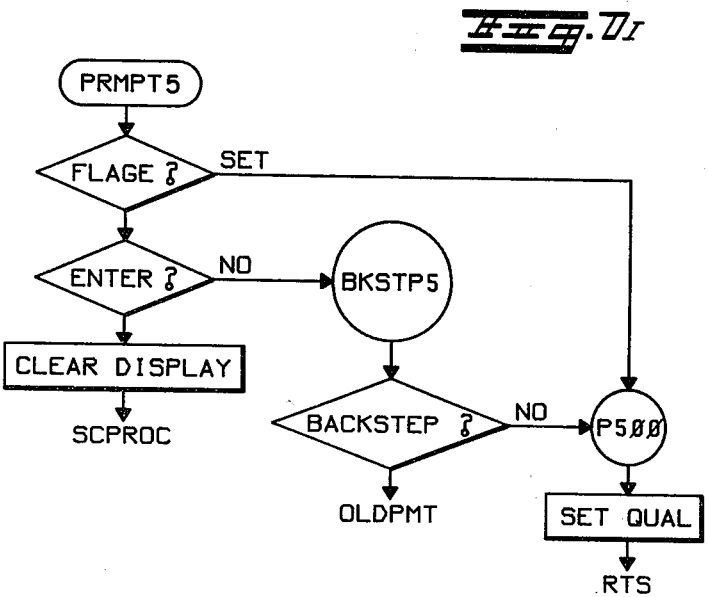
Fig. 7I

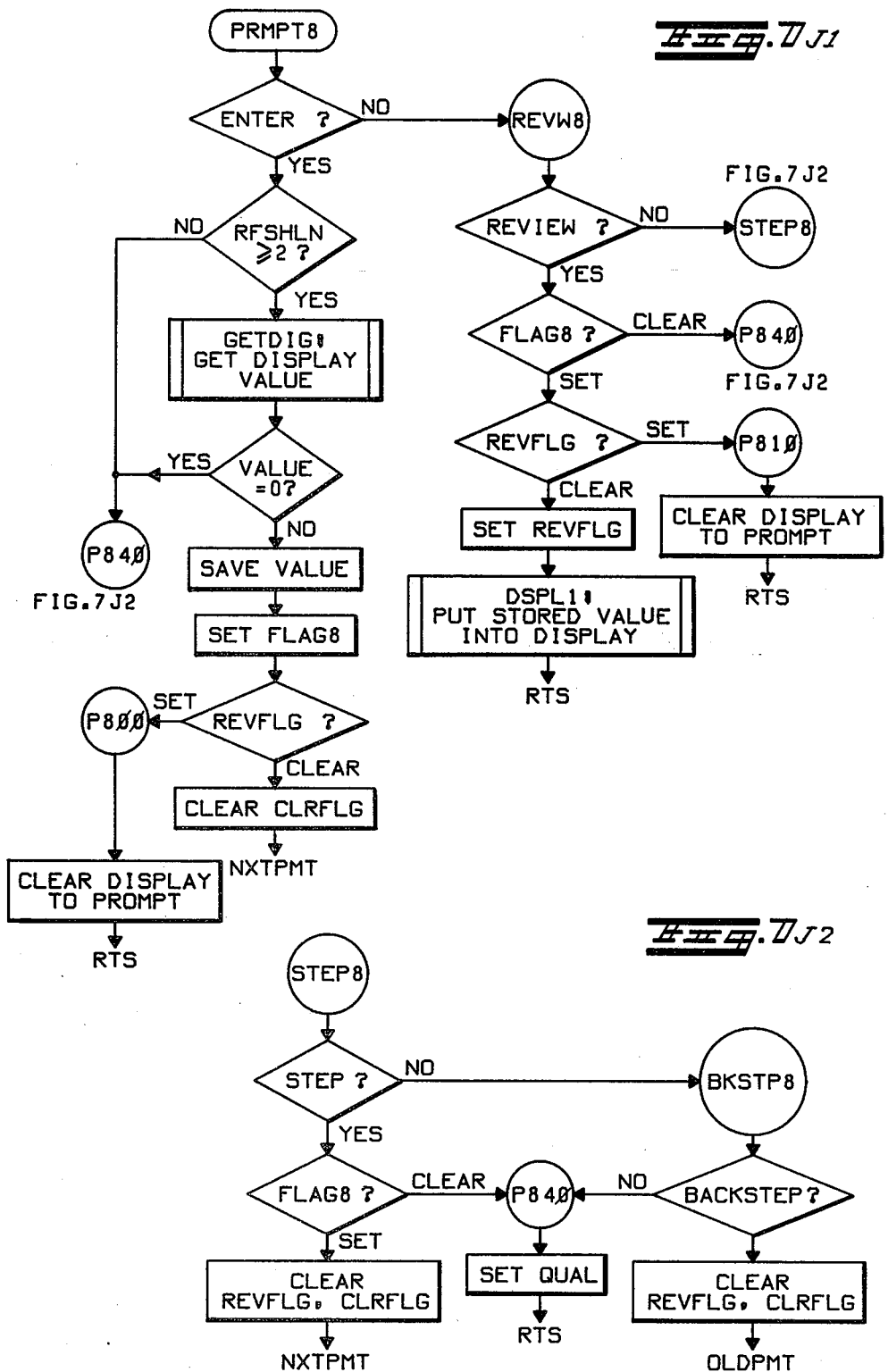

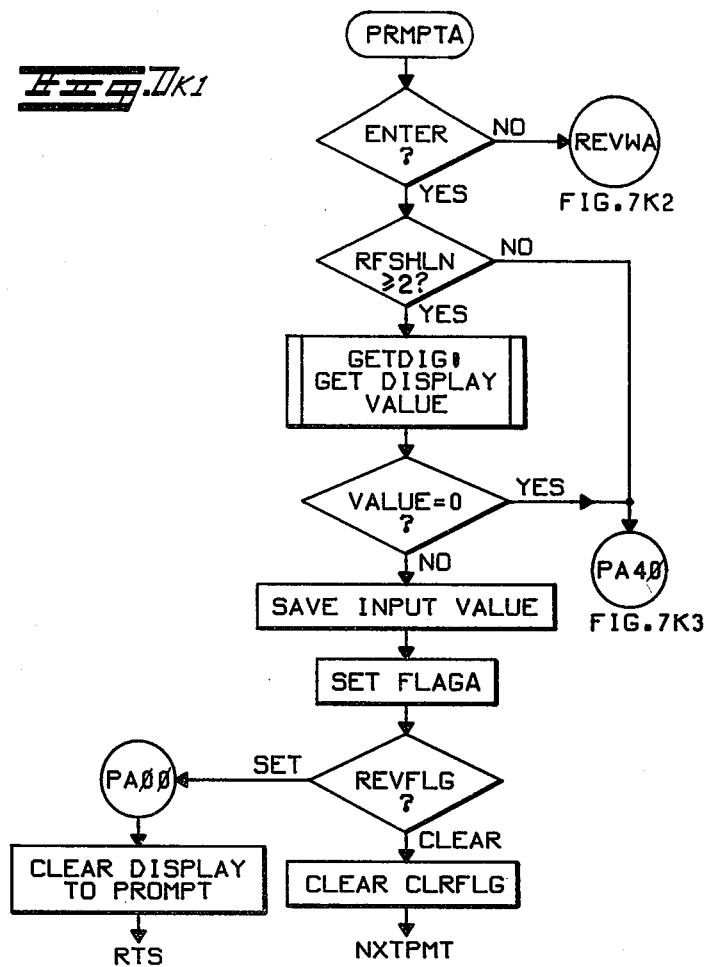
FIG. 7K1
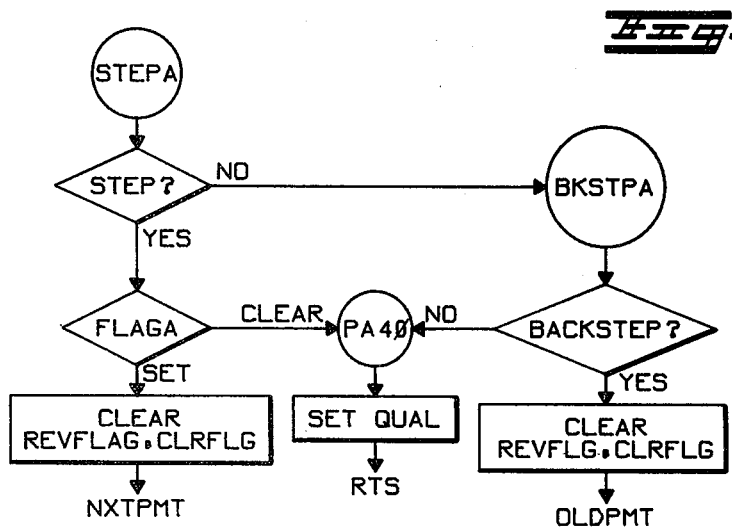
FIG. 7K3

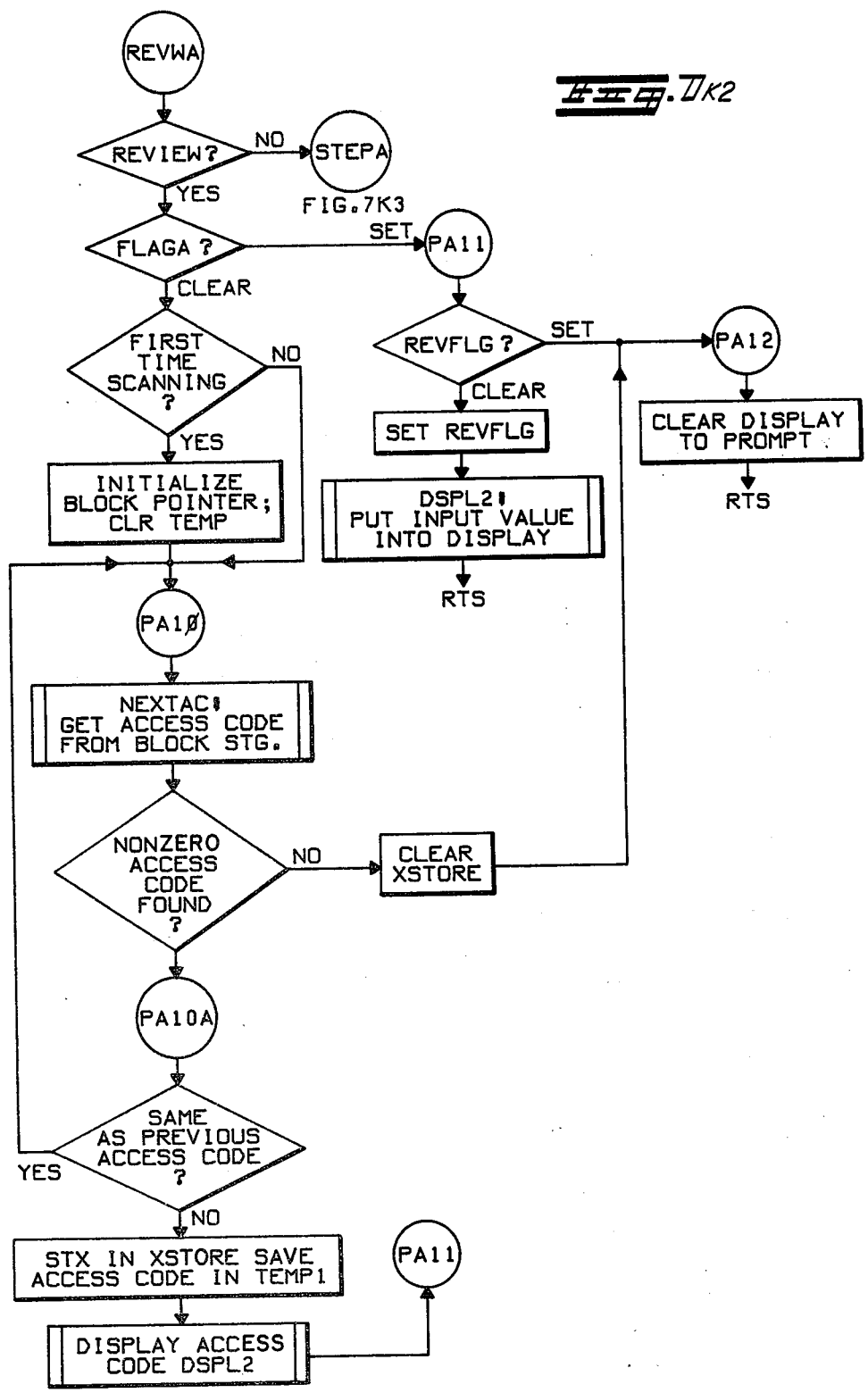

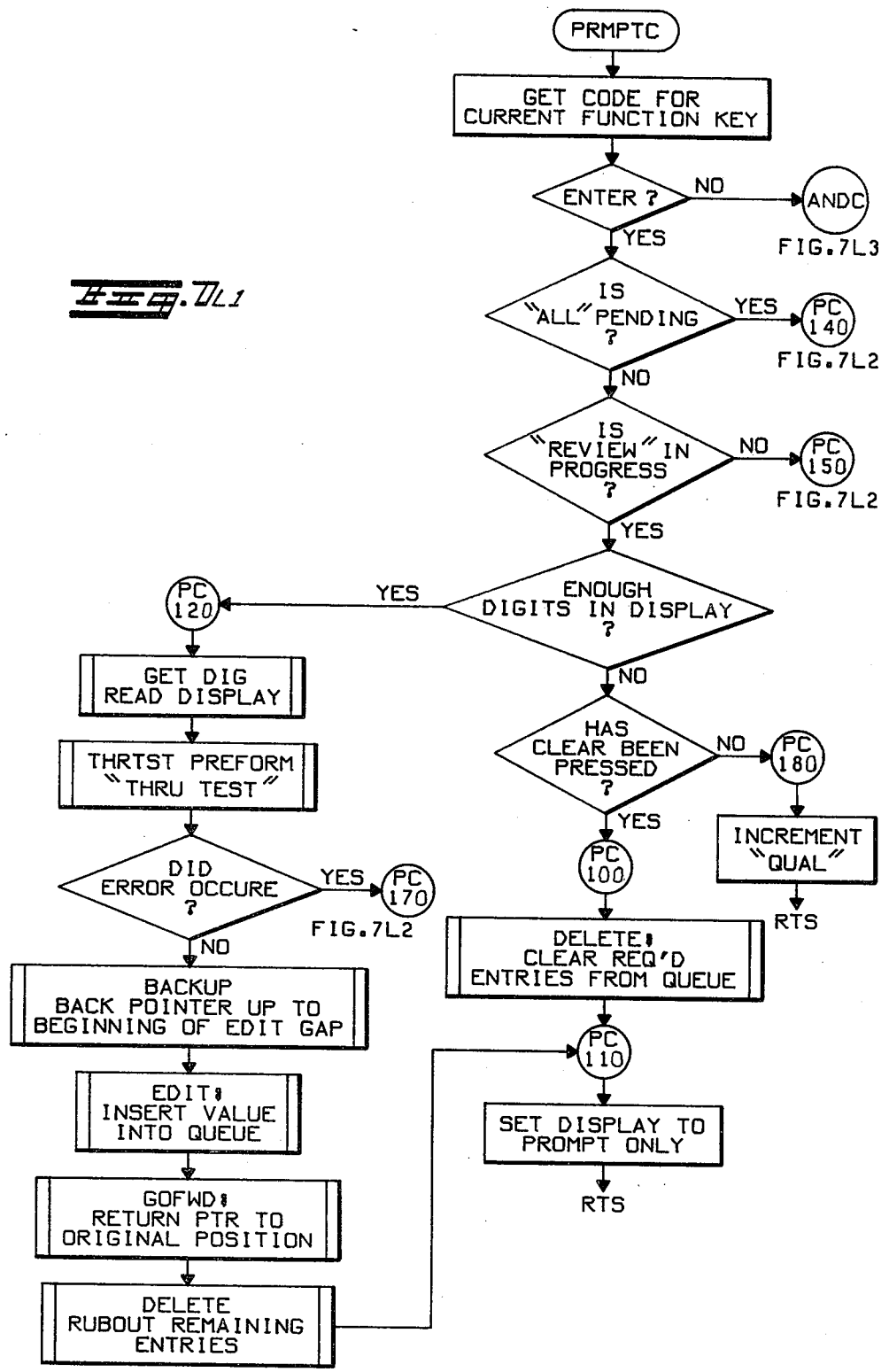

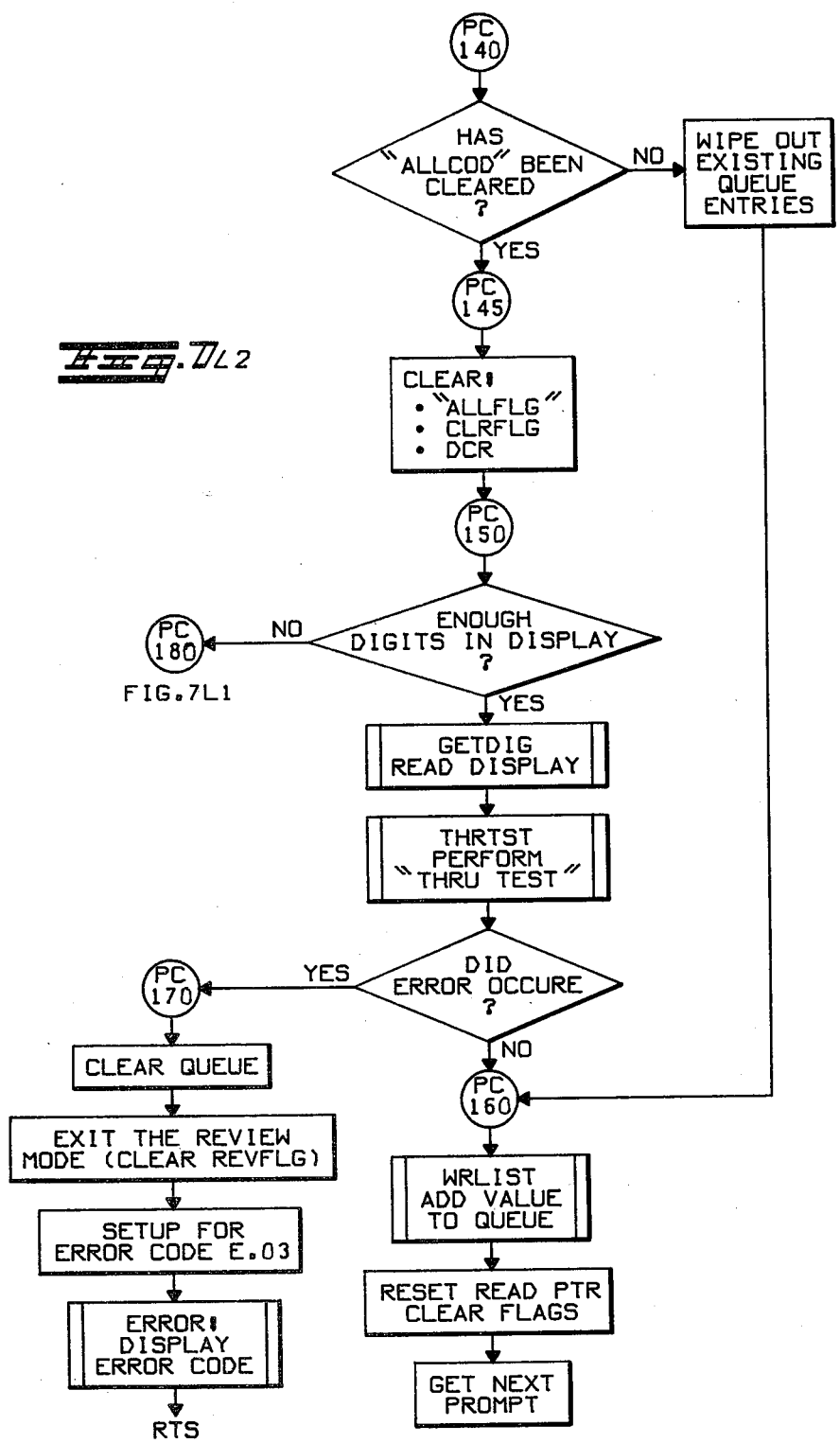

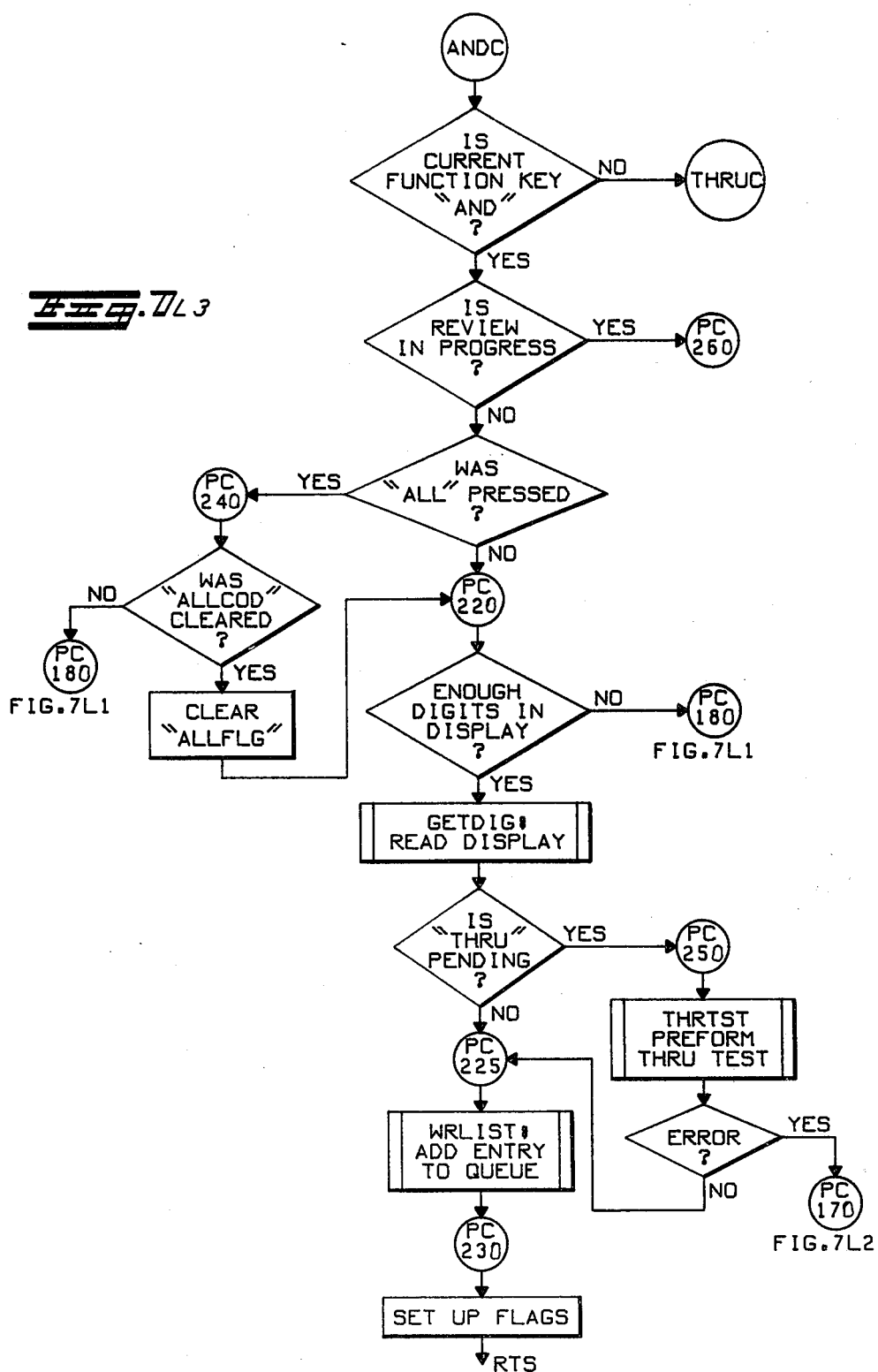

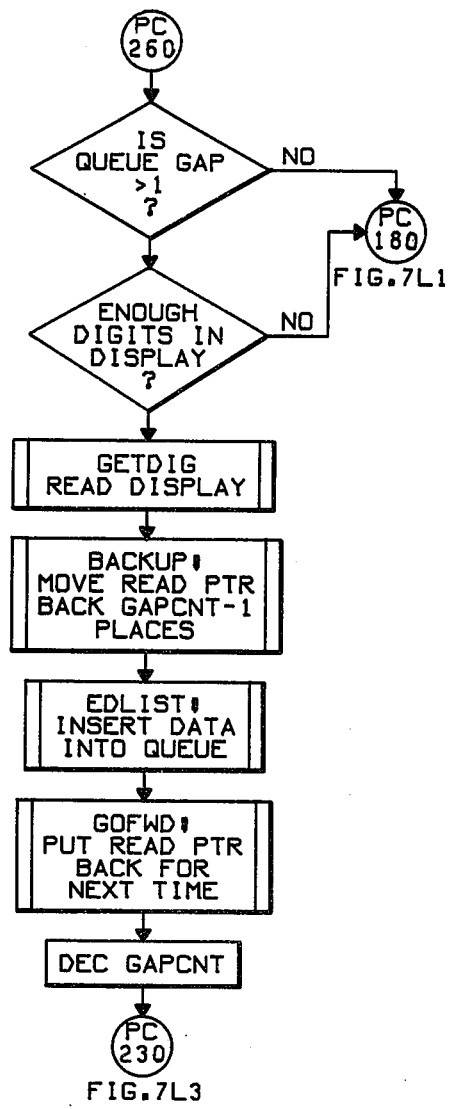
FIG.7L4
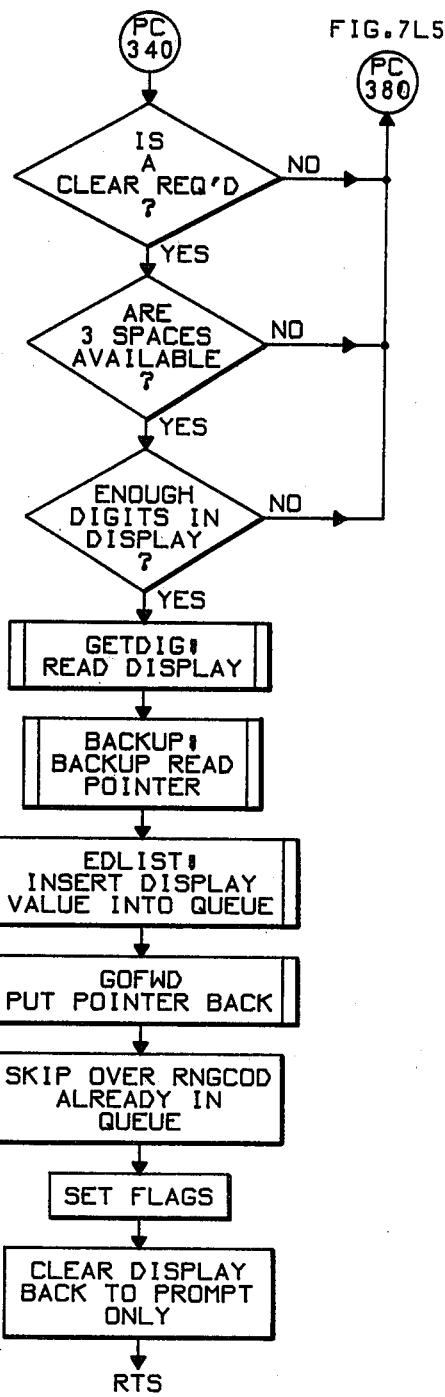
FIG.7L6

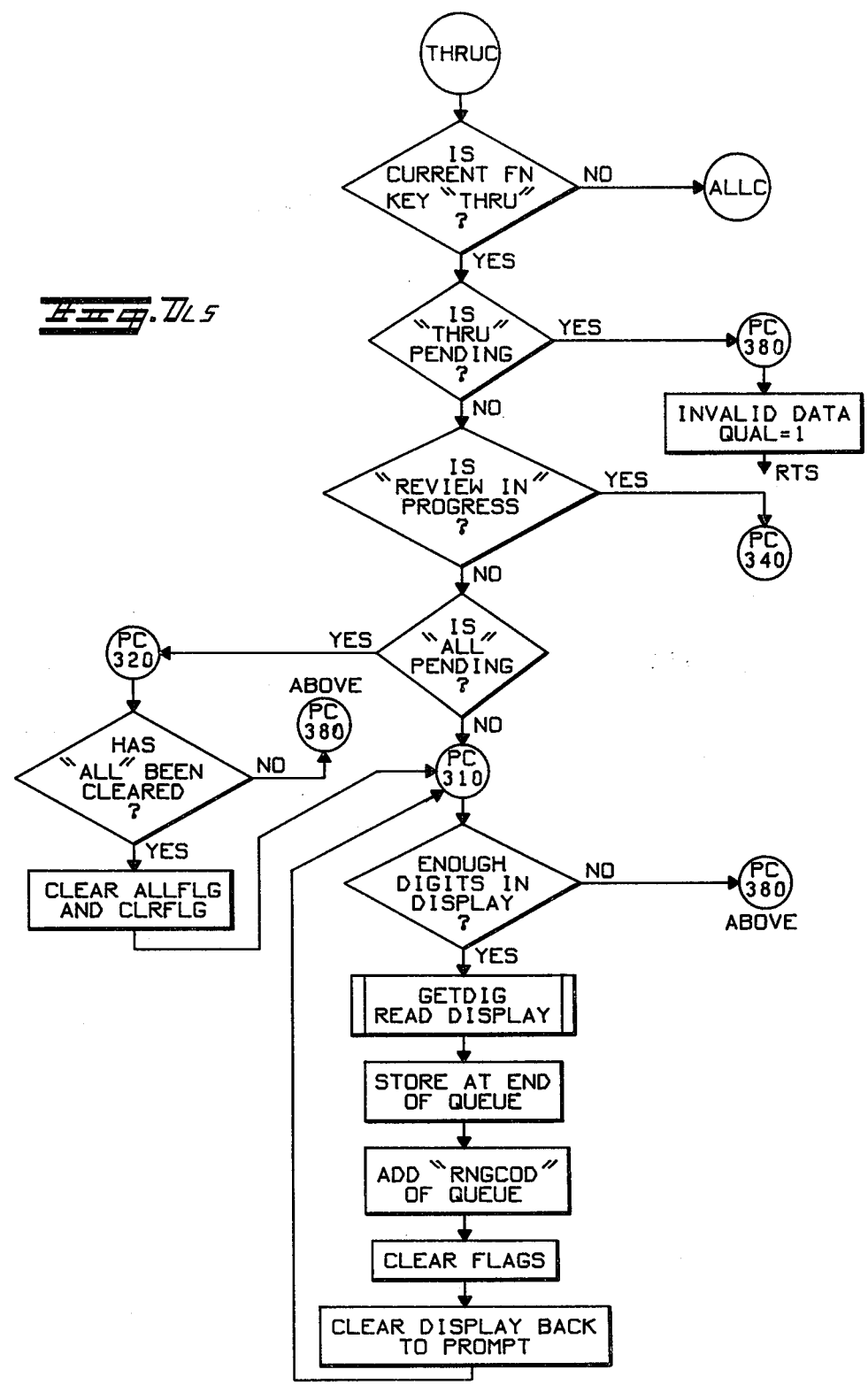

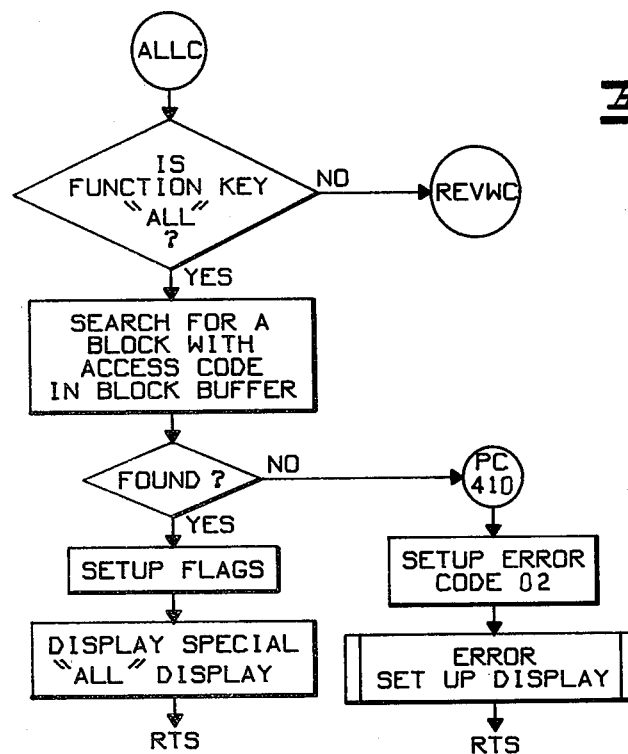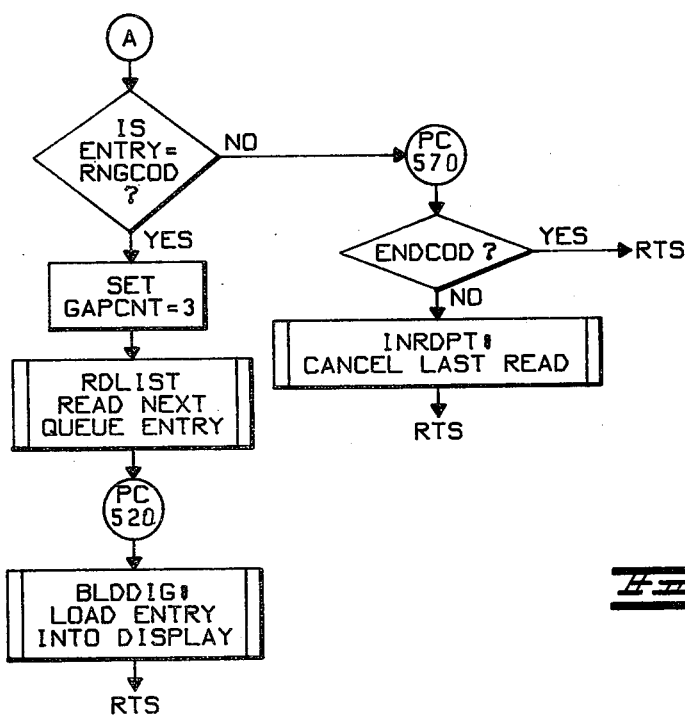

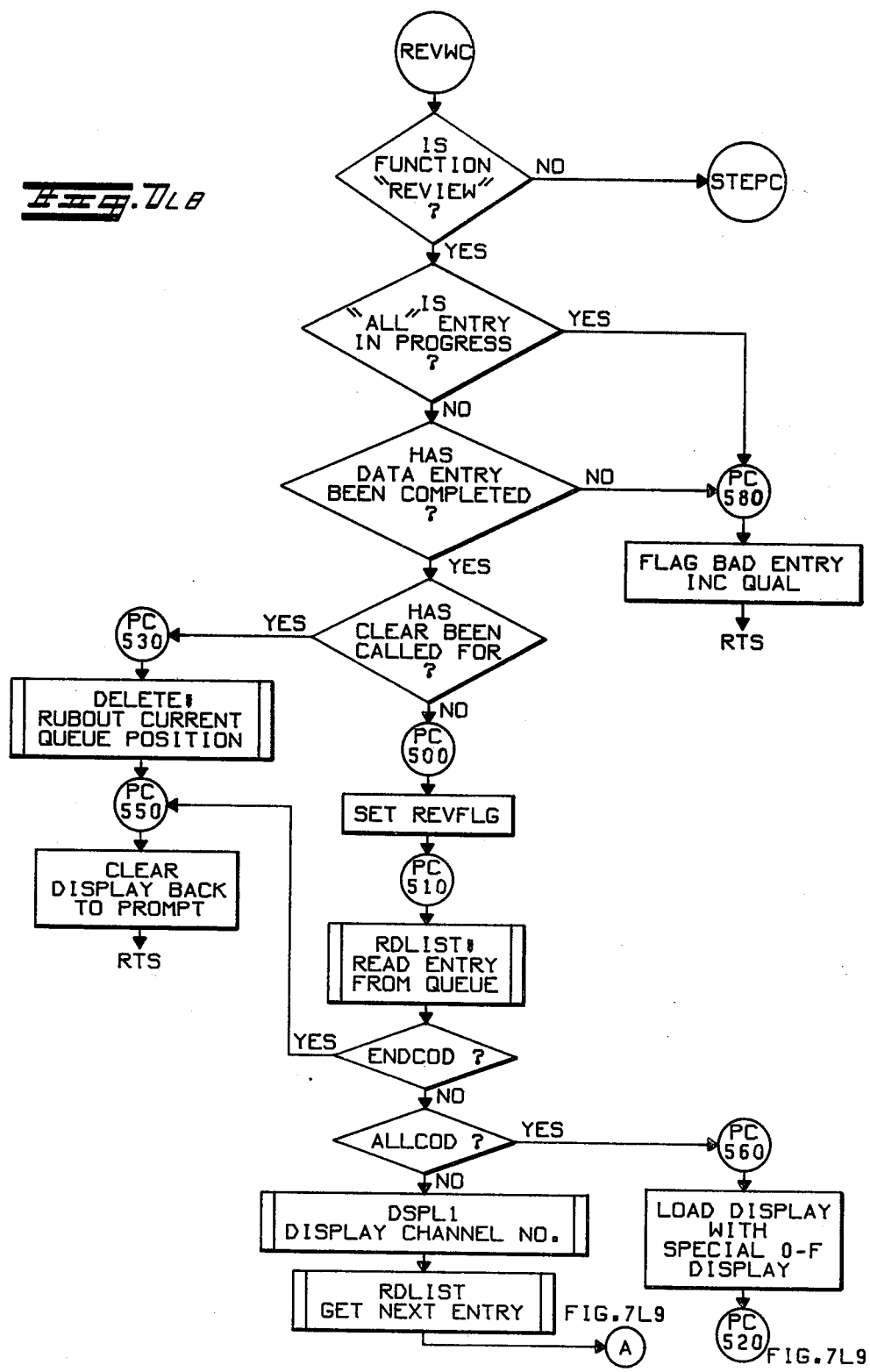

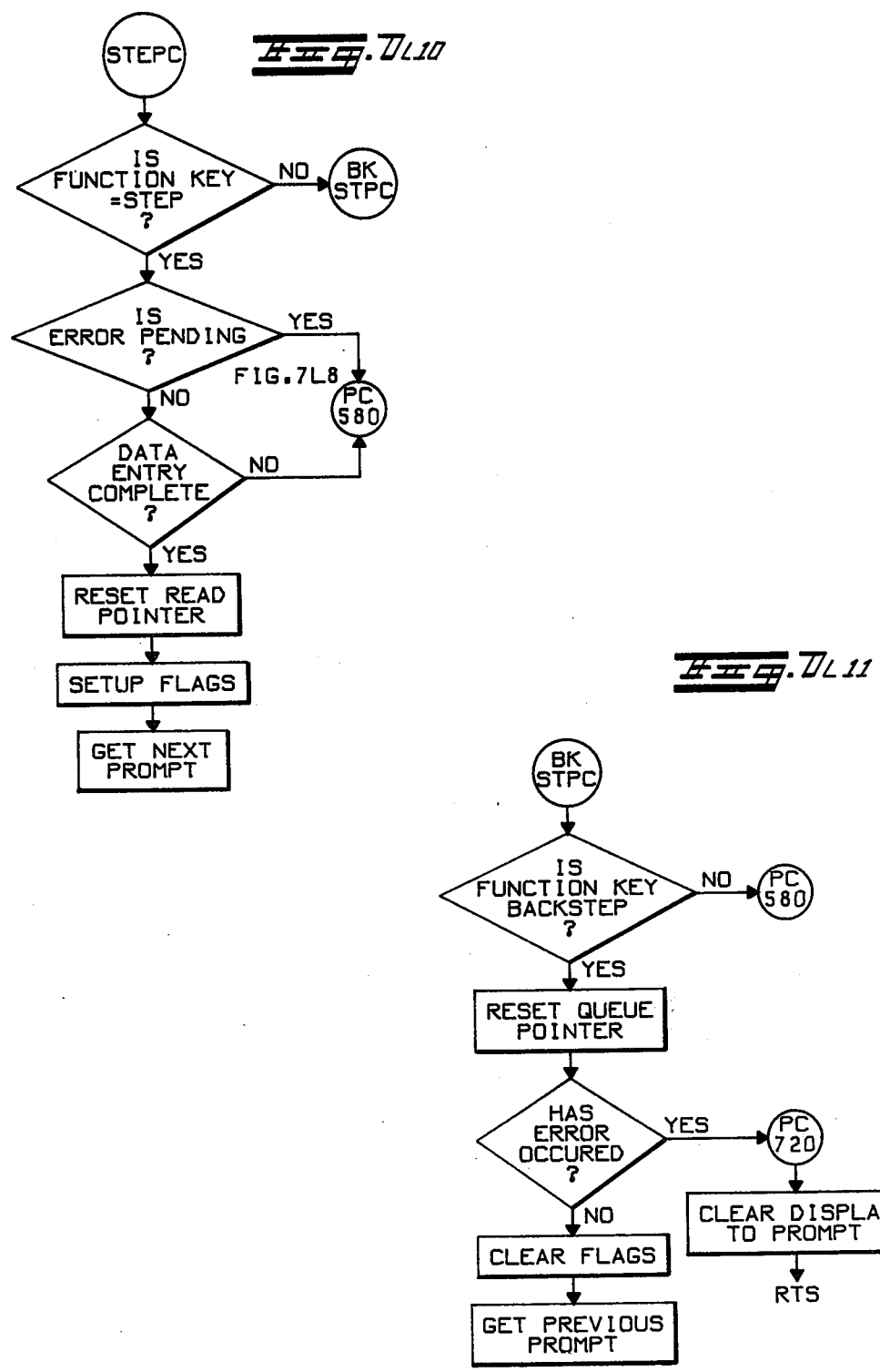

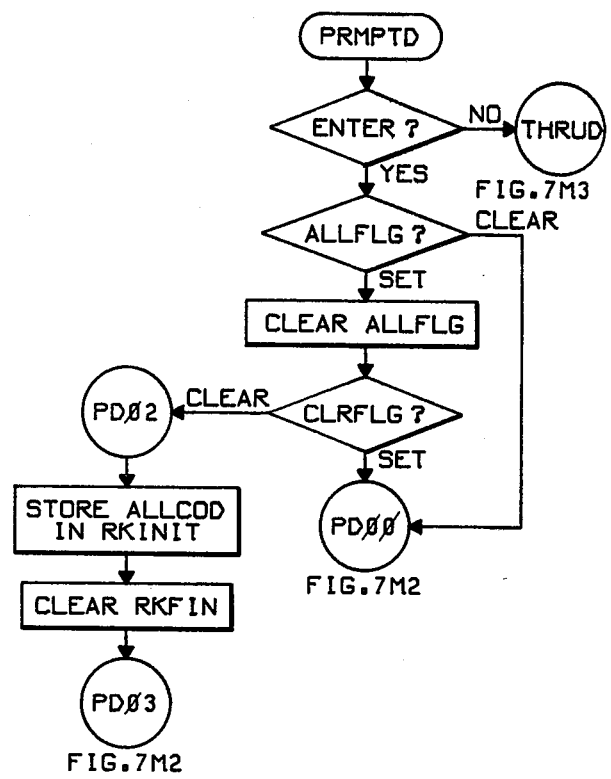
FIG.7M1
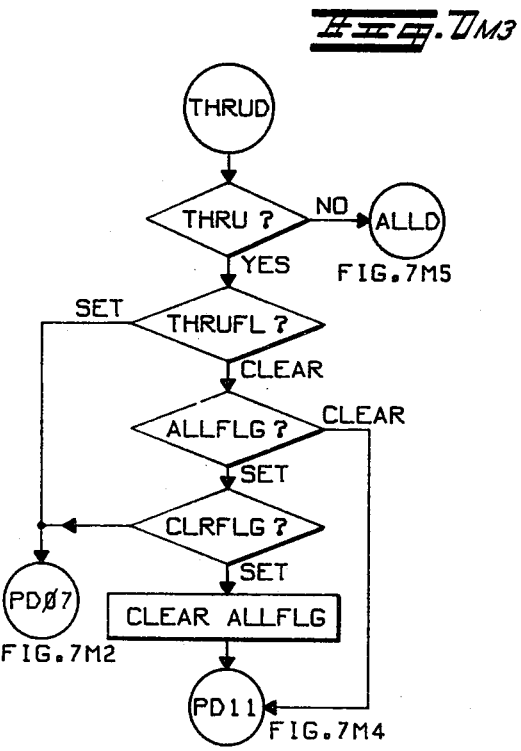
FIG.7M3
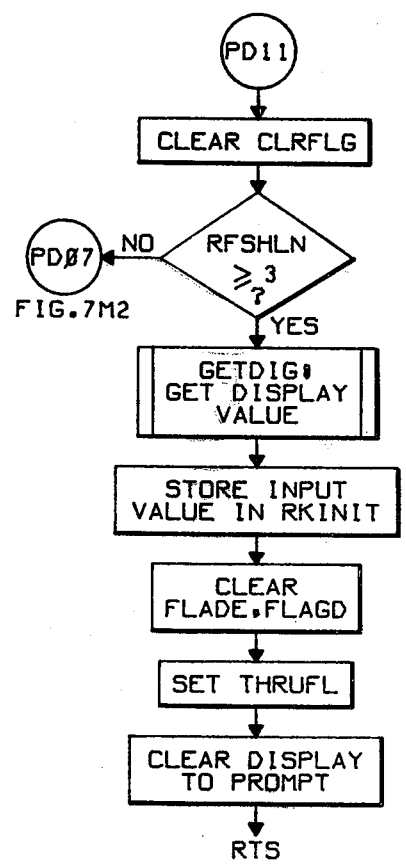
FIG.7M4

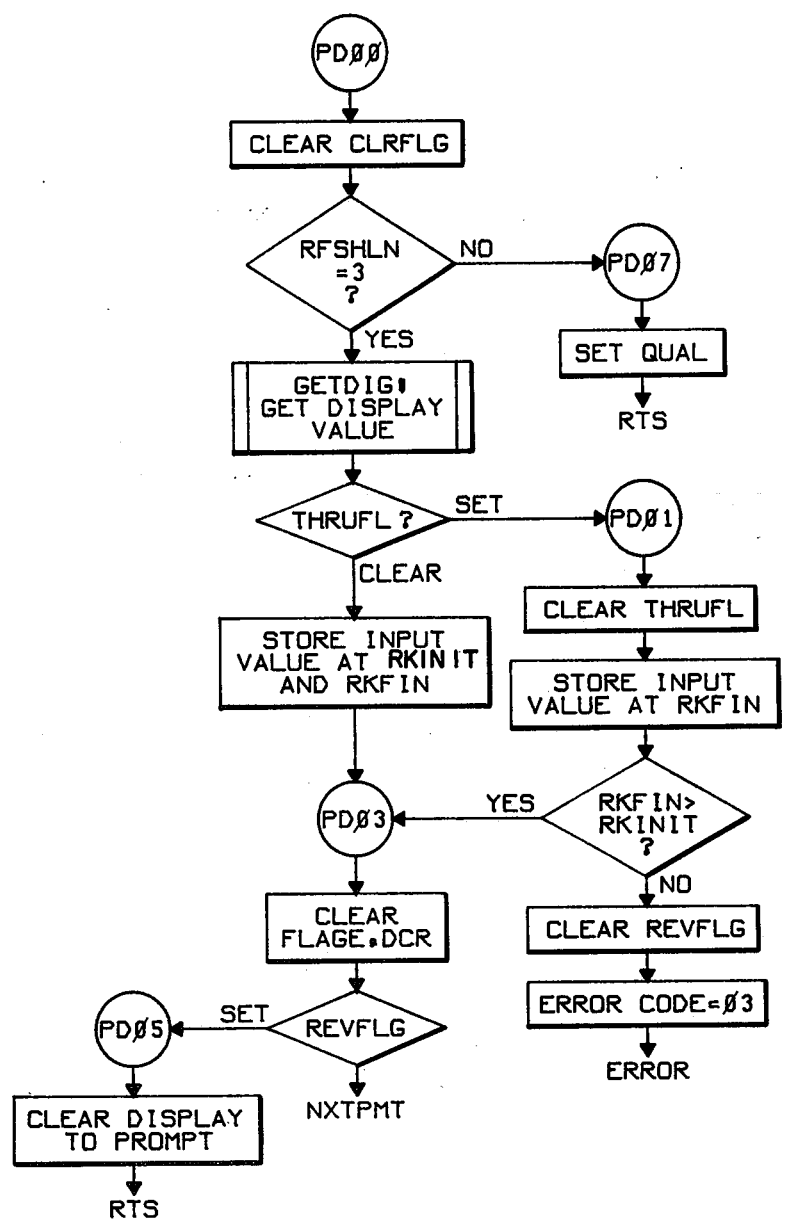
FIG. 7M2

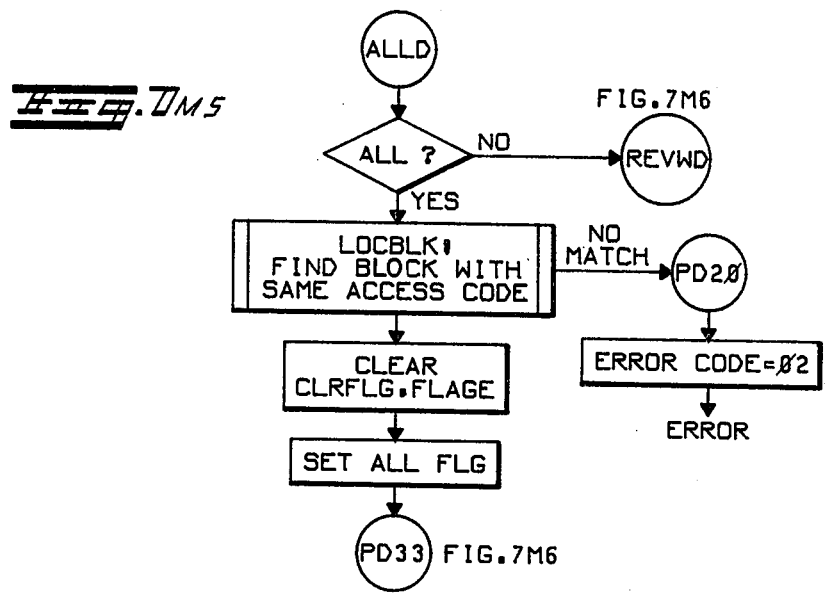
FIG.7M5
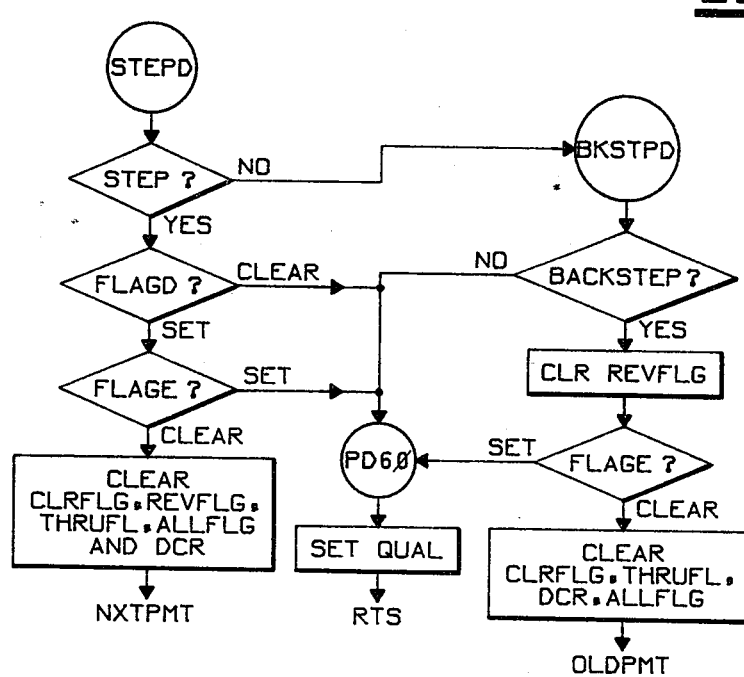
FIG.7M8

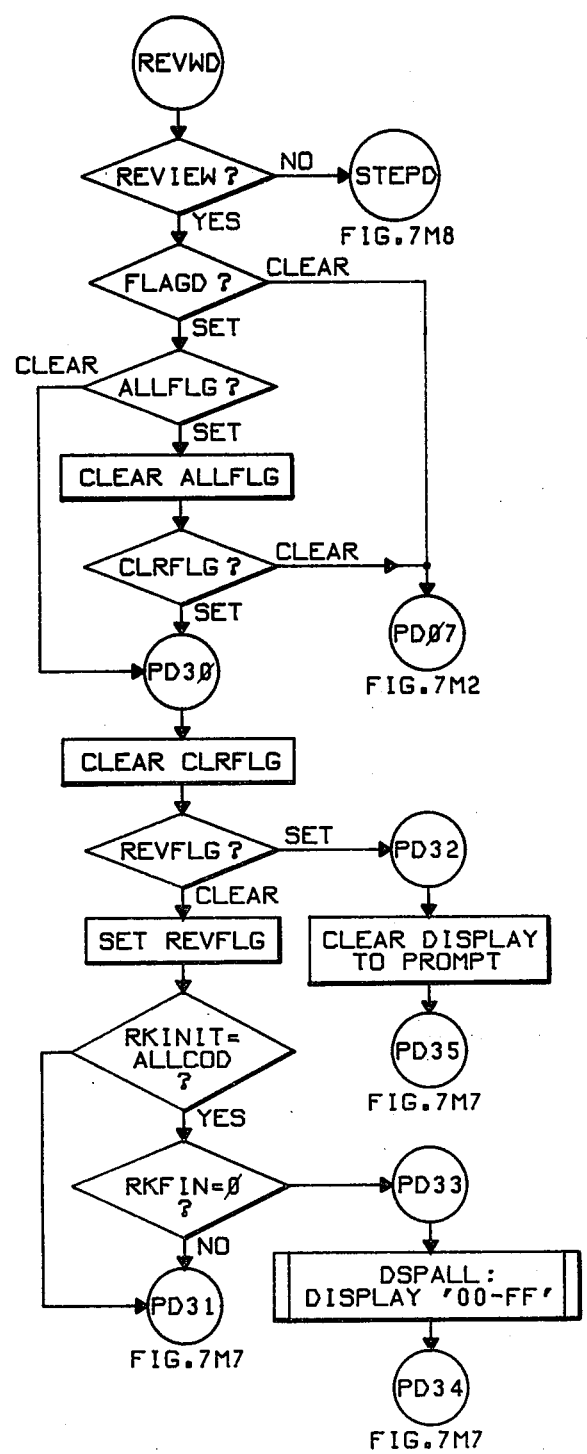
FIG.7M6
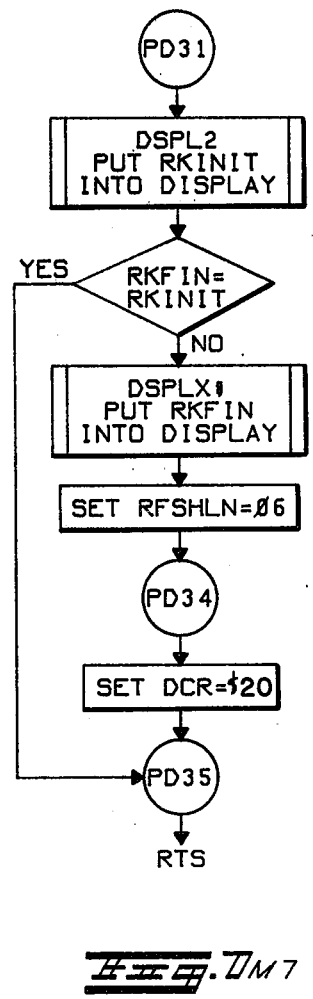
FIG.7M7

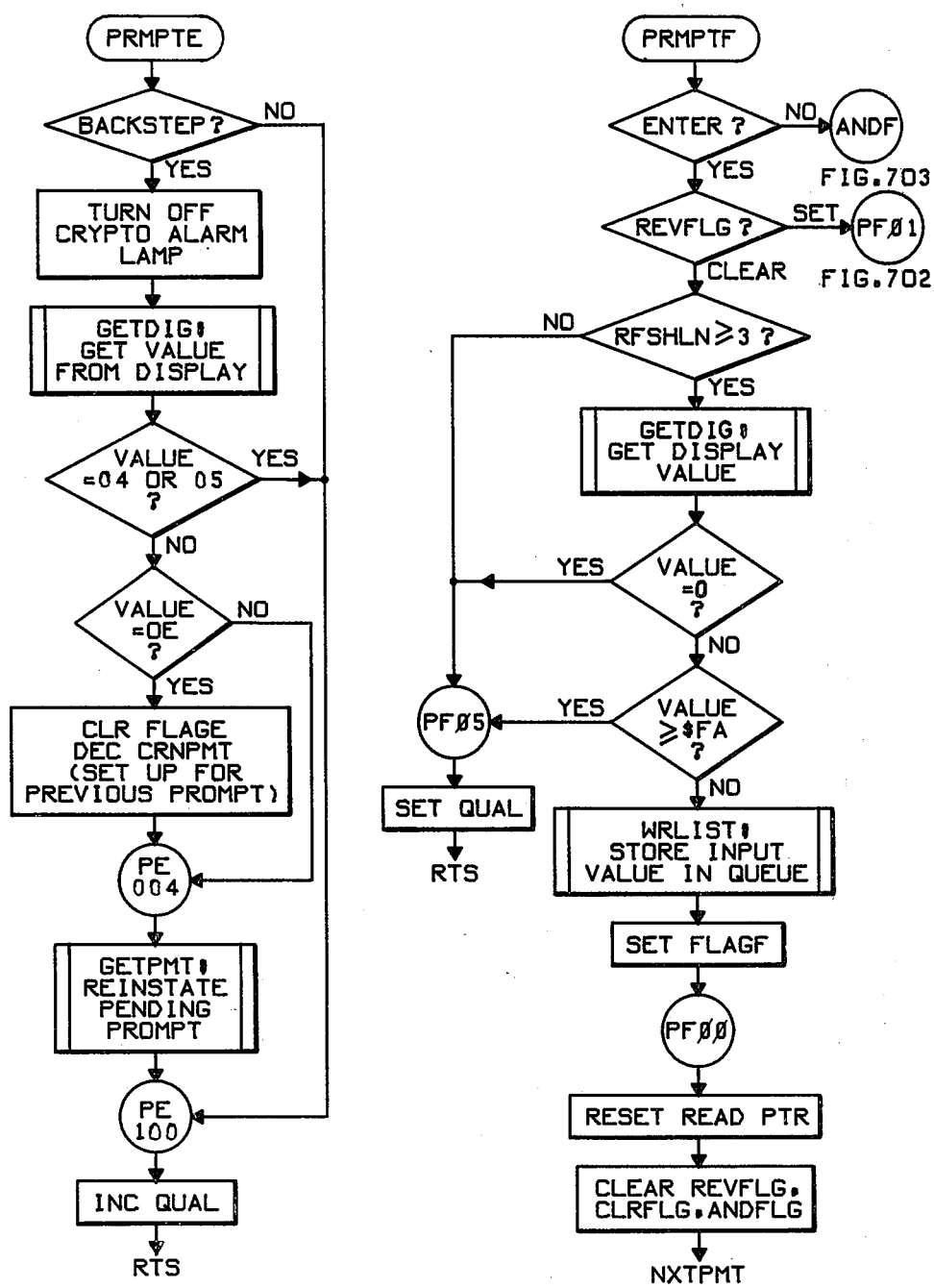

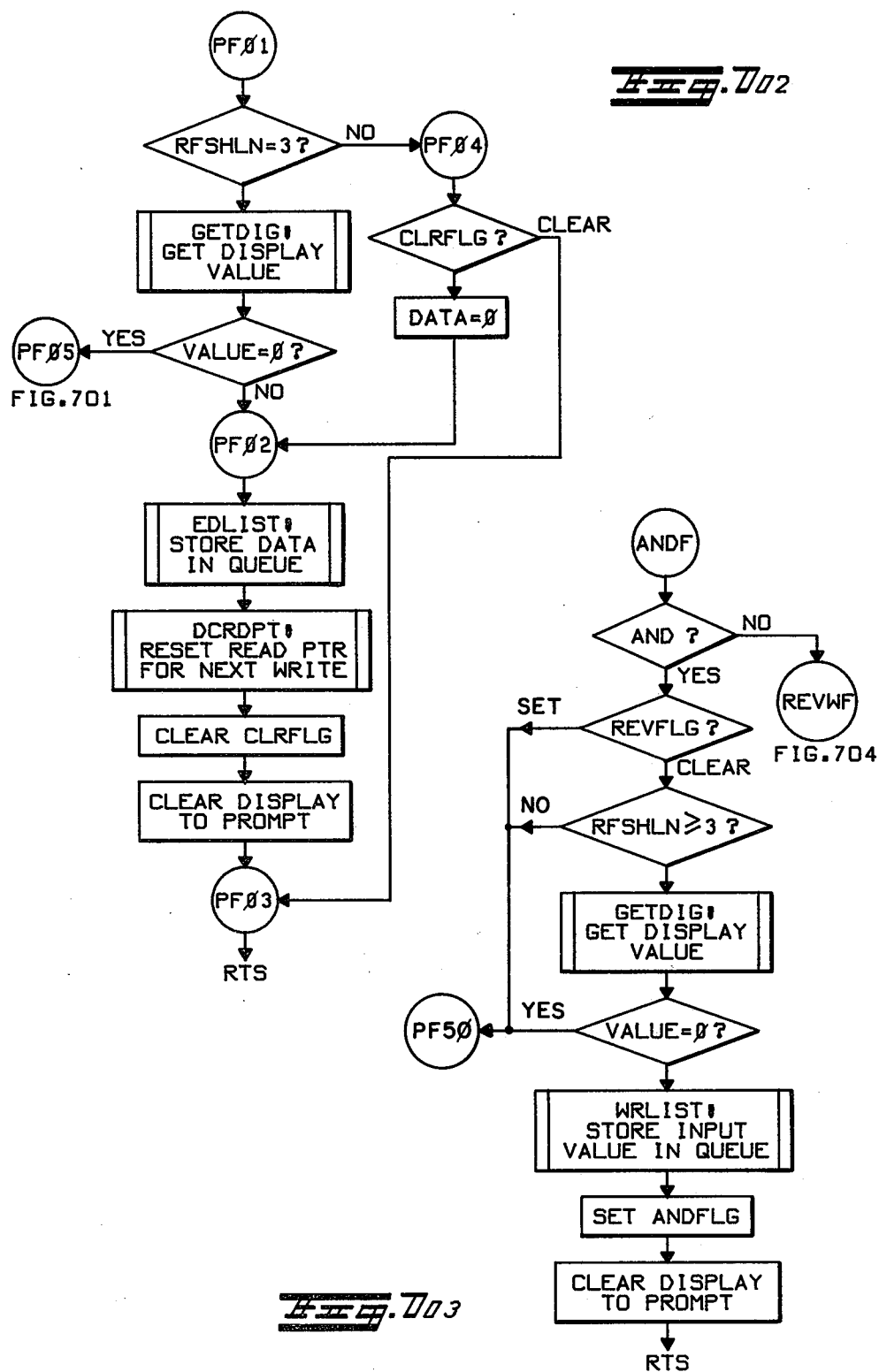

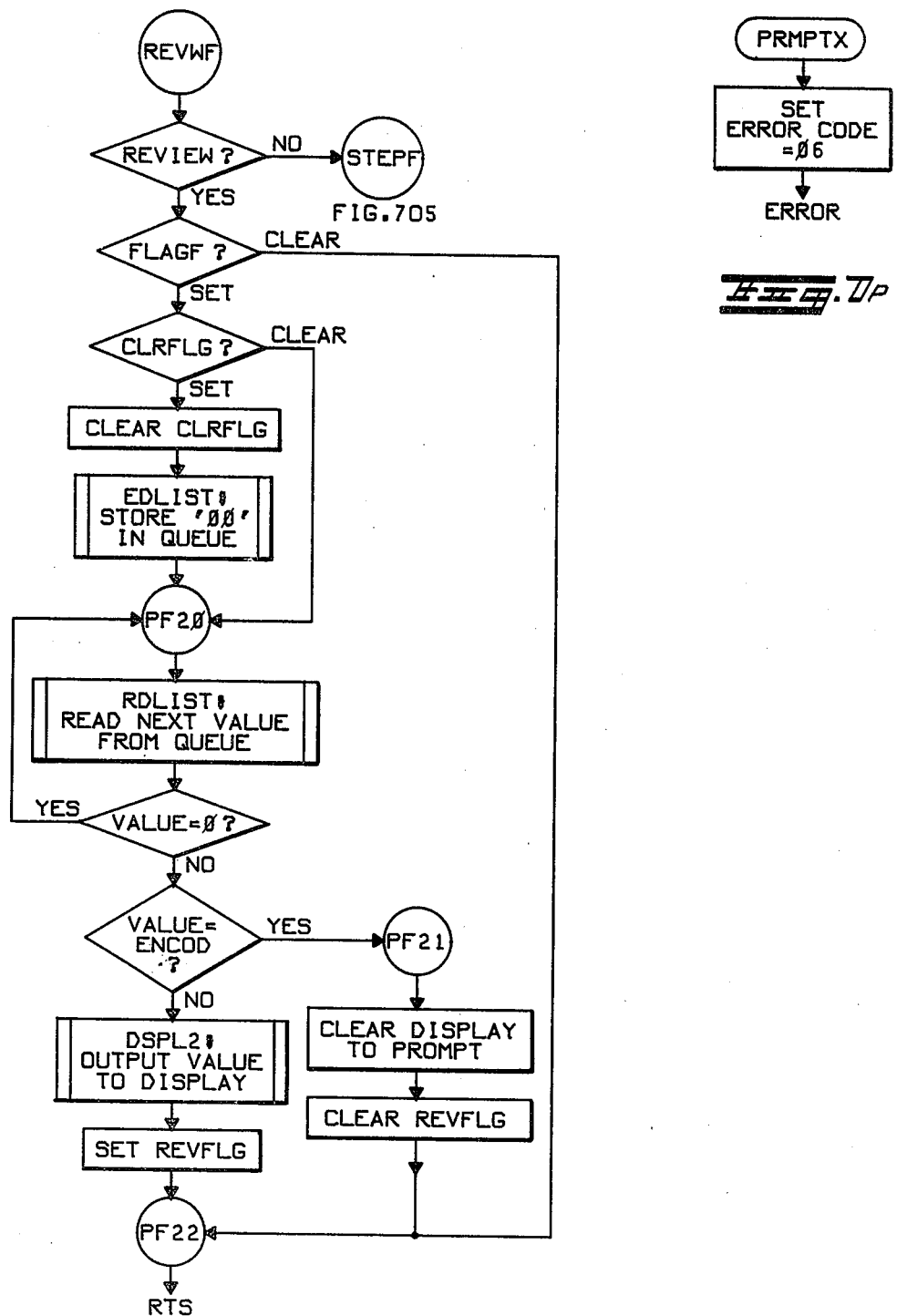

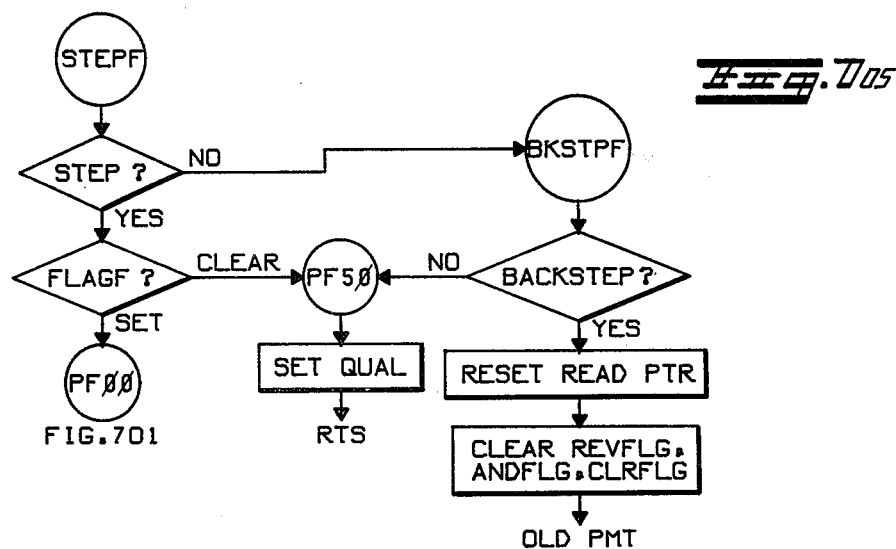
Fig. 7o5
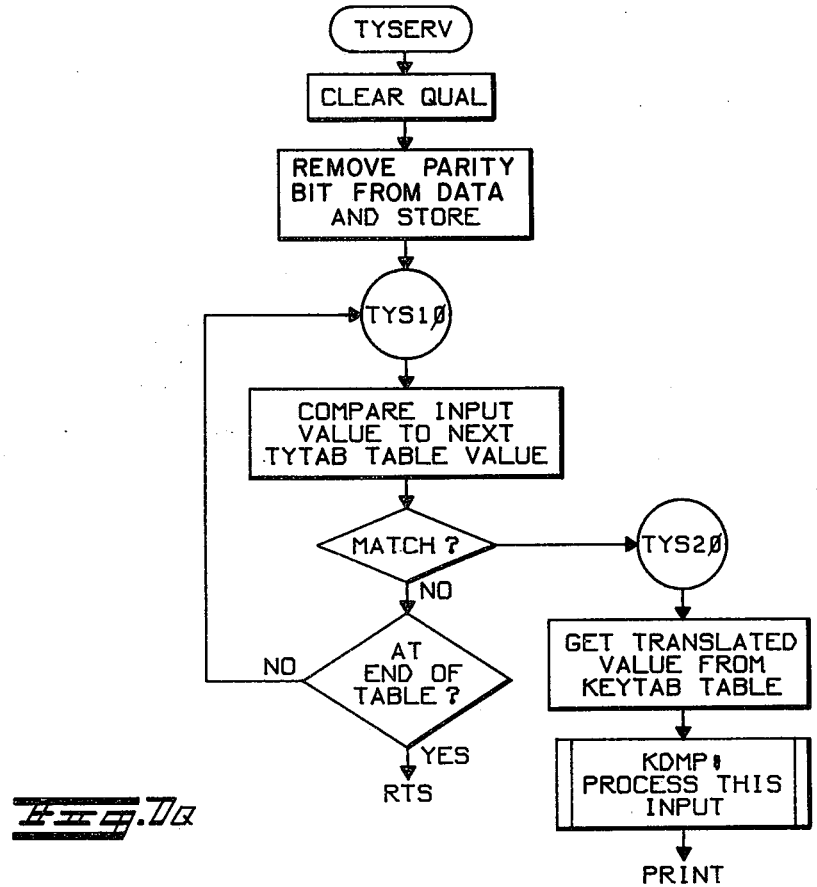
Fig. 7q

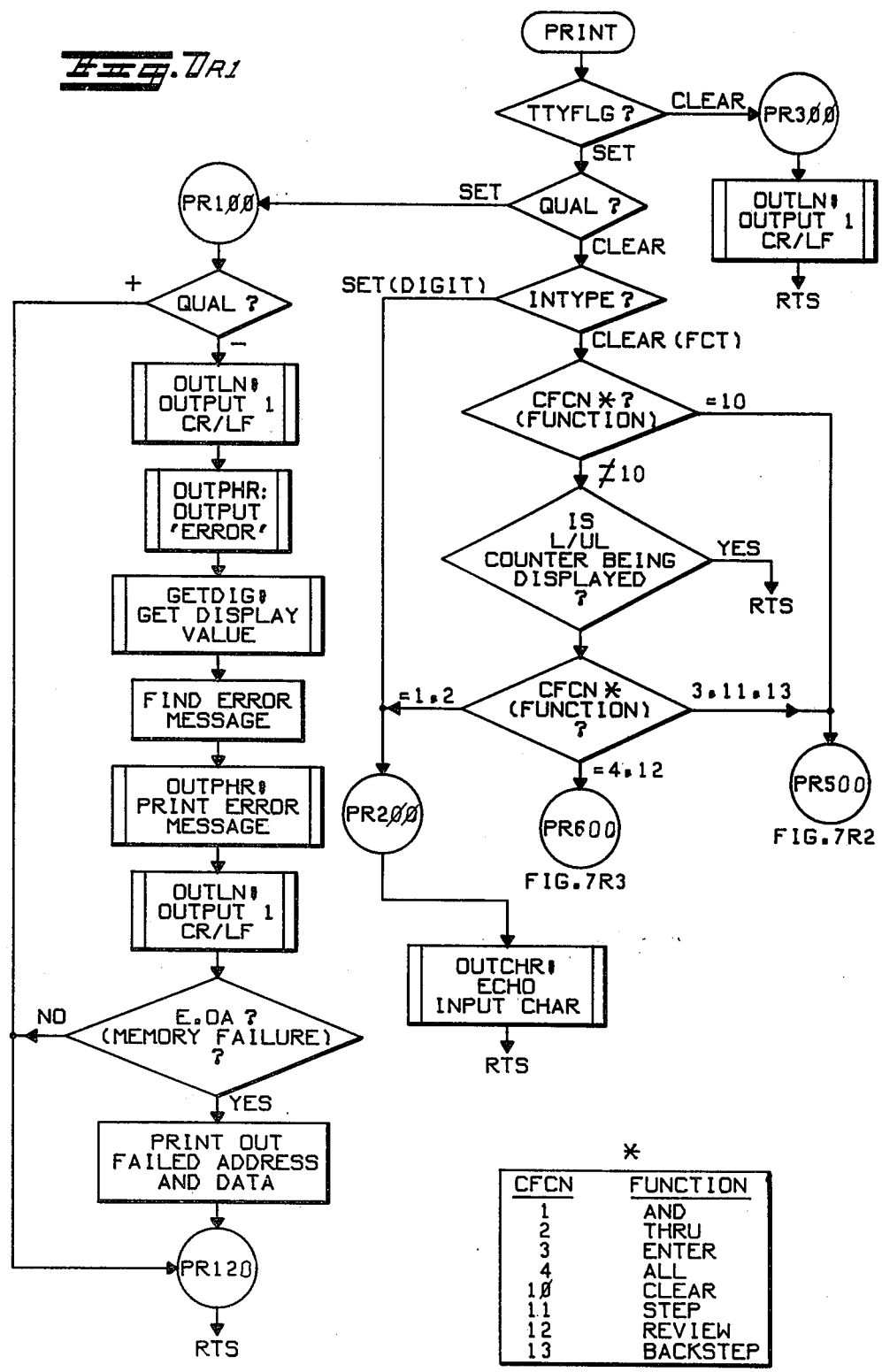

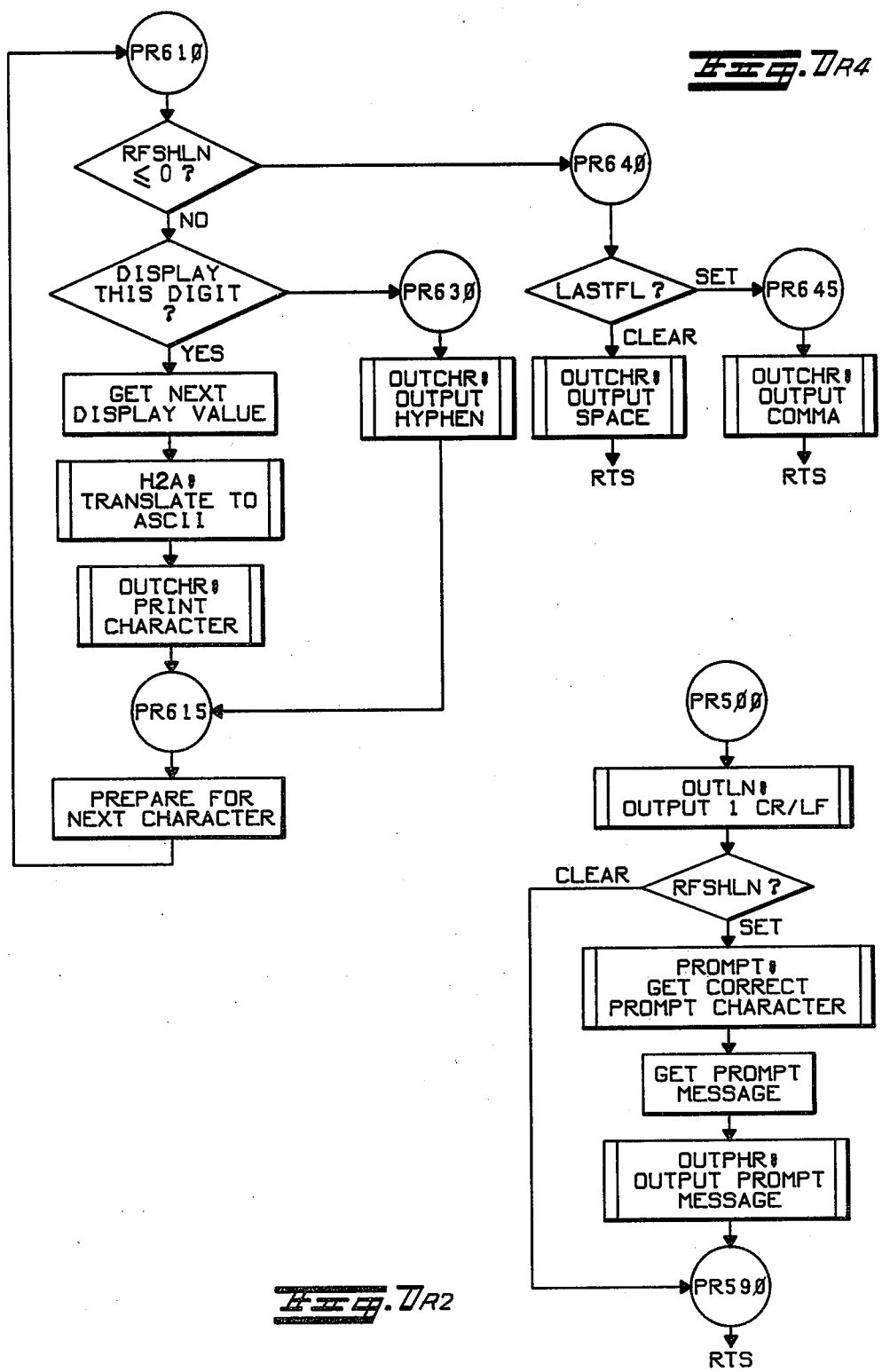

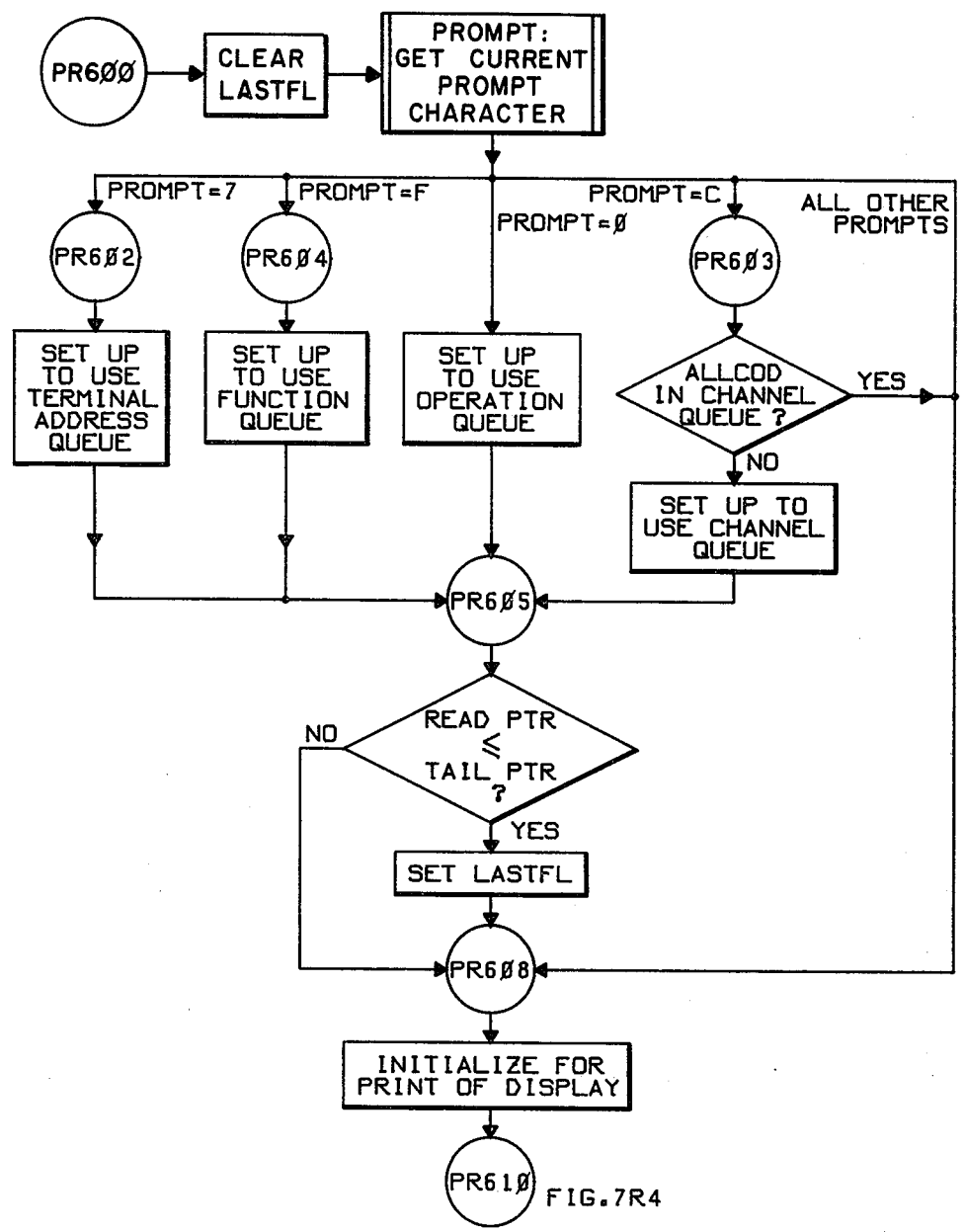
FIG. 7R3

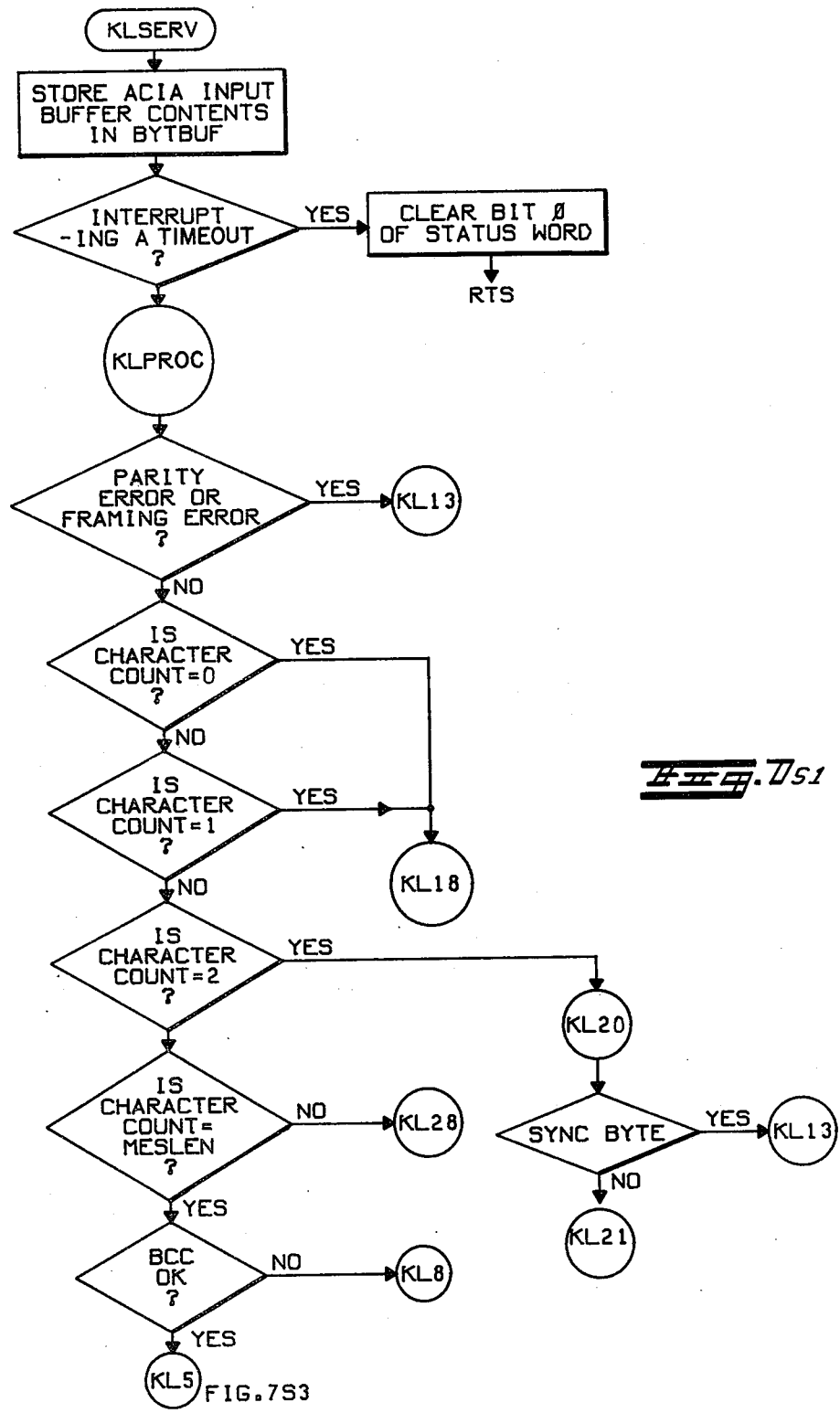

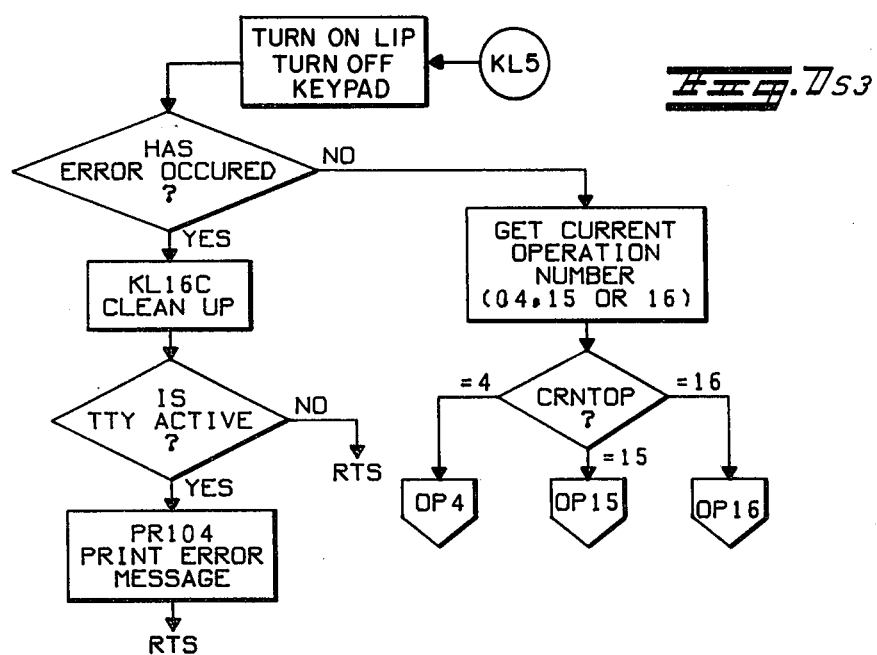
FIG.7S3
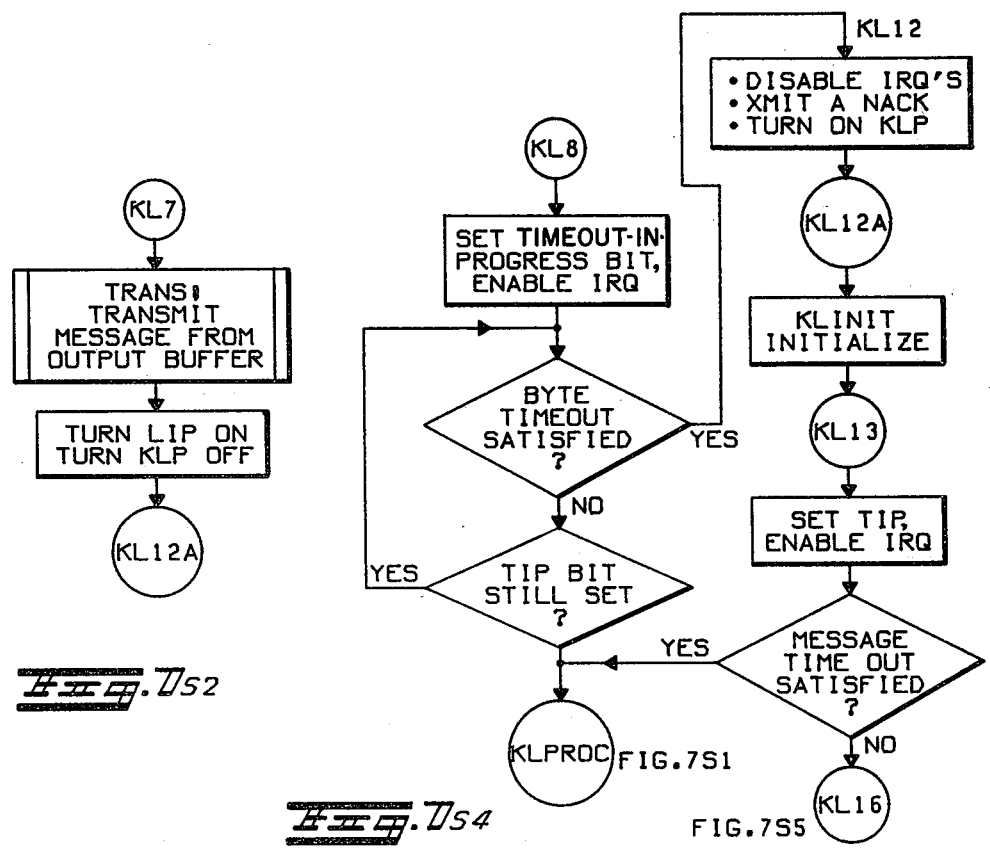
FIG.7S2
FIG.7S4
FIG.7S5

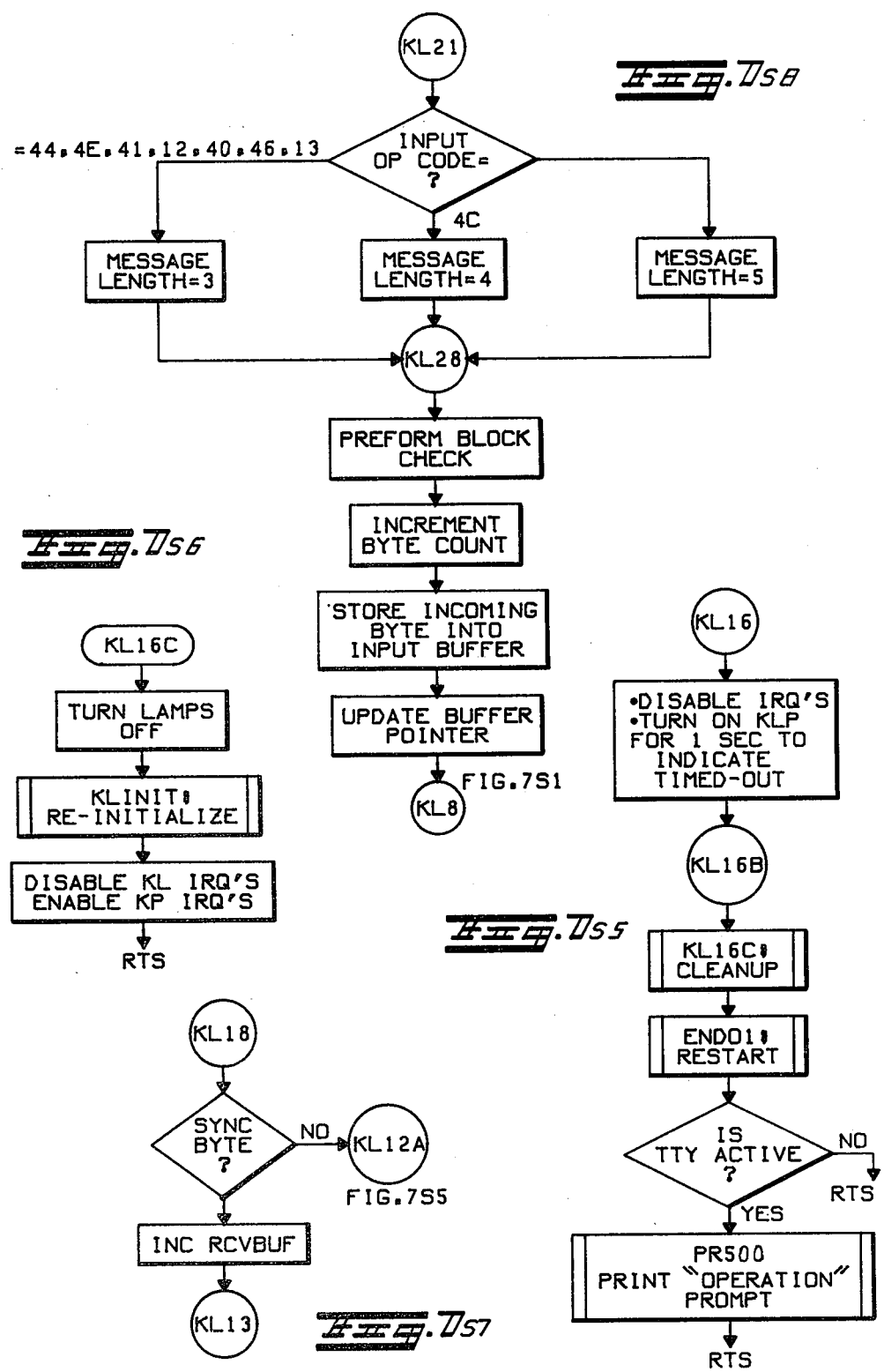

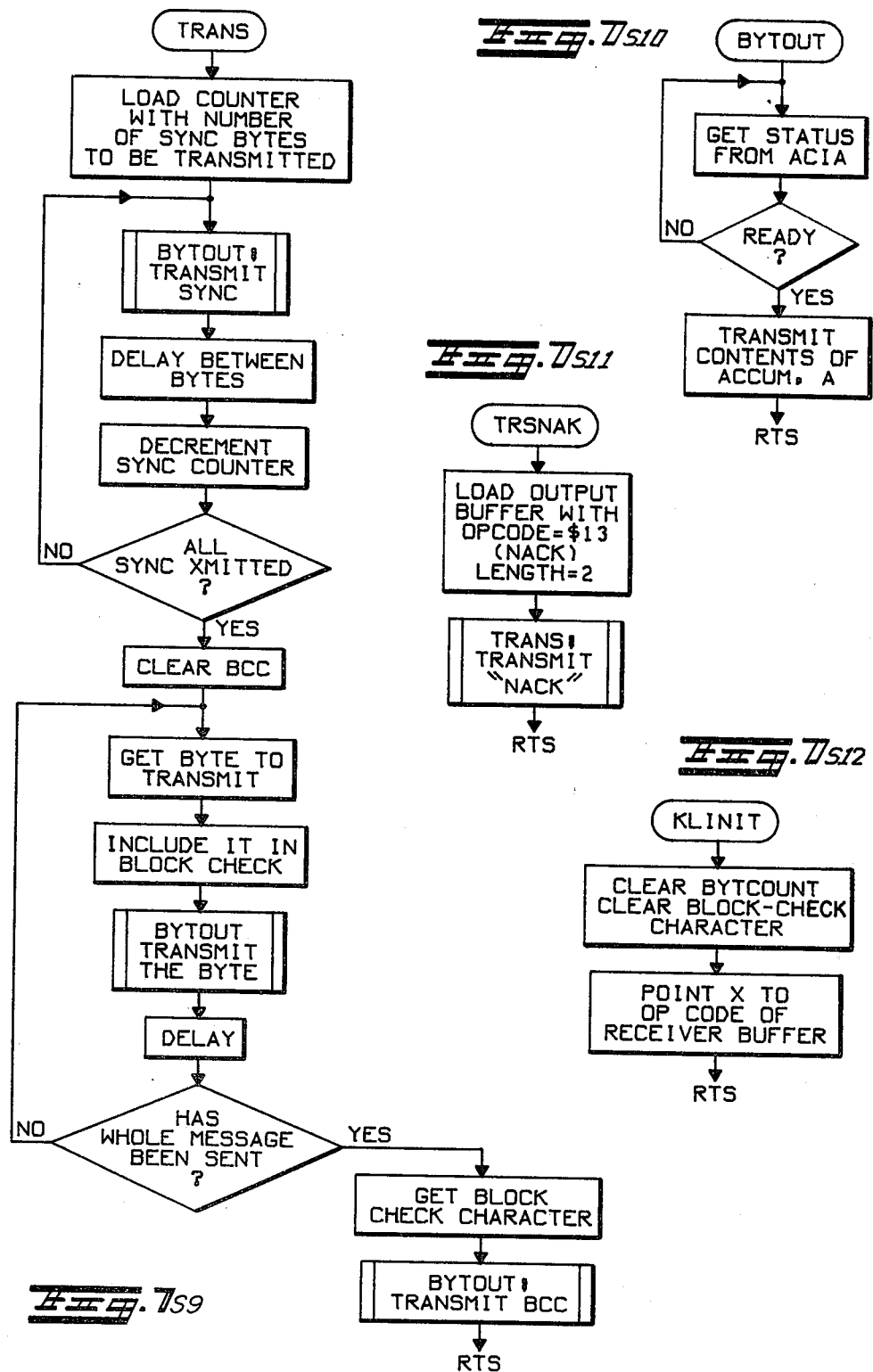

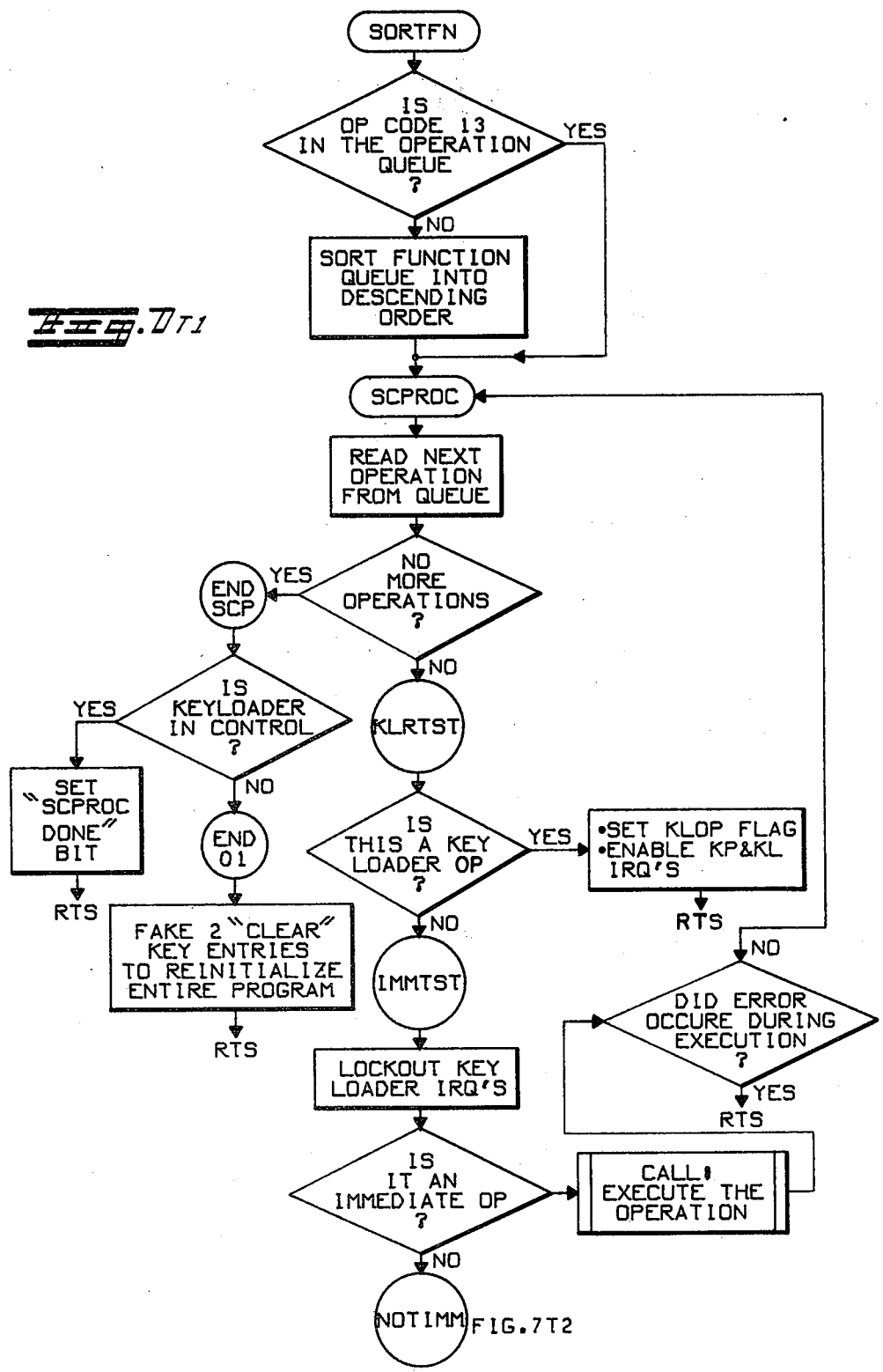

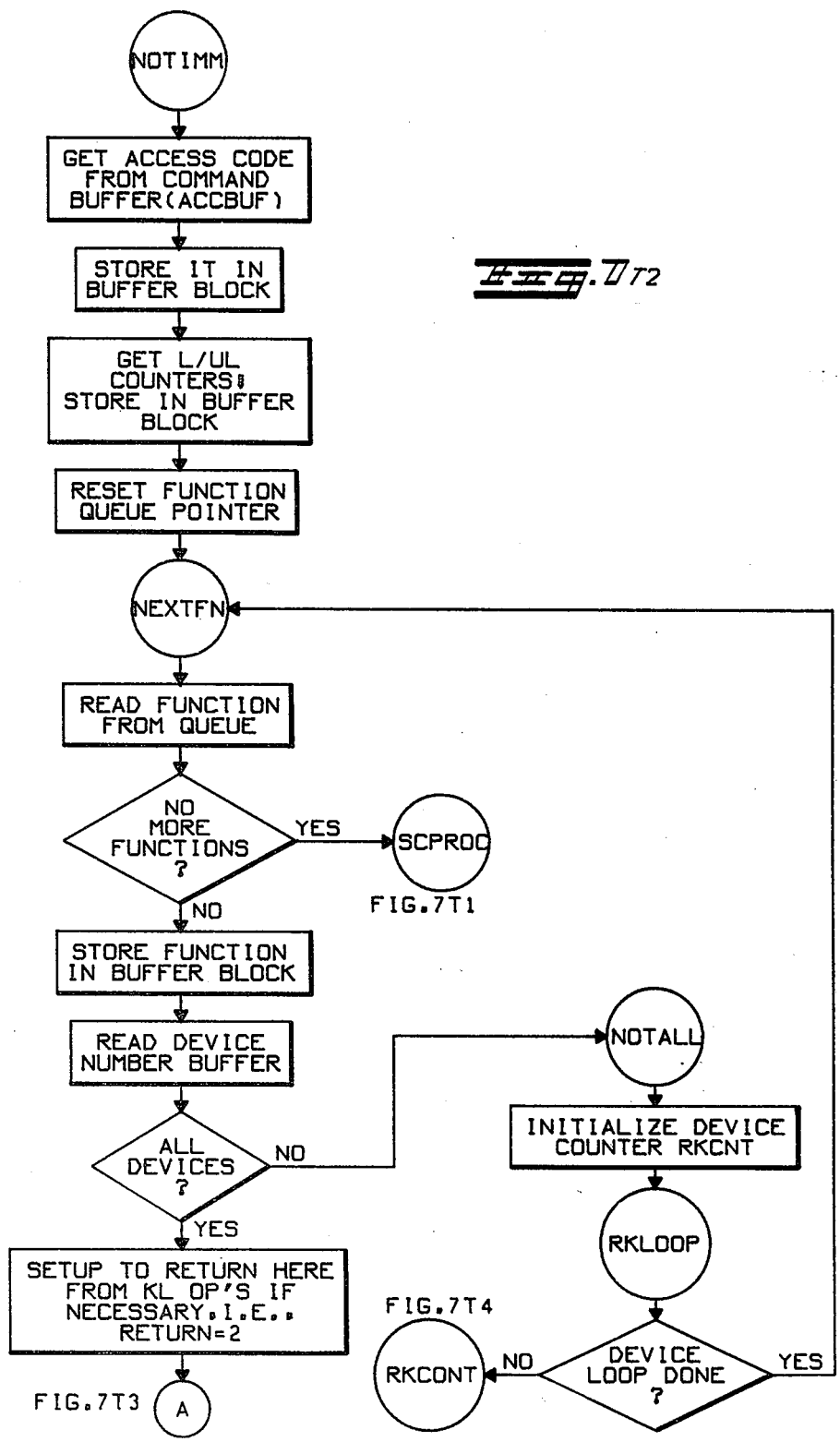

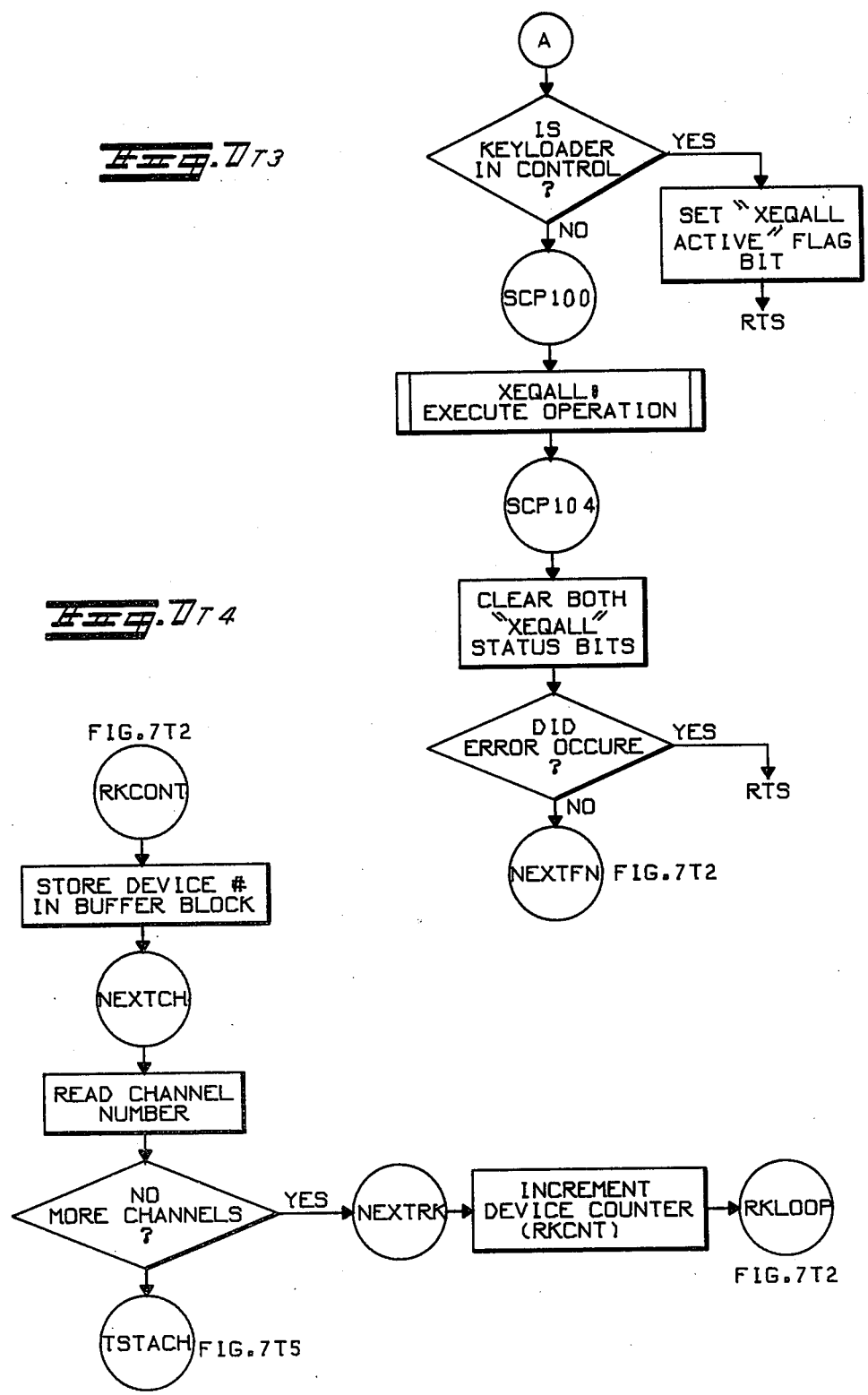

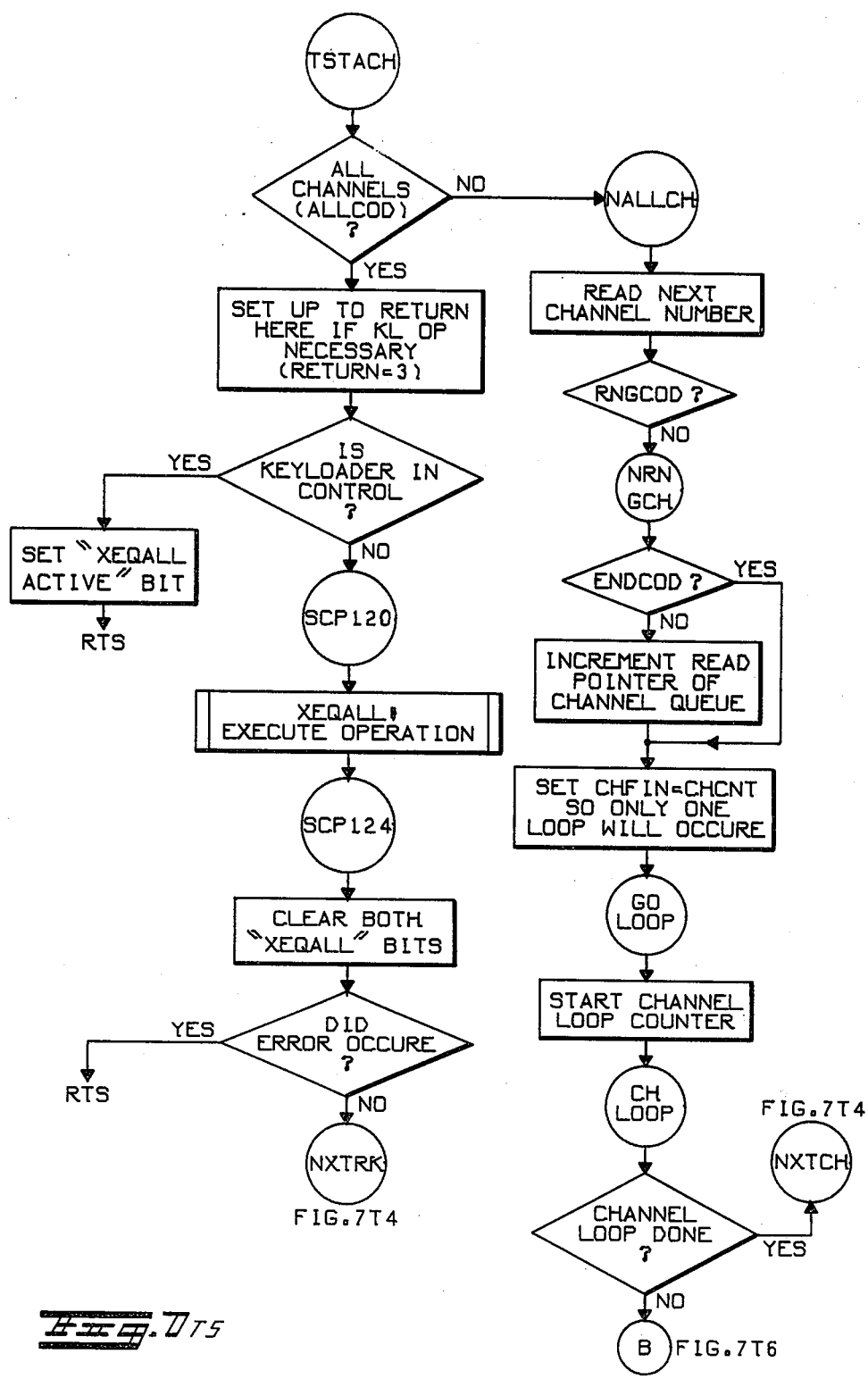

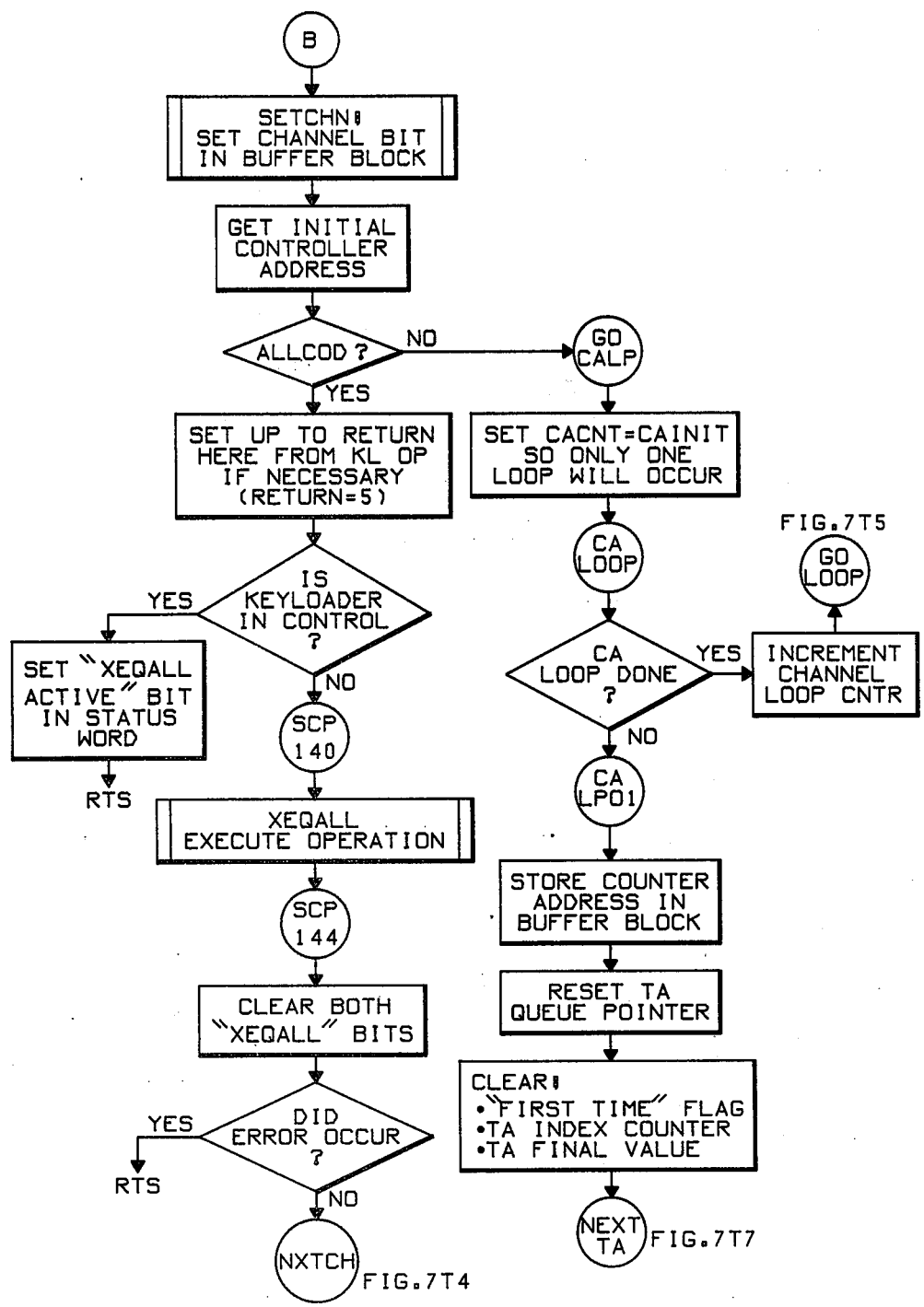
FIG.7T6

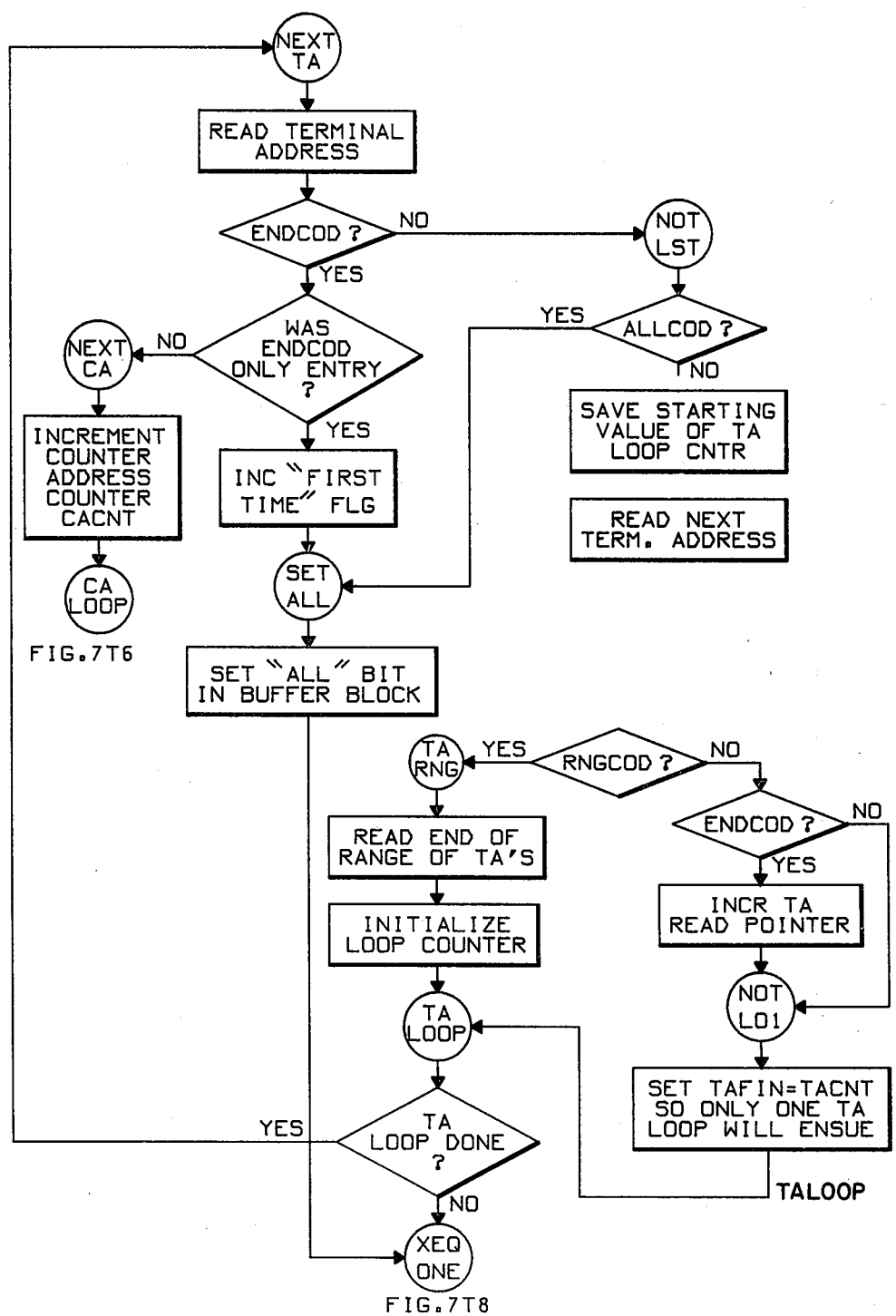

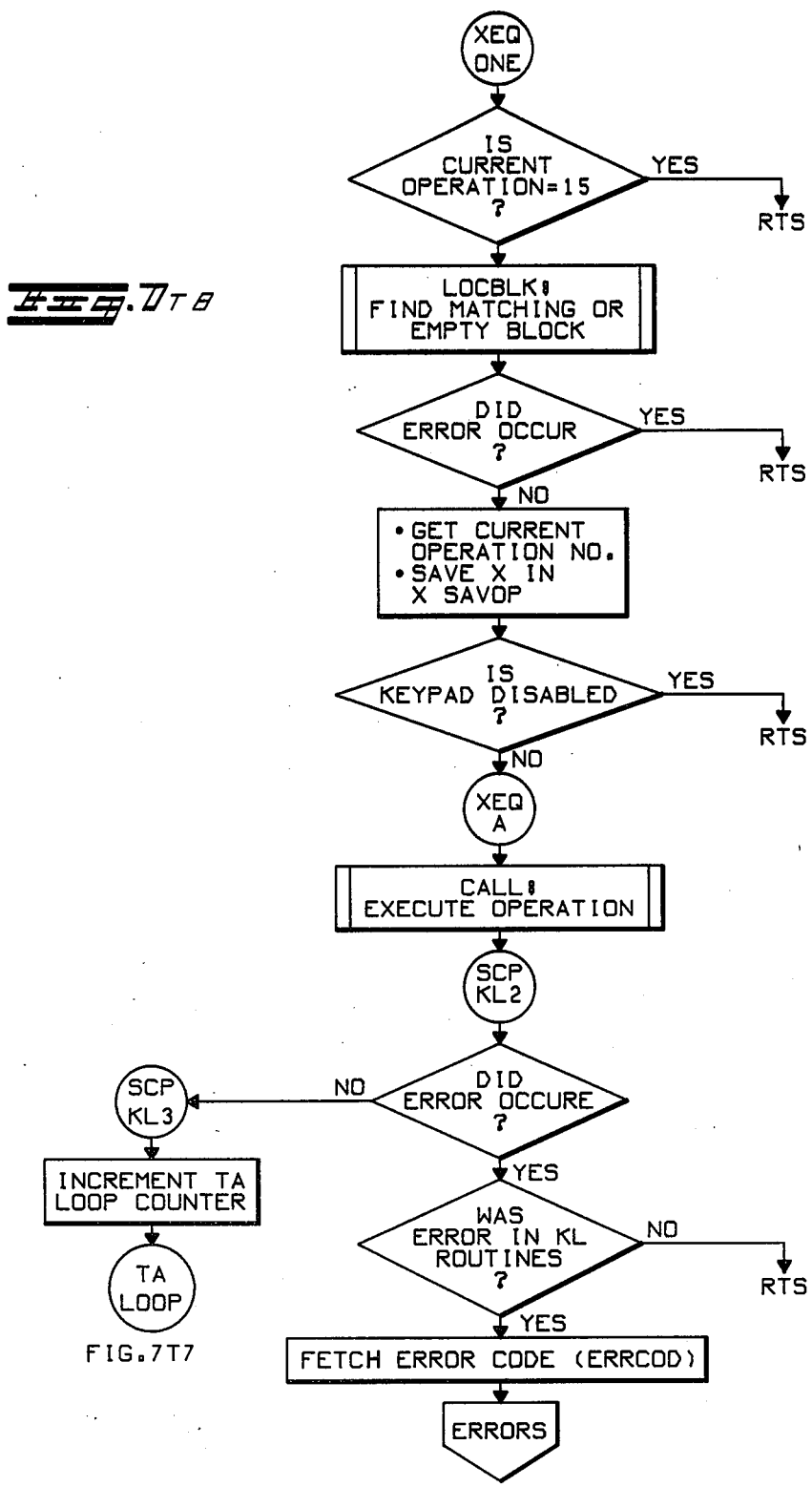

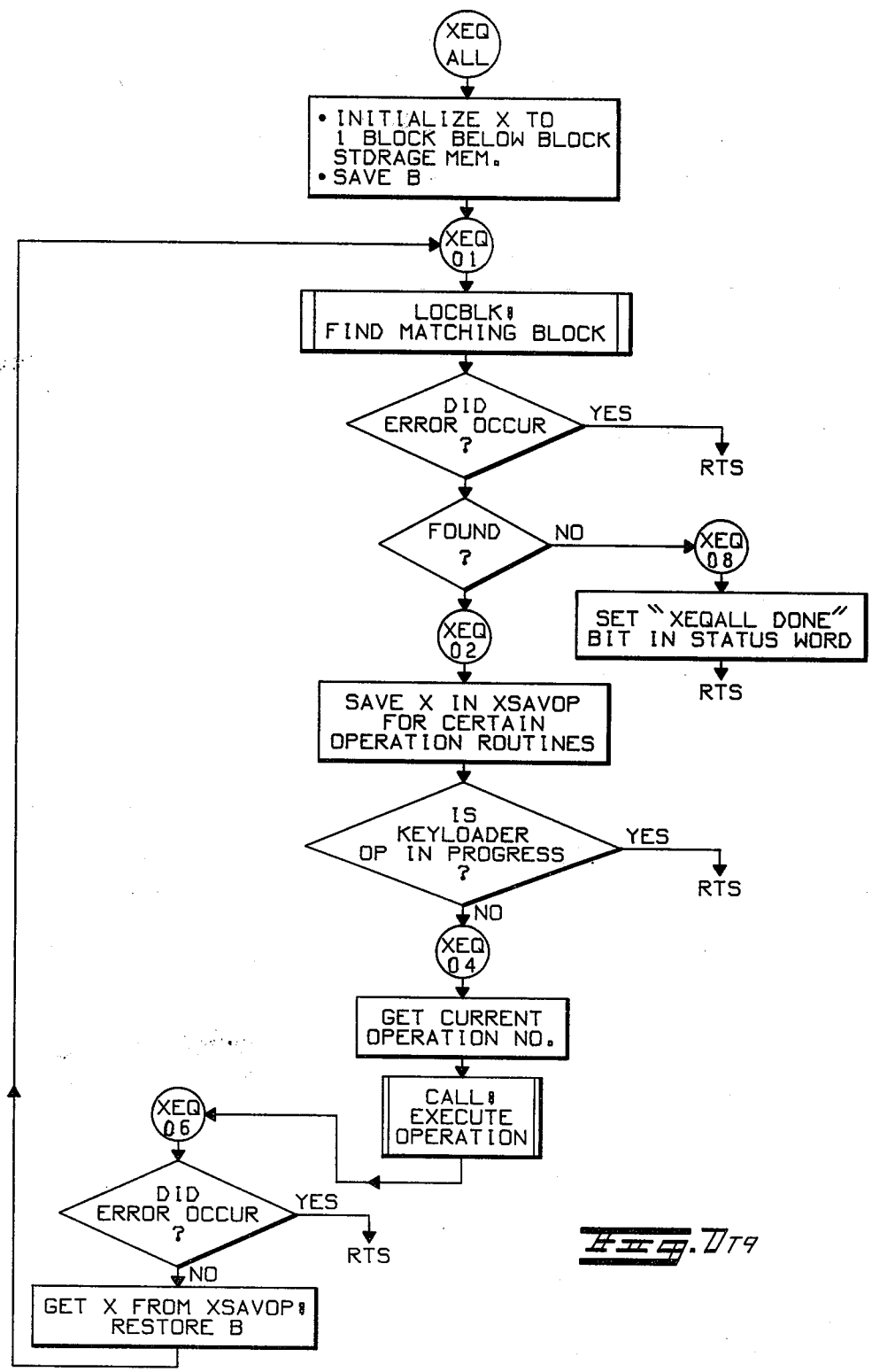

FIG.7W1

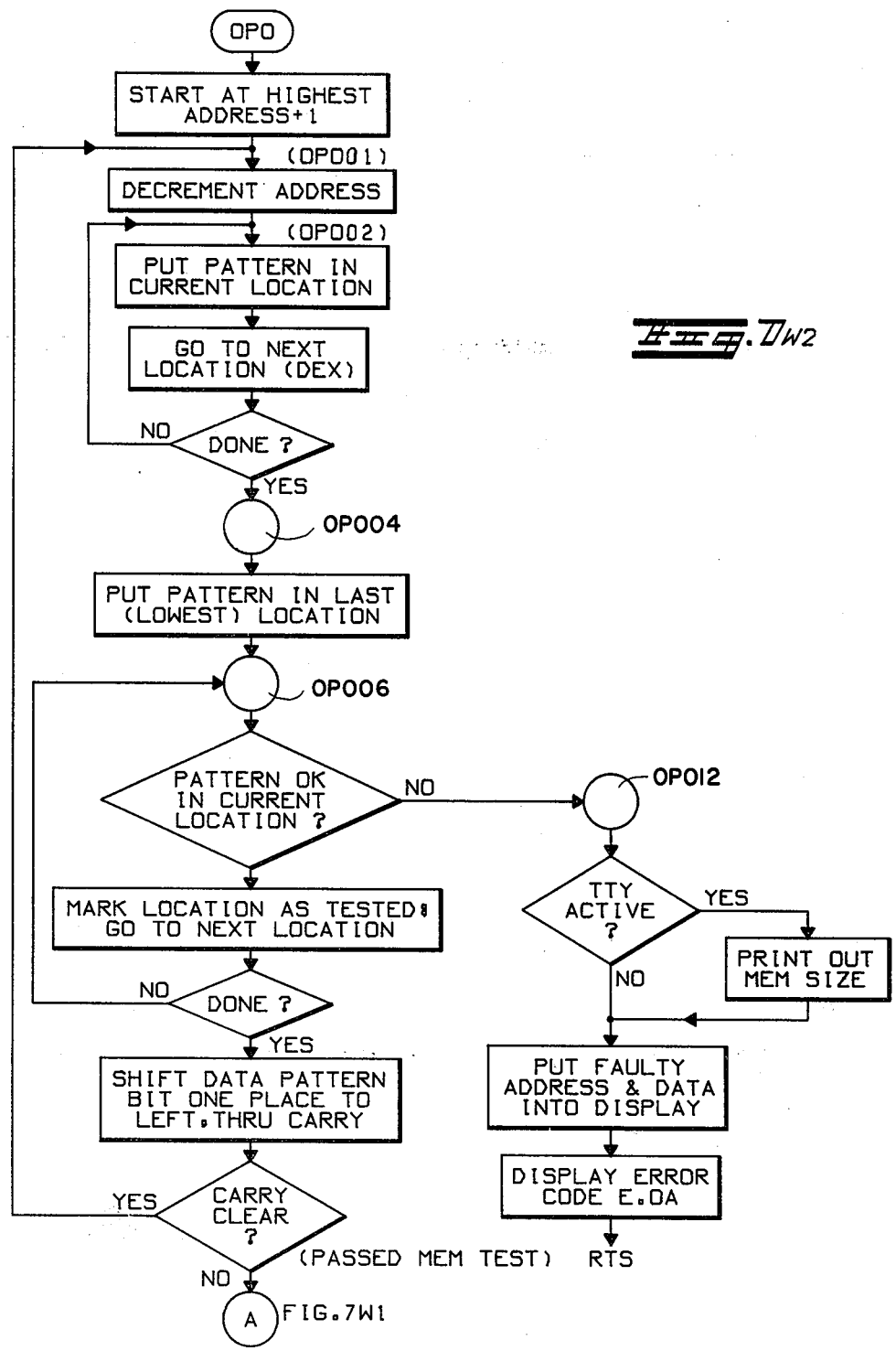
FIG.7W2

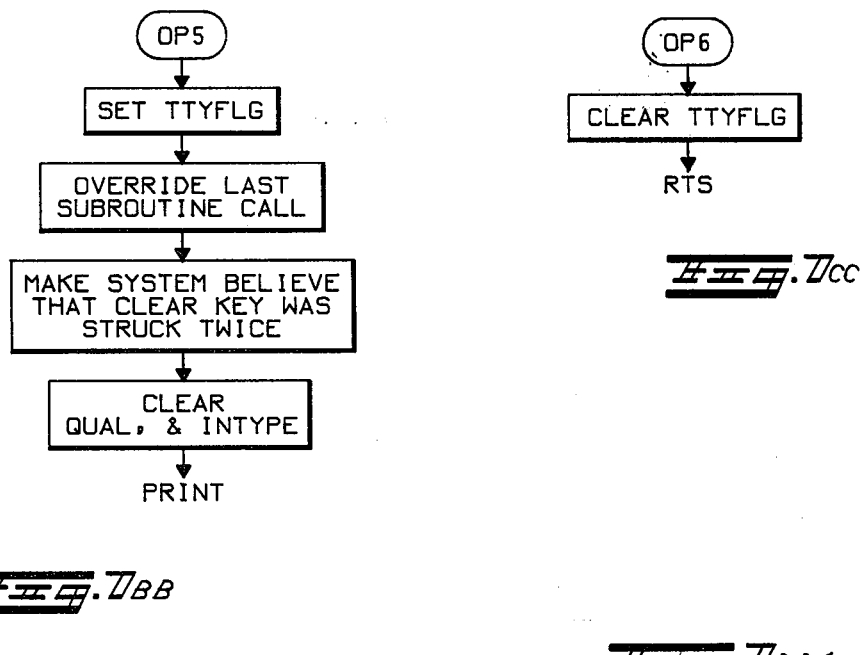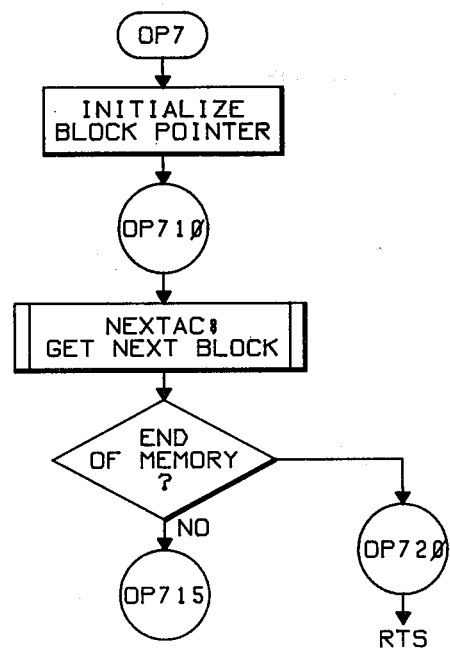

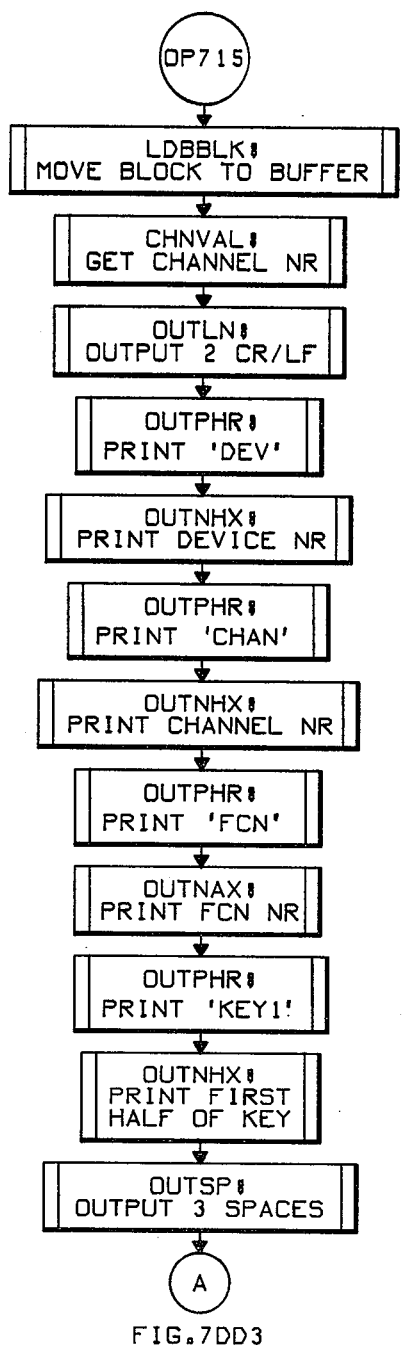
FIG.7DD2
FIG.7DD3
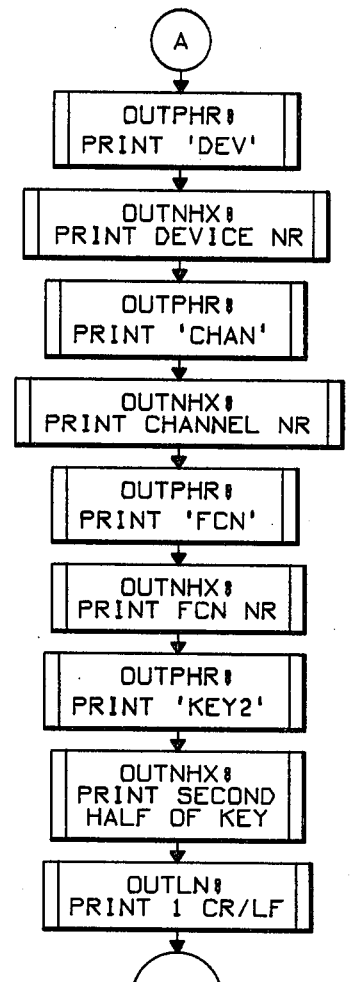
FIG.7DD1

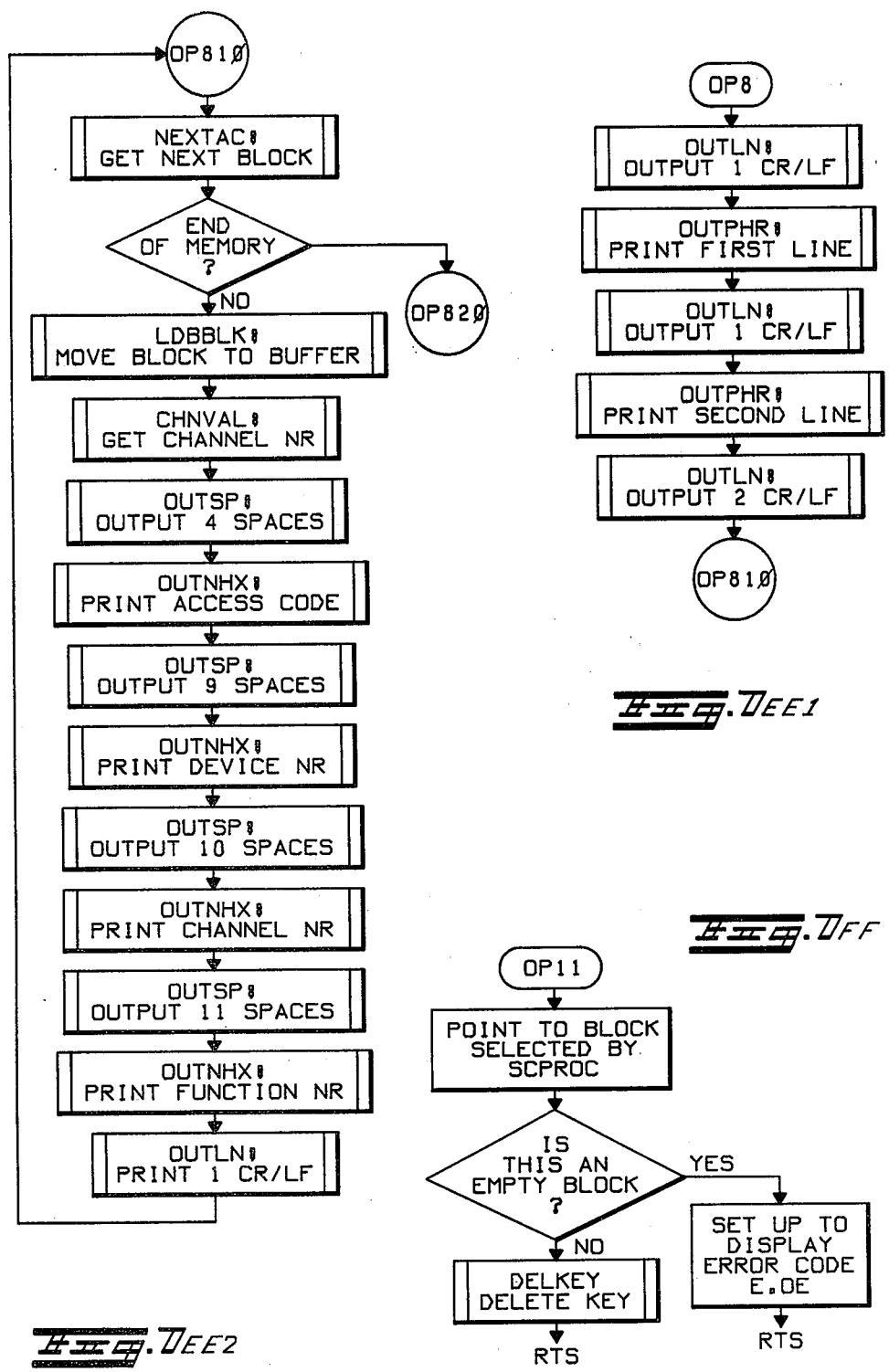

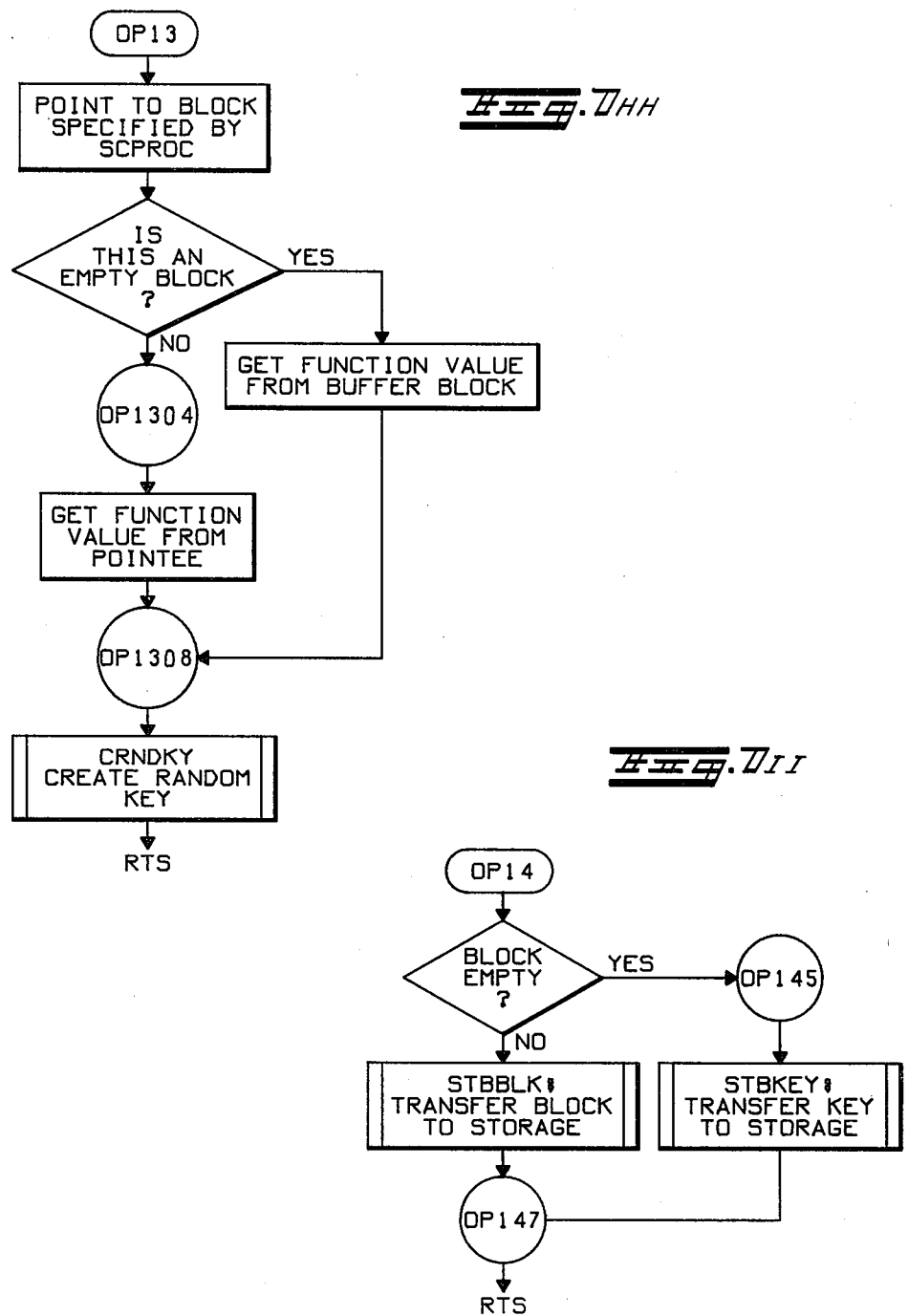

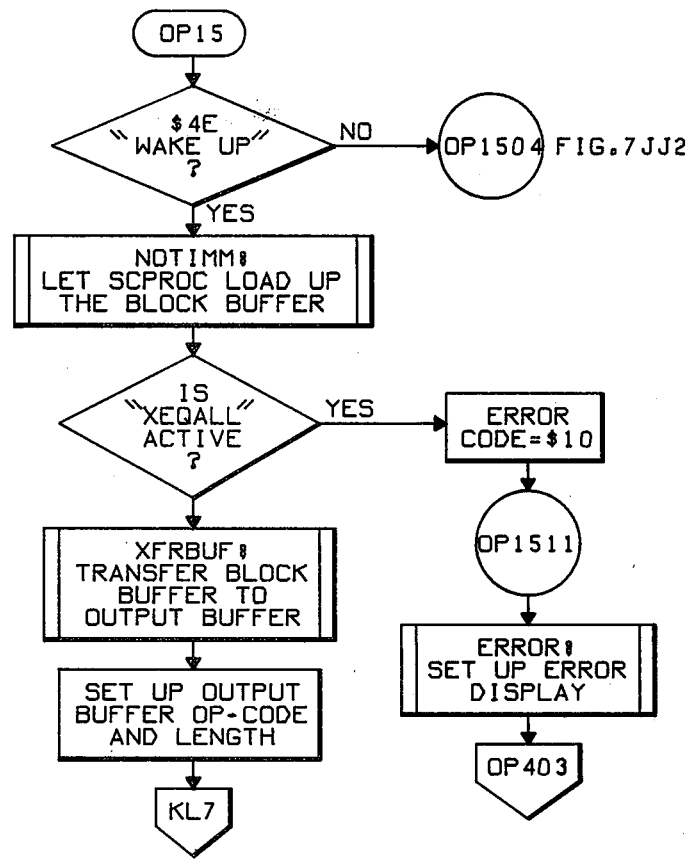

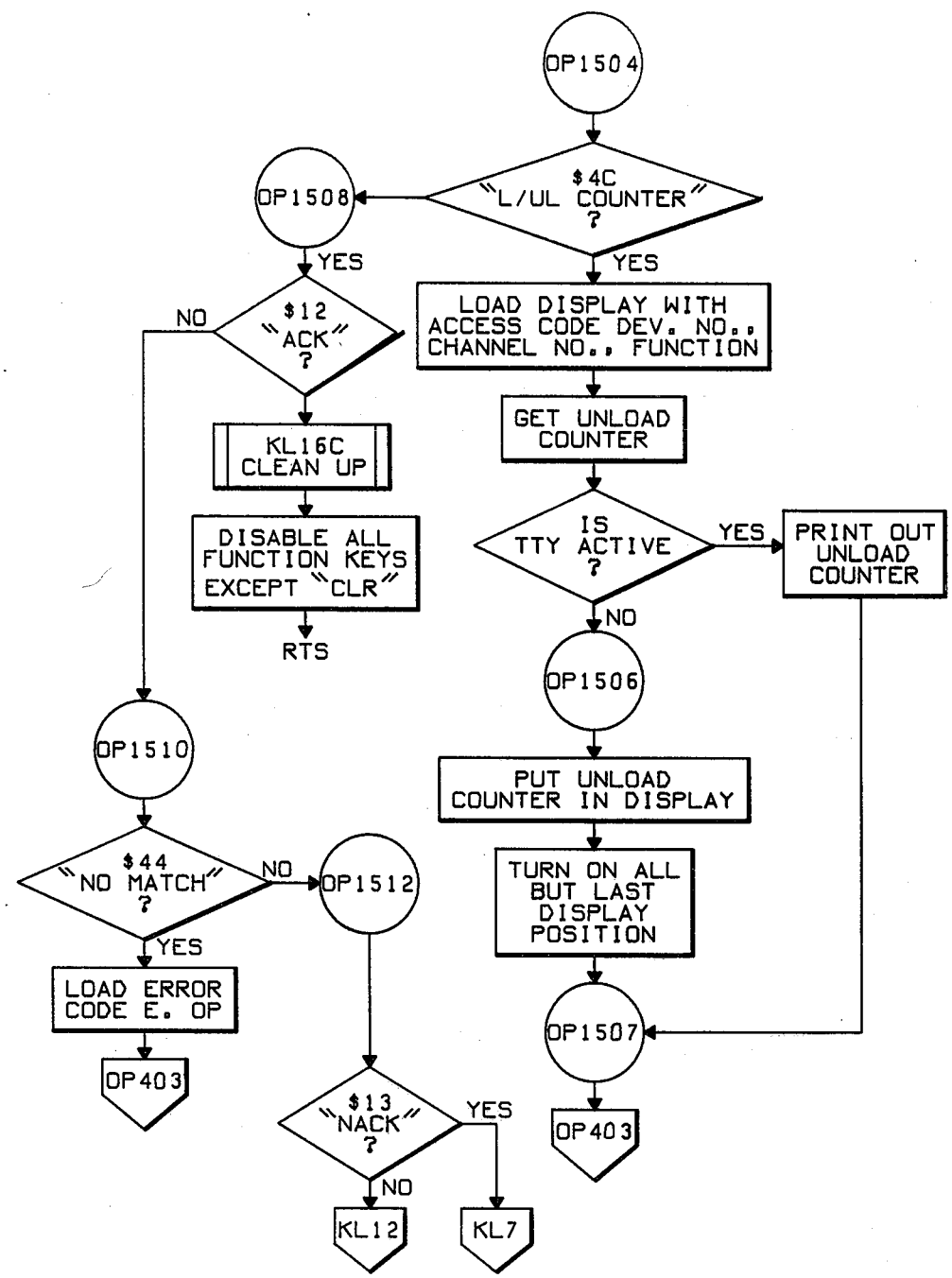
Fig. 7JJ2

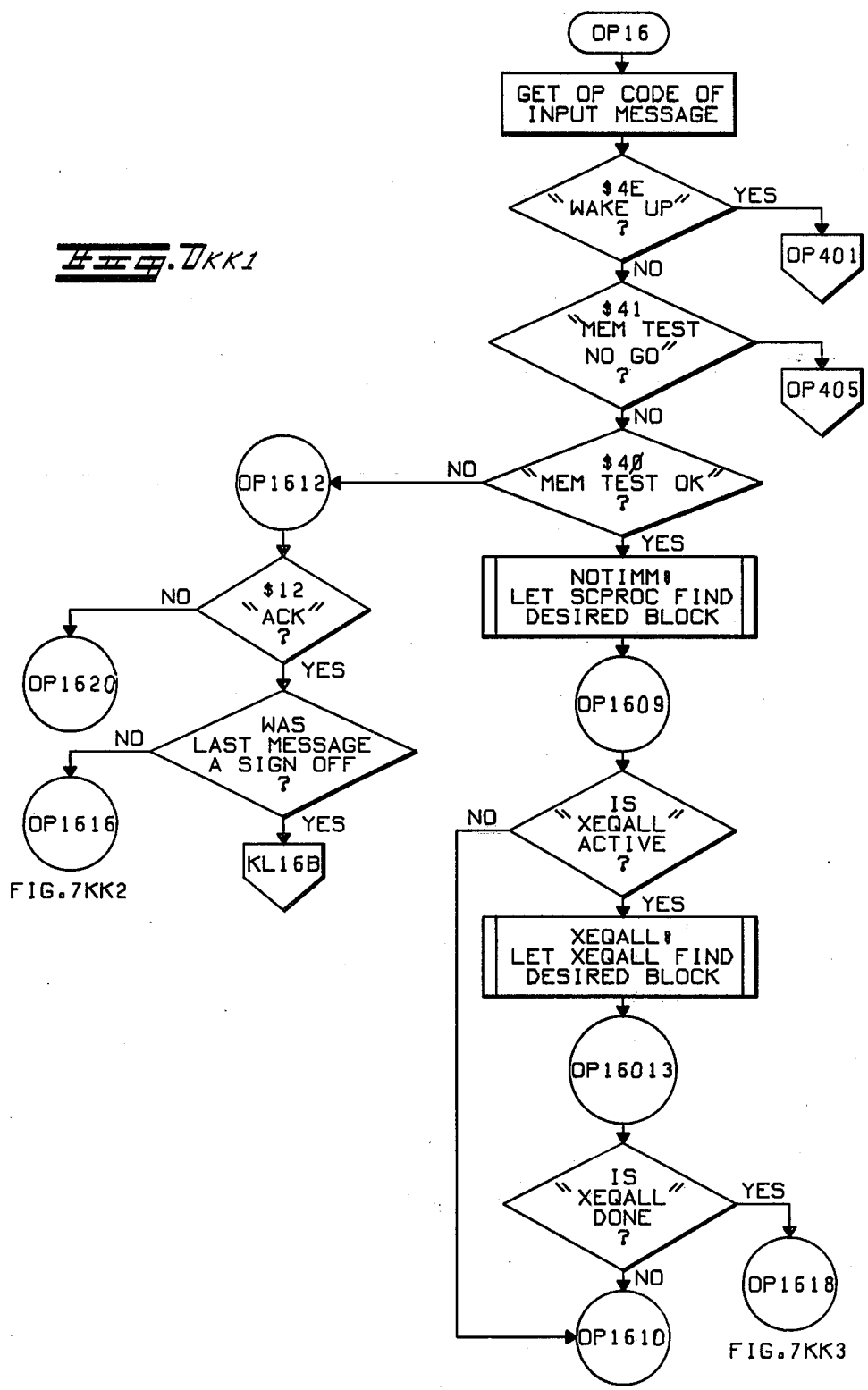

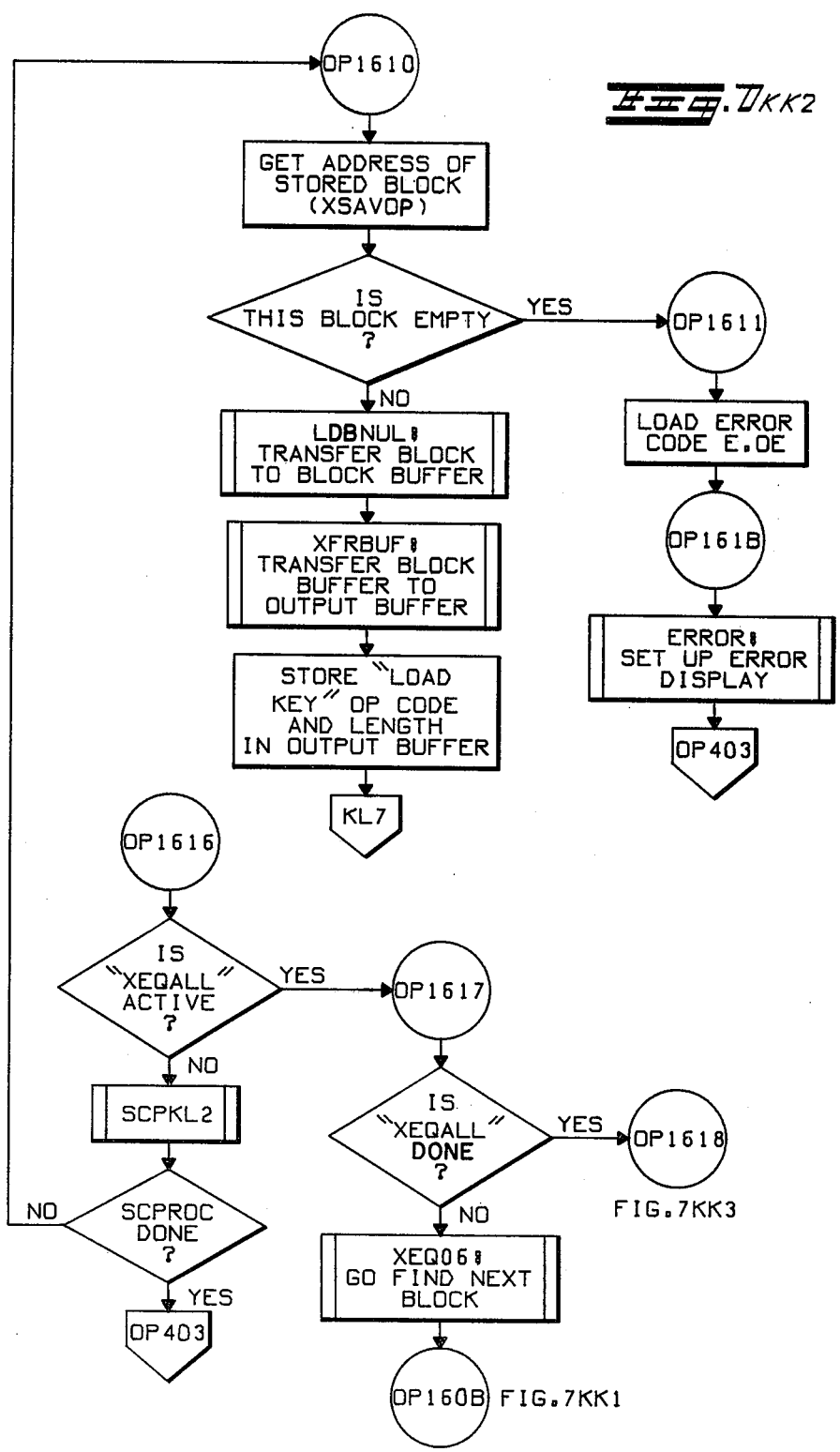
FIG.7KK2

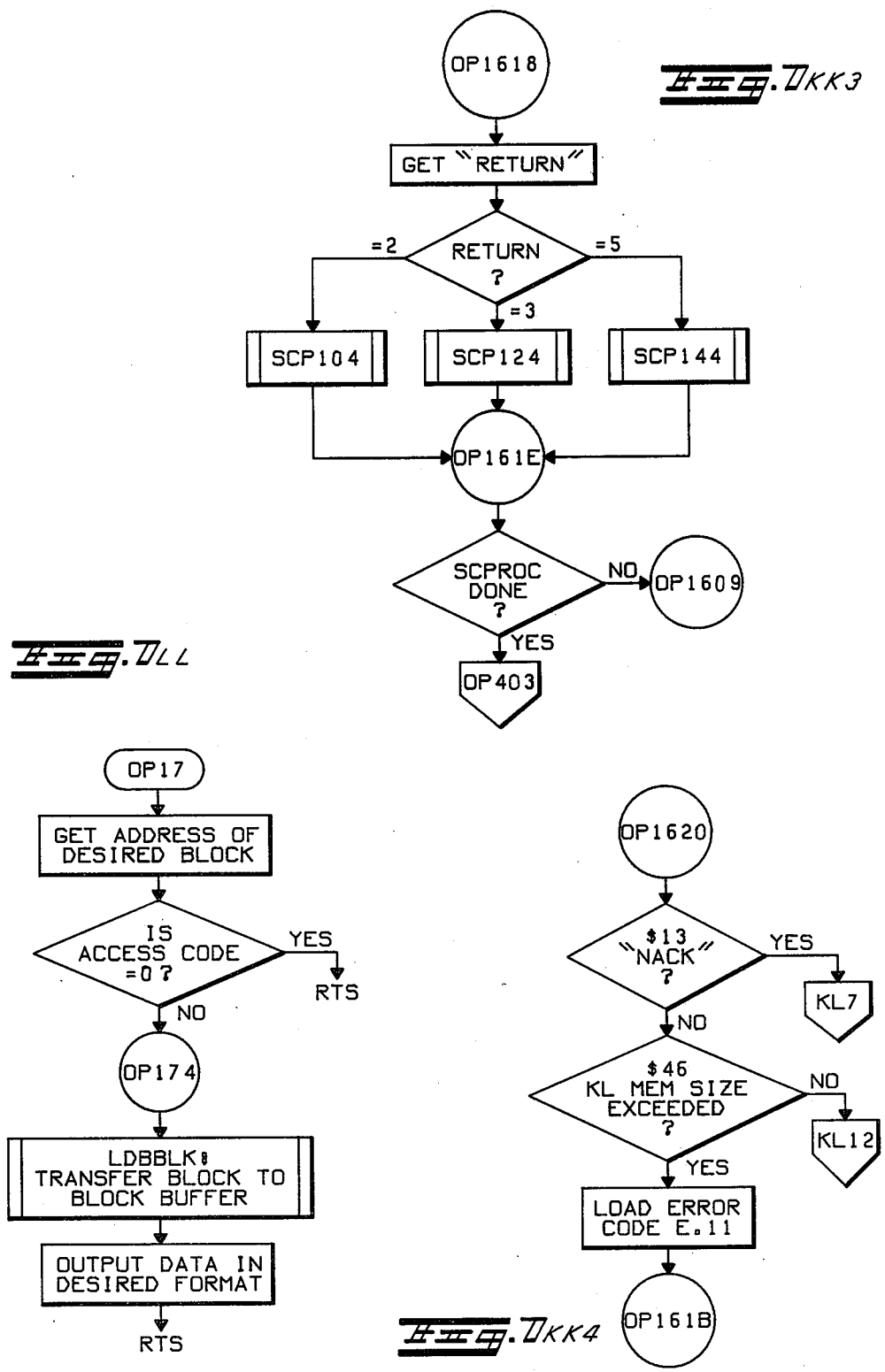

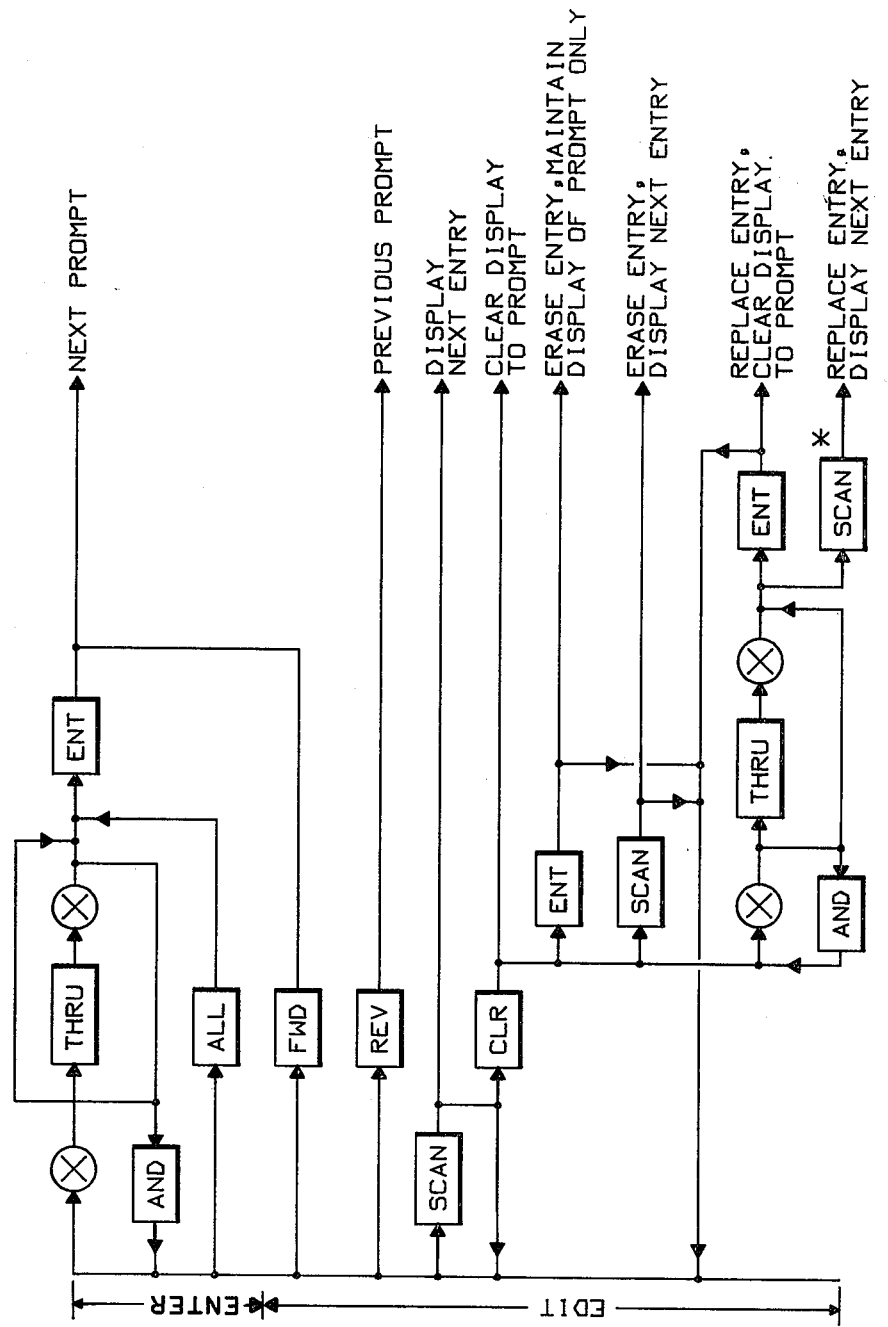

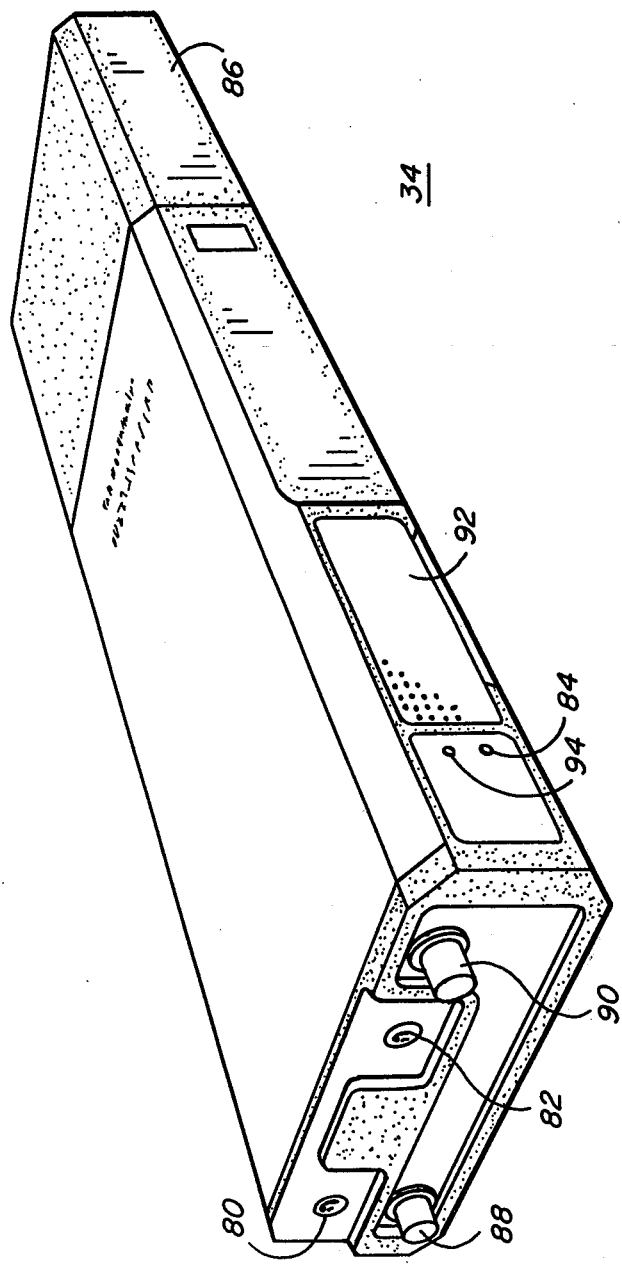

KEY MANAGEMENT FOR ENCRYPTION/DECRYPTION SYSTEMS

FIELD OF THE INVENTION

This invention relates to the generation of key words for a data encryption/decryption system, storage of the key words in a transportable storage device, and subsequent transfer of the key words from the transportable storage device to the data encryption/decryption system by means of a suitable data interface.

BACKGROUND OF THE INVENTION

In a digital data encryption/decryption system for protecting data in communication channels, such as a system utilizing the algorithm described in Federal Information Processing Standard Publication 46 and available through the National Technical Information Service, it is necessary to generate and insert a key work or words into the encryption/decryption modules which terminate the secure data communication transmission path. These modules may be in the form of separate encryption/decryption modules at the computer/transmission line interface. The security of the entire system depends upon the security of the key words from the time of generation through transportation to the encryption/decryption modules and thereafter. Such security can be breached with subsequent loss of valuable data and/or unauthorized computer access resulting in monetary loss of one sort or another to the computer system owner or user. It is therefore desirable that a secure system for generating, transporting and holding of key words be made available to the data processing industry.

SUMMARY OF THE INVENTION

It is therefore an object of the instant invention to provide a secure method and mechanism for generating, transporting and using key words in a secure data transmission system.

According to one aspect of the invention, a key word or words are generated by an electronic generating module under command of an operator with no human having a knowledge of the identity of the key words so generated.

According to another aspect of the invention, at least one key word is electronically transferred to a transportation module from a generating module without knowledge of the identity of the key word by any human.

According to still another aspect of the invention, key words are electronically transferred from a transportation module to an encryption/decryption module without human knowledge of the identity of the key words.

According to yet another aspect of the invention, key words transferred from a transportation module to an encryption/decryption module are simultaneously destroyed in the transportation module thereby lending an additional level of security to the data transmission system.

According to a further aspect of the invention, access to key words in the system modules is restricted to persons having access authority; non-authorized access causes destruction of the key word in storage.

According to a still further aspect of the invention, a transportation module may be securely shipped by means of a non-secure carrier since access to the key word or words therein is destructive of that information.

These and other aspects and objects of the invention are obtained by means of an electronic random key word generator, a transportation module and encryption/decryption modules, all part of the system of the invention; the system of the invention being more readily understood upon reading of the Detailed Description of the Invention, which follows, together with the drawings, in which:

FIG. 1 is a block diagram of a preferred embodiment of the invention illustrating generation and transportation of major cipher key words;

FIG. 2 is a perspective view of the cipher key generator of the invention with keyboard exposed;

FIG. 3 is a block diagram of the key generator of FIGS. 1 and 2;

Figures 7A, 7B:
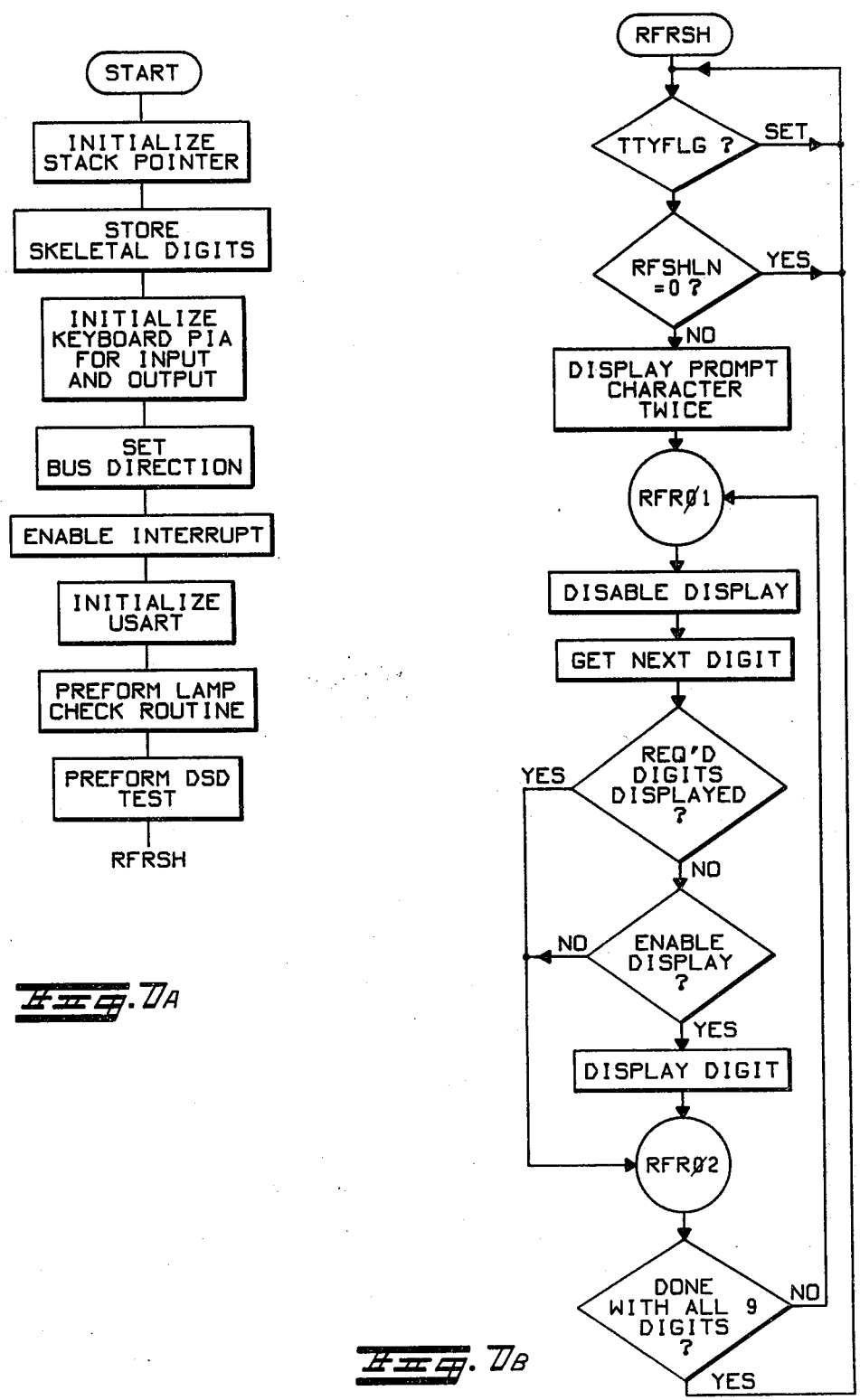
Figure 7U:
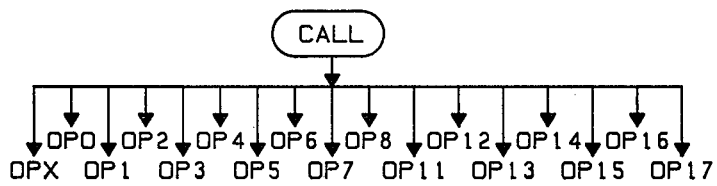
Figure 7V:
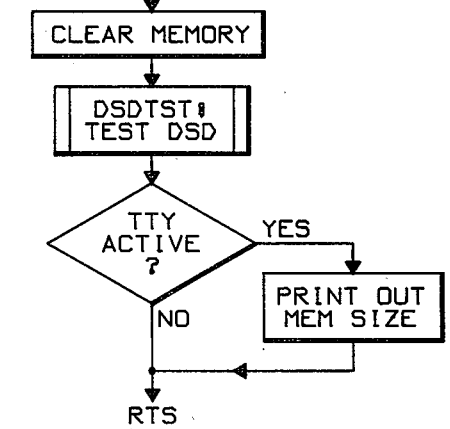
Figure 7X:
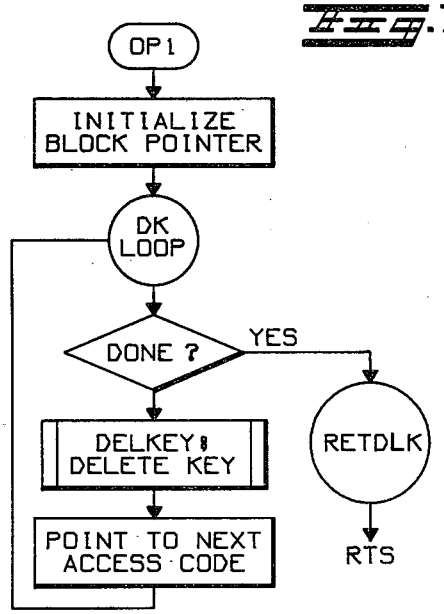
Figure 7Y:
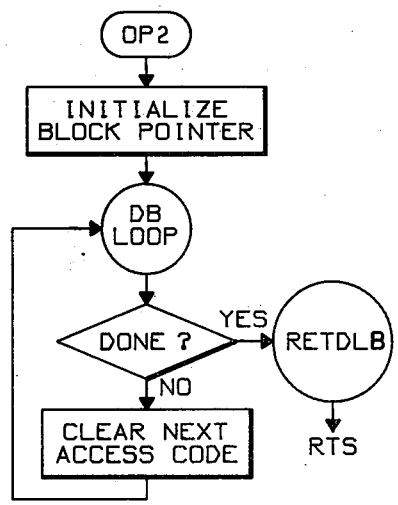
Figure 7Z:
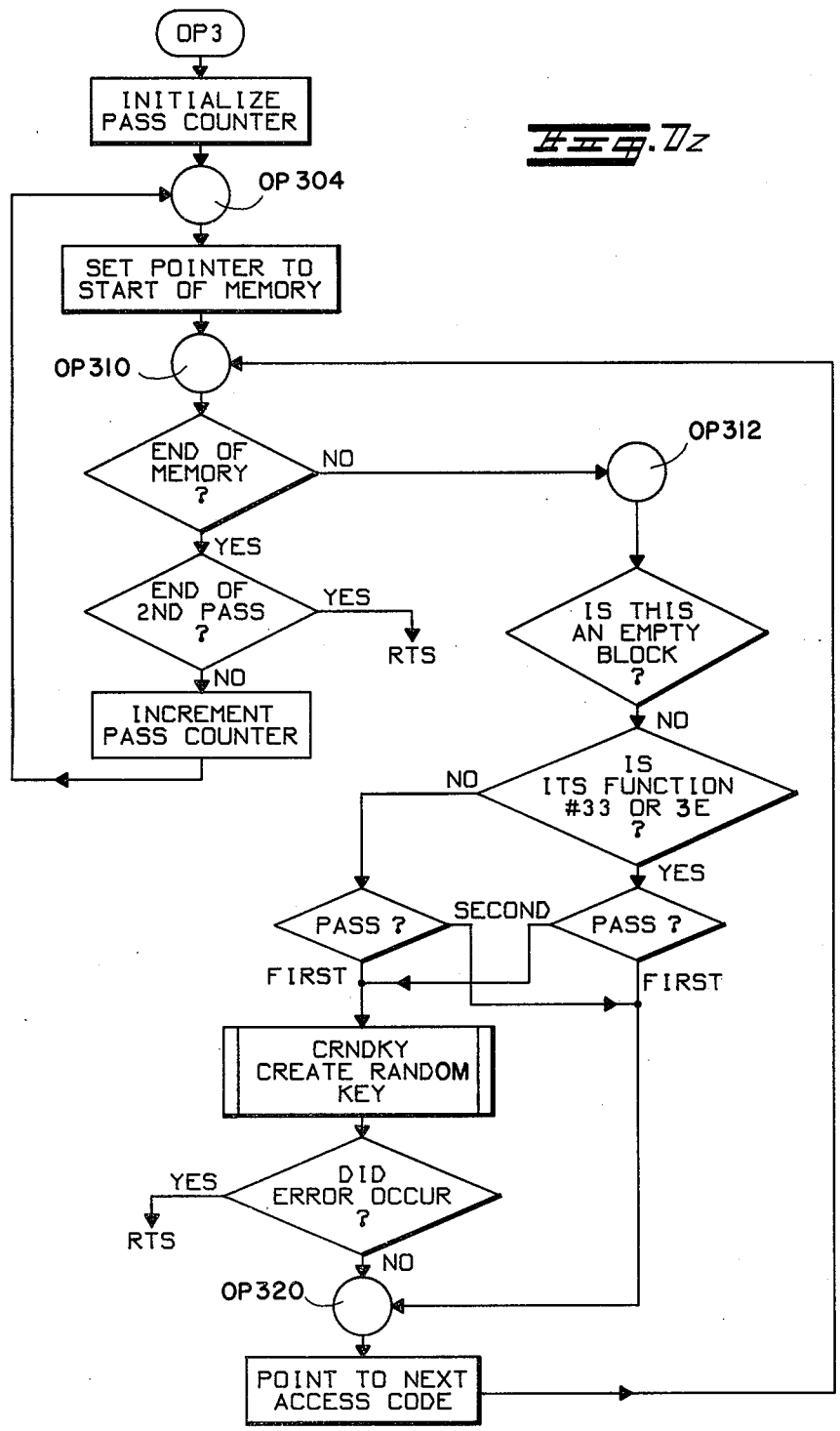
Figure 7A:
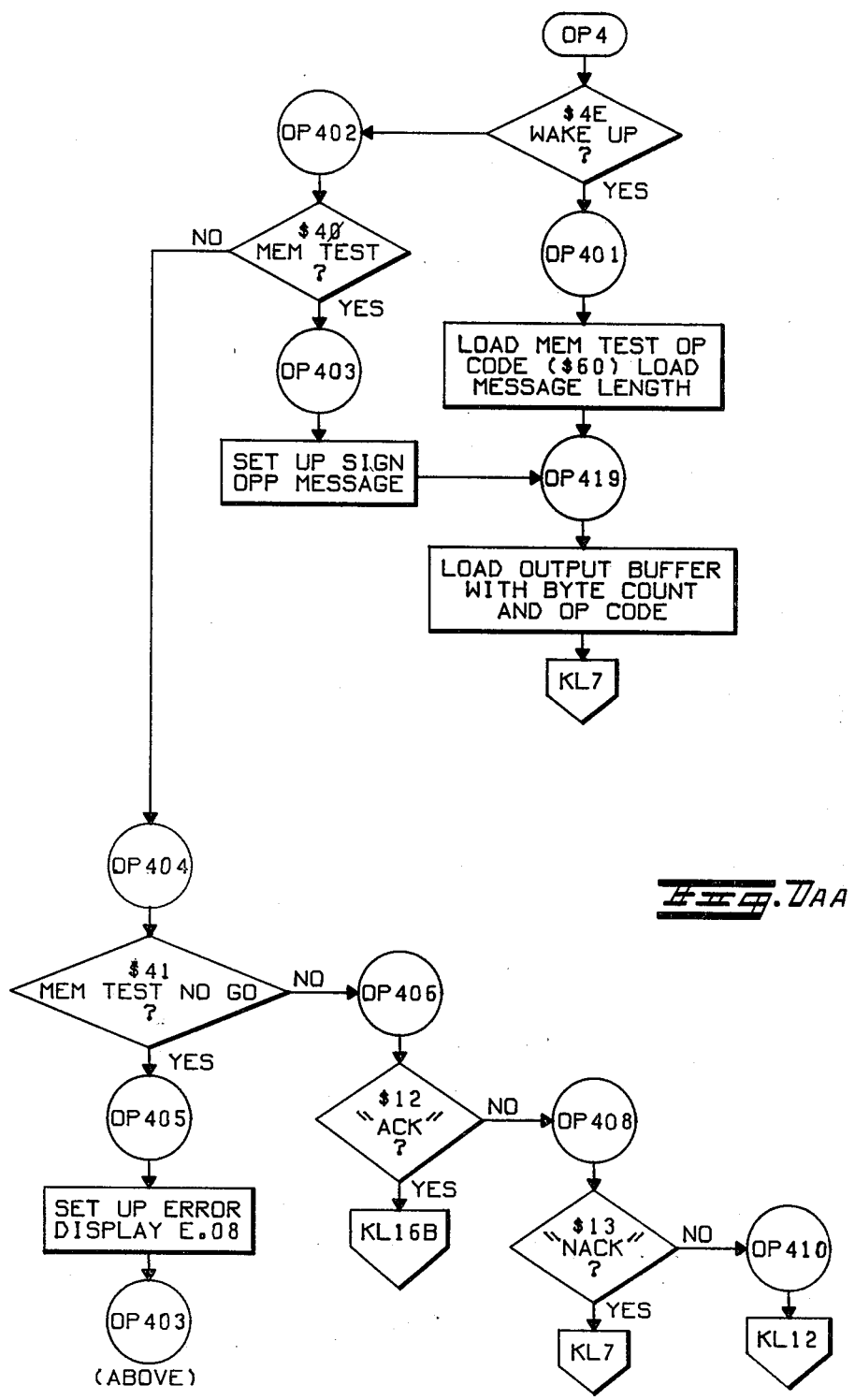

FIGS. 7A through 7NN are detailed flow diagrams of the keyboard entry routine;

FIG. 8 is a flow diagram of the general data entry/edit scheme for the system of the invention;

FIG. 9 is a perspective view of the key loader module of FIG. 1; and

Figure 10:
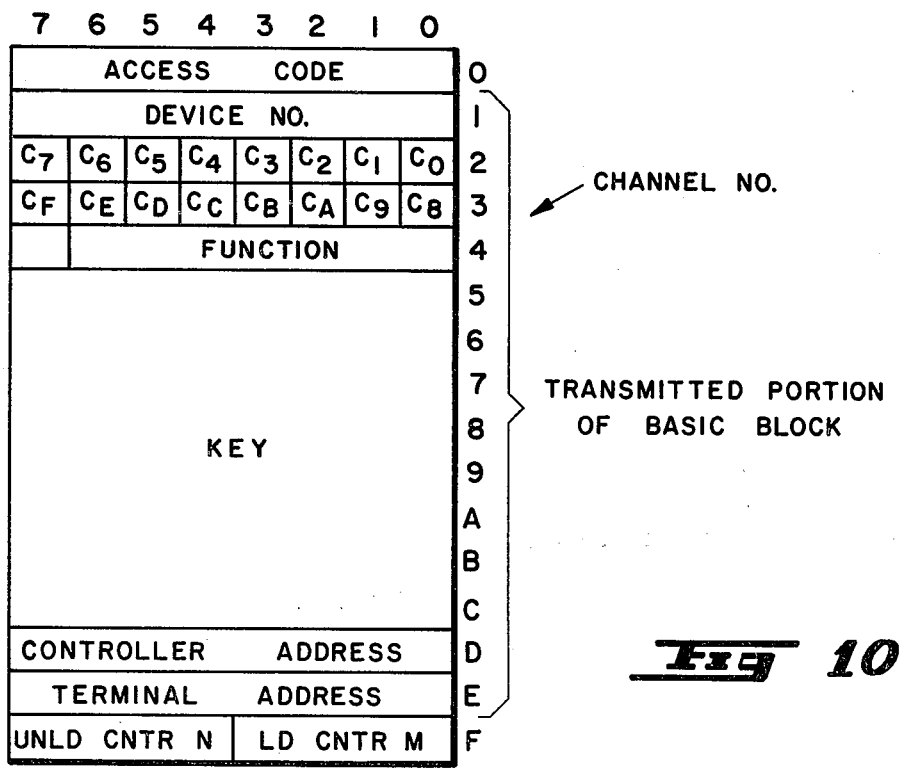

FIG. 10 is a table showing the format of data loaded into the key loader of FIGS. 1 and 9.

DETAILED DESCRIPTION OF THE INVENTION

The cipher key management system of the invention comprises key generator 32, key loader 34 and one or more security modules 22, 24. Refer, for example, to FIG. 1. Data transmission system 30 comprises computer 20, security modules 22 and 24 interconnected by data line 26 and remote terminal 28. Security modules 22 and 24 serve to encrypt and decrypt data information transferred on data transmission line 26. The encryption/decryption algorithm utilized, such as the Data Encryption Standard (DES) specified in Federal Information Processing Standards Publication, Jan. 15, 1977, FIPS PUB 46, National Bureau of Standards, or the like, requires a cipher key or keys. It is important to recognize that in such security systems the algorithm is publicly known and only the cipher key or keys provides security. If the cipher key or keys becomes known to an unauthorized person, data security is breached.

The key management system of the invention provides a high degree of security for the cipher key(s) and thereby for the data transmission system.

CIPHER KEY GENERATOR

Key generator 32 (FIG. 1) provides the necessary hardware for generating cipher key(s) with a high degree of security. It is a stand-alone unit which may be placed in any convenient off-line location in the system. It may appear as shown in FIG. 2. Keyboard 40 is used to enter necessary operator information to key generator 32. Each protected line 26 (FIG. 1) in the data transmission network has an associated unit number and address under which encrypted keys are stored and identified in key generator 32 non-volatile semiconductor memory. Key generator 32 permits an operator to designate from keypad 40 which cipher keys shall be generated for which units, but the keys themselves are produced indirectly by keyboard operation. The keys are produced automatically and randomly by key generator 32 and stored therein in control memory, inaccessible to the outside would except by special provisions, as follows:

A hard copy listing of keys is available from key generator 32 by means of printer 38 which has access to the key generator memory via a rear connector. The use of such a list must be carefully guarded in order to protect the system security, however. In the preferred embodiment of the invention, protection of key word generator 32 contents is provided by dual lock 42, 44 front panel access and, of course, by the secure treatment of key generator 32 module. Key generator 32 keyboard 40 may be used to instruct hard copy output, when that output is desirable.

The operation of key generator 32 may best be understood by reference to FIG. 3, a block diagram of the preferred embodiment of key generator 32. Read only memory (ROM) 50 contains a predetermined program for key generator 32. The key generator program samples eight random numbers (bytes) of 7 bits in length each from pseudo random noise (PN) generator 52 every time a key on keypad 54 is depressed (a total of nine times) and stores them in program buffer 56 for use in the pseudo random noise generator (PRNG) program. The listing does not include the reading and storing of the random numbers (RN) in memory.

The polynomials on which the program works are:

$$P_{31} = X^{31} + X^3 + 1, \quad (1)$$

and $$P_{32} = X^{32} + X^{22} + X^2 + X^1 + 1 \quad (2)$$

where $X = 2$ (Mod 2).

These polynomials are primitive and irreducible (yielding the longest possible pseudo-random sequences). They are combined in the program in the following way:

PMEM is a buffer of eight bytes in length which stores and shifts 64 bits called and replaced several places in the program. Program buffer 56 is really a register of 64 bits in length and can be visualized as 2 shift registers, one 31 bits and one 32 bits, with an extra bit which contains the output of bit 31 on each shift cycle, with exclusive OR gates only at the outputs where exponents appear, as shown in polynomials (1) and (2), above.

The algorithm basically produces a PN sequence of traveling 1's and 0's, shifted from left to right in FIG. 3. When the algorithm is finished once through, the final PN resides in program buffer 56 ready for output to data security device (DSD) 58 chip. DSD 58 is fully described in copending U.S. patent application Ser. No. 914,831 filed on June 6, 1978 by Leland L. Moy and Robert F. Pfeifer.

Listed below are the steps taken, according to one embodiment of the system of the invention, to use DSD 58 to randomize key words:

(1) Load 9 bytes of seed memory into program buffer 56 from 7-bit PN generator whenever a key of keypad 54 is depressed.

(2) Call pseudo random noise generator program to generate PN.
(3) Correct PN for parity ($PN_P$).
(4) Load PN in DSD 58 major key register.
(5) Call pseudo random noise generator program to get a new PN.
(6) Load new PN into DSD 58 data register.
(7) Enable DSD encryption.
(8) Read new data and correct parity.
(9) For next eight byte PN code, repeat steps 2 through 9.

Once the above process is complete, the data in program buffer 56 is the new PN to be used in the system of the invention.

Figure 4:
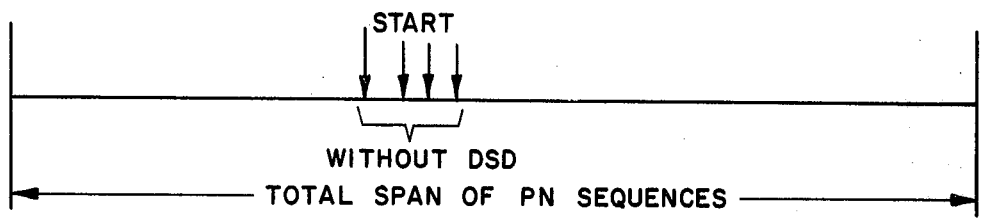
FIG. 4 is a diagram showing initial distribution of the pseudo-noise (PN) hardware generated word sequence in the key generator of the invention.
Figure 5:
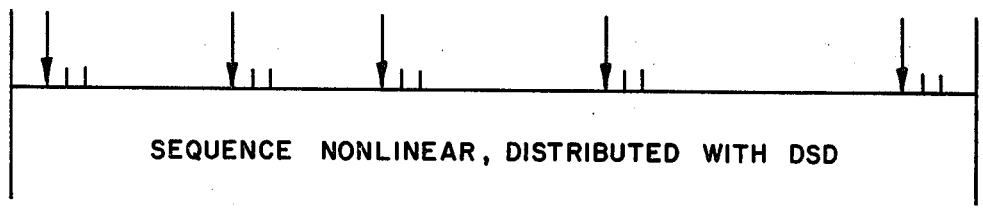
FIG. 5 is a diagram showing non-linear distribution of the PN word sequence of FIG. 4 after processing in a data security device chip of the invention.

PN generator 52 is sampled the first nine times an operator strikes key pad 54, nine random events, and the remainder of the keys are generated from that initial PN and then further randomized by the algorithm of DSD 58, see FIGS. 4 and 5 for the effect of this further randomization.

The data input procedures for key generator 32 of the preferred embodiment of the invention is set out below. Of course, other hardware and procedures may be utilized as will be clearly understood by one skilled in the art.

Key generator 32, FIG. 1, prompts the user for the data it requires at each input step. Each prompt consists of a hexidecimal character ($\phi$—F) followed by a decimal point. The prompts are:

| Prompt | Description |
|---|---|
| 0. | Operation: |
| 1. | 1st Half of Key: |
| 2. | 2nd Half of Key: |
| 5. | Edit: |
| 8. | Unload Counter |
| A. | Access Code: |
| C. | Channel: |
| D. | Device: |
| E. | Error: |
| F. | Function: |

The prompts are displayed on keyboard panel 40 of key generator 32 (see FIG. 2) prior to each required keyboard input. A detailed description of the data entry and error correction input procedures required for each of the prompts $\phi$—F is given below.

Prompt $\phi$

Description:
Up to 16 operation codes may be input following a $\phi$ prompt. These codes identify the operation to be performed by the key generator.
Valid Data:
Any of the following two digit codes can be used.

| OPERATION NO. | DESCRIPTION |
|---|---|
| | "IMMEDIATE" OPERATIONS |
| 00 | Test Key Generator Memory (Destroys Contents) |
| 01 | Delete All Keys |
| 02 | Clear Key Generator Memory |
| 03 | Generate Random Keys For All Blocks |
| 04 | Test Keyloader Memory |
| 05 | Use Typewriter Terminal For I/O |
| 06 | Use Keypad & LED Display For I/O |
| 07 | Print all Stored Keys to Typewriter Terminal |

| OPERATION NO. | DESCRIPTION |
|---|---|
| 08 | Print System Description (No Keys) to Terminal |
| | "PROMPT SEQUENCE" OPERATIONS |
| 11 | Delete Specified Keys From Storage |
| 12 | Delete Specified Blocks from Storage |
| 13 | Generate Random Keys For Specified Blocks |
| 14 | Enter Key Manually |
| 15 | Display Keyloader Unload Counter (One at a Time) |
| 16 | Load Keyloader With Specified Keys |
| 17 | Print Specified Blocks to Typewriter Terminal |

All other values are invalid. The following operations may be "AND"ed together: 03, 05, 13, 17.

Valid Functions:
AND, ENTER, SCAN, FWD, REV

Input Procedure:
When the system is started up, two LEDs LIP 46 and KLP 48 on the front panel will go on for a short period of time. When they go out, the user presses the "CLR" key and the "$\phi$" prompt will appear. The user may then enter a two digit operation code followed by pressing the "AND" or "ENTER" key. The "AND" key is valid for only the operations 03, 05, 13 and 17. For a string of data "AND"ed together, the last input is followed by an ENTER. This indicates the end of the string. If no errors occur, the program will proceed to the next prompt.

Error Conditions:
An error occurs when an invalid operation code is input. This prompt is 04.

Error Recovery:
The only recovery from an 04 error comprises pressing the CLR key twice. This clears all data currently input and allows the user to start inputting data again.

PROMPT 1 (2): (The words in parenthesis, below, refer to prompt (2).)

Description:
The first (second) half, 8 digits, of the hand-loaded key is input following a 1(2) prompt.

Valid Data:
Any combination of 8 hexadecimal digits is valid for this prompt.

Valid Functions:
ENTER, REV, SCAN, FWD

Input Procedure:
The user inputs the 8 digit key value following a 1(2) prompt. The data is entered when the user presses the "ENTER" key. If the user wishes to change the data, he/she must press the scan key so that the data reappears. The display is cleared by pressing the "CLR" key; then new data is entered by pressing the "ENTER" key.

Error Conditions:
None

PROMPT 5:
Description:
The "5" prompt is the last prompt to appear on keypad 40. Data for all other necessary prompts has been entered and the program is awaiting a go-ahead command from the user. The user may backstep to check that data has been entered. Once the user is sure that the data which has been input is correct, he/she may press the "ENTER" key to begin execution of instructions. When the key generator has completed executing the instructions, the "0" prompt will reappear. The key generator is then ready for new instructions.

Valid Data:
None

Valid Functions:
ENTER, REV

Input Procedure:
The user can press either "ENTER" or "REV" when the "5" prompt appears. All other keys are ignored. The "REV" key allows scanning of preceding data and any necessary editing. All data which has been input will be processed when the "ENTER" key is pressed.

Error Conditions:
After "ENT" has been pressed, several error conditions may occur:

E:01:
Memory exceeded—the system created by the user's command is too large to be contained in the key generator memory.

E:08:
Keyloader memory test failure.

E:09:
Duplicate key entered.

E:10:
"ALL" invalid for OP15.

E:0A:
Memory self-test failure.

E:0B:
DSD self-test failure.

PROMPT 8:
Description:
At prompt "8", the user inputs the one digit unload counter. This indicates the maximum number of times that information can be transferred from hand held key loader 34 to network security modules such as 22 or 24.

Valid Data:
Any digit 1—"F" can be used. An input of $\phi$(zero) will be ignored.

Valid Functions:
ENTER, FWD, REV, SCAN

Input Procedure:
The user types in one digit following the "8" prompt and then presses the "ENTER" key. The user can change this value when scanning by pressing "CLR", the new data value, and then ENTER.

Error Conditions:
None

PROMPT A:
Description:
Prompt "A" allows the user to input the access code or the user may scan all stored access codes.

Valid Data:
Any two digits may be used except $\phi\phi$ (zero). An input of zero will be ignored.

Valid Functions:
ENTER, FWD, REV, SCAN

Input Procedure:
If the user wishes to scan all stored access codes, the "SCAN" key may be pressed when the "A" prompt appears. To enter data, the user types in two digits following the "A" prompts, then presses the "ENTER" key. Entered data may be changed when the user is scanning by pressing "CLR", the new data value, and then "ENTER".

Error Conditions:
None

PROMPT C:

Description:

At prompt "C" the user may input up to ten, one digit channel numbers. These are stored for later processing. While scanning data to check for errors, the user may delete or replace data.

Valid Data:

Any one-digit input is accepted as valid data ($\phi$-F).

Valid Functions:

AND, THRU, ALL, ENTER, FWD, REV, SCAN

Input Procedure:

The user keys in a one-digit channel number and follows it with an "AND", a "THRU", or an "ENTER". An "AND" allows additional entries to follow. A "THRU" requires a second entry so that a range of channel numbers is described (e.g., 7 "THRU" 9 means 7, 8 and 9). "ENTER" following a sequence and "AND" and "THRU" entries, terminates the sequence and brings up the next prompt.

The user may, instead of the above press the "ALL" key followed by "ENTER". Immediately after "ALL" is pressed, the display will show "C.0 F" representing zero thru "F" (all possible values). After "ENTER" is pressed, the next prompt will appear in the display. The "ALL" entry is only valid if the system currently described in key generator 32 memory 50 (FIG. 3) contains one or more blocks with the same access code as that entered under prompt "A". "ALL" has precedence over all other function keys, so if a sequence of data, "AND" and "THRU" keys has been keyed in, then "ALL" and "ENT" are keyed in, the original sequence will be replaced by the "ALL" condition.

Error Condition:

An E.03 is displayed when the final value is smaller than the initial value for a "THRU" entry; e.g.; 7 through An E.02 is displayed if the "ALL" key was pressed but no block with the required access code currently resides in the key generator's memory.

Error Recovery:

Press "REV" to return to the "C". Prompt, then "SCAN" and correct or delete the erroneous data.

Prompt D:

Description:

At this prompt, the user inputs the two digit identification number(s) of some device(s) that is to be the destination of the keys generated. Data input may be a range of values, a single value, or "ALL".

Valid Data:

Any two digit code (00—"FF") is valid input. For a range of values, the first value must be smaller than the final value.

Valid Functions:

THRU, ALL, ENTER, FWD, REV, SCAN, THRU

Input Procedure:

To input a single value, the user presses two digits then "ENTER". A range of values is input by entering two digits, "THRU", two more digits, and "ENTER". When the "ALL" key is pressed the display will be d.00—FF. This is used to indicate that all currently defined devices will be used. The user must then press "ENTER" to get this data input.

Error Conditions:

An "E.03" is displayed when the final value is smaller than or the same as the initial value in inputting a range of codes.

An "E.02" is displayed if the "ALL" key was pressed but no block with the required access code currently resides in the key generator memory.

Error Recovery:

The user must press "REV" to get back to the "D" prompt and then he must input valid data.

Prompt E:

Description:

Prompt "E" is actually an error indicator. The "E" will appear followed by a two digit error code. To recover from most errors, the user must press the "REV" key to back step to the prompt in which the error occurred and then correct the mistake. If an error occurs during prompt "0", the user must strike the "CLEAR" key twice to recover.

| Error Code | Explanation |
| --- | --- |
| E.01 | Key Generator Memory Exceeded |
| E.02 | System Undefined |
| E.03 | Invalid Range |
| E.04 | Invalid "Operation" |
| E.05 | Invalid "And" |
| E.06 | Too Many Data Entries |
| E.07 | Parity Error |
| E.08 | Keyloader Memory Fault |
| E.09 | Faulty Key Creation |
| E.0A | Key Generator Memory Fault |
| E.0B | Key Generator DSD Fault |
| E.0C | Program Error Trap |
| E.0D | Invalid Data |
| E.0E | No Such Block In Key Generator |
| E.0F | No Such Block In Key Loader |
| E.10 | "All" Key Invalid In Operation No. 15 |
| E.11 | Keyloader Memory Exceeded |

Valid Data:
None
Valid Functions:
REV
Input Procedure:
None
Error Conditions:
None Prompt F:

Description:

At prompt "F" the user can input up to 10 two-digit function codes. These codes are stored in a queue for later processing. While scanning data to check for errors, the user may clear or replace data.

Valid Data:

Any two digit input (00—"FF") is accepted as valid data.

Valid Functions:

AND, ENTER, FWD, REV, SCAN

Input Procedure:

The user types in two digits and follows them with either an "AND" or an "ENTER". An "AND" links together a series of inputs. The "ENTER" indicates that this is all the data the user whishes to enter. Editing is allowed during scans.

Error Conditions:

None

Figure 6A:
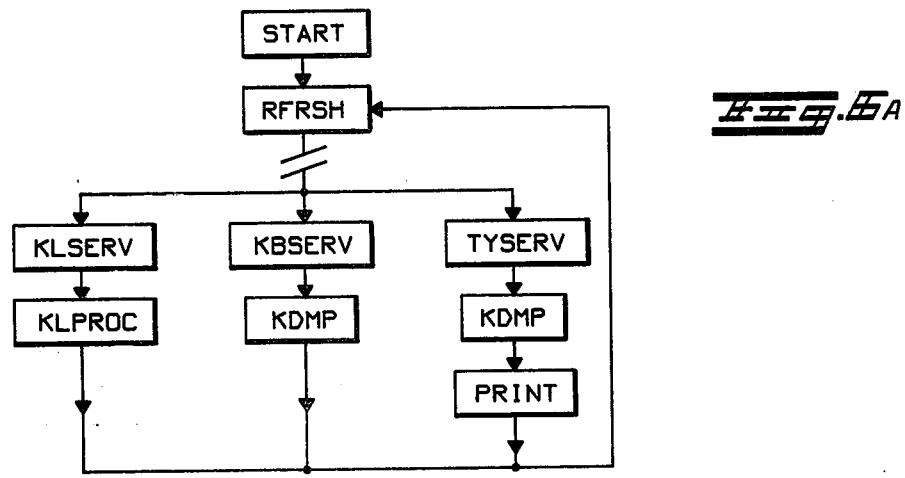
FIGS. 6A and 6B are a general flow diagram of the keyboard entry routine.
Figure 6B:
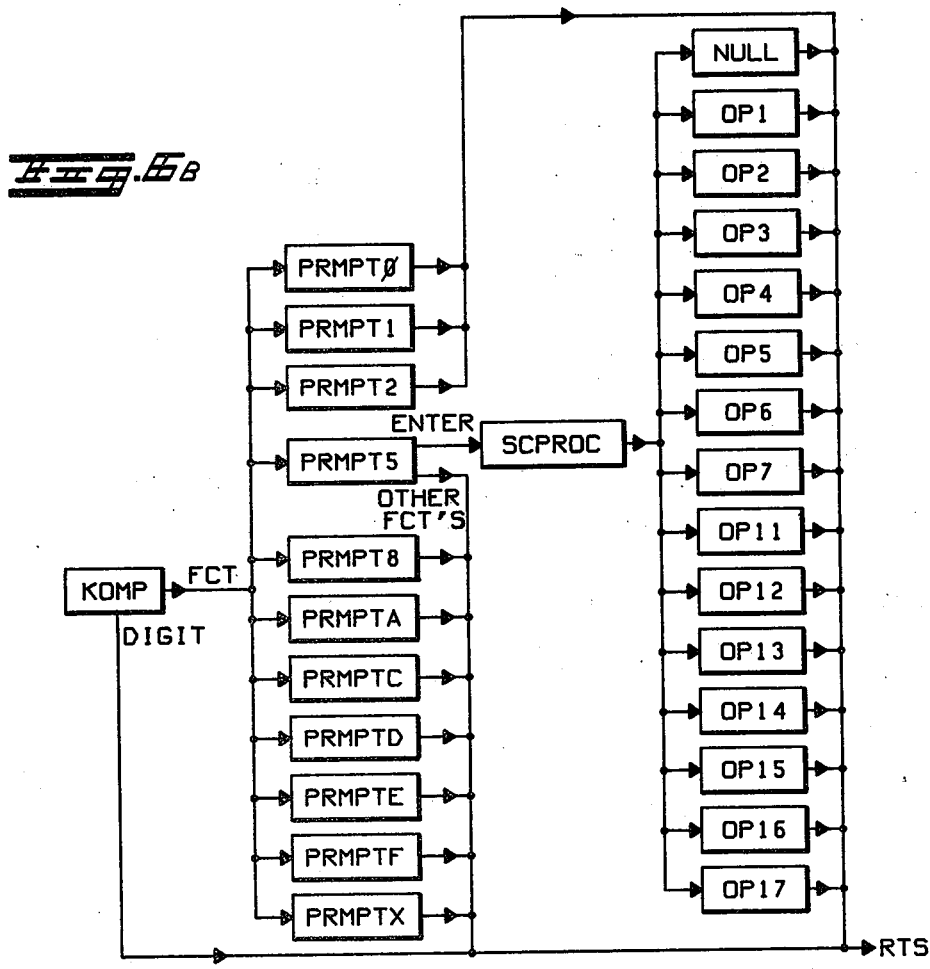

The program residing in key generator 32 memory is described by the flow charts of FIGS. 6, 7 and 8. FIG. 6A and 6B depict the overall structure of the program while IFGS. 7A through 7NN show all of the details. FIG. 8 shows the general data entry/edit scheme. The following notes apply to the flow charts of FIG. 8:

(1) X represents entry of proper number of digits (1 or 2).

(2) This diagram includes all function keys and represents a prompt such as "C". Data entry and edit schemes for other prompts are subsets of this one.

(3) Except for the one case in edit, "CLR" is processed prior to entry into this syntax diagram.

(4) "All"-"ENT" supercedes all prior entries under the current prompt, i.e., it cancels all previous entries under the current prompt and replaces them with "ALL".

(5) In edit:

(a) "AND" and "THRU" are only allowed after a multiple entry ("THRU") is cleared. In such a case:

(1) only 1 "THRU" is allowed for replacing entries; or, (2) only 2 "AND"s (i.e., up to 3 data entries) are allowed, and (3) "THRU"s and "AND"s can not be mixed.

(b) After the last entry is displayed (via "SCAN") and the display is blanked (except for the prompt) data can be appended using "AND" and/or "THRU".

It is important to understand that keys generated by key generator 32 are generated as a function of the time at which 8 bit PN generator 52 (FIG. 3) is unloaded. This is determined by the time at which the operator presses certain of the input keys on keyboard 54. Since the clock frequency feeding 8 bit generator 52 is 4 Mhz, this means that the time interval for each 8 bit dump is 0.25 microsecond, too short for a human to resolve. Under these circumstances, it is not possible for the operator to bias the random nature of his input because of his inability to resolve the very short intervals. The further processing of each of these 8 bit inputs by means of key generator 32 circuits further ensures that there can be no human knowledge of the generated keys. Key generator 12 (FIG. 1) may be constructed so that opening of the case by means of removal of the front panel will destroy the contents of the internal memory. If an attempt is made to gain access by destructive means, security personnel will be able to note the attempt by observation and the keys would then be changed to counter the security breach. The keys are therefore "known" only to the encryption/decryption system, the generator and the keyloader. Even in those applications requiring a hard copy printout by means of printer 38 (FIG. 1), locks 42 and 44 must be operated, possibly with two different lock tumbler patterns involved and other provisions may be made to alert security personnel to every printout, if such is desirable in a given application. Where extreme security measures are warranted, no printout is provided under any condition.

KEY LOADER

Key loader 34, FIG. 1 serves as a transport medium for the keys developed by key generator 32. Dotted line 36 indicates transportation and a local interface between key loader 34 and key generator 32 and between key loader 34 and security module 22 or 24. In the preferred embodiment of the invention, interface 36 is an optical interface. That is, key loader 34 of FIG. 9 contains light source 80 and light sensor 82 which may be mated to their opposites in either key generator 32 or security modules 22, 24 (FIG. 1). In this way, key data may be fed to or from key loader 34 with complete electrical isolation from the mating devices. The physical appearance of key loader 34 is as shown in FIG. 9. Key loader 34 may, for example, contain 256 key words which are loaded from key generator 32. Loading may take place at a 31,500 bit per second rate. Loading of 256 keys therefore occurs in 2.4 seconds. An additional 15 seconds is required for keyloader 34 self test and key generator 32 search time for a total of 17.4 seconds to load 256 keys. Key loader 34 is capable of self-test functions upon command and response is by means of go/no-go LED signal 84 (FIG. 9). Key loader 34 is an intelligent microprocessor-based unit. Keys are stored in a nonvolatile manner in CMOS RAMs maintained by internal battery 86 (FIG. 9). Power is maintained to the memory as long as the case remains intact. If either the front or rear panels are removed, tamper switches (not shown) are deactivated, cutting off power and destroying all memory. If the case integrity of key loader 34 is violated, the damage is apparent to those responsible for security and new keys may be loaded to avoid compromise of key word security. The data blocks loaded in key loader 34 take the form shown in the table of FIG. 10. The first eight bit byte, (0), shown in the table is an access code. This code must match that of one of the security modules into which the key word will ultimately be loaded. The second byte, (1), corresponds to a device number assigned to a security module to be loaded. The next two bytes, (2) and (3), identify the system communication channel number. The fifth byte, (4), identifies a function code, for example, the function code identifies the type of key word present in bytes 6-13 which may be primary, secondary, encrypted secondary, and secondary or encrypted secondary to be down line loaded. The sixth thru thirteenth bytes (5, 6, 7, 8, 9, A, B, C) contain a 64 bit key word as generated by key generator 32 (FIG. 1) and as described above. The fourteenth byte (D) contains a controller address, the fifteenth byte (E) contains a terminal address and the sixteenth byte (F) contains a four bit code N, that determines the number of times that the key word may be loaded into a given security module and a four bit code, M, that is created by keyloader 34 by incrementation each time the key word(s) are loaded into a given security module.

In operation, key loader 34 is filled from key generator 32 and is then transported sequentially to the desired security module(s) 22, 24 in the system. Key loading operations require access to the front panel optical interface of the security module which is revealed after the two mechanical keylocks are opened. (The details are very similar to those of key generator 32, FIG. 2 and thus are not shown separately.) The LED/phototransistor optical interface 80, 82 on the keyloader corresponds to a complementary pair located behind the pull-down front panel of key generator 32 and security module 22, 24, accessible with two key locks 42, 44. The keyloader can store up to 256 keys for approximately 3,000 hours in the unit power down condition. This is made possible by the use of CMOS components. Data is transferred to and from the keyloader at 31,250 bits per second, or one key transfer across the interface point every nine milliseconds. All 256 keys can be transferred in 2.4 seconds plus 15 seconds for key generator and key loader search and self test operations for a total of 17.4 seconds. The CMOS CPU and other components present only a 200 milliamp load to the battery during operation, allowing $3\frac{1}{2}$ to 4 hours of active keyloading with the supplied battery which is rechargeable.

In order to extract keys from keyloader 34, an access code must be selected via code switches that are located on a Key Distribution Interface (not shown) which is located directly behind the front panel of the security module, 22 or 24. Two hexadecimal switches allow eight bits of access code to be presented to the keyloader during transfer of keys. The access code is read by a processor behind the back panel and presented to the keyloader before the keys may be withdrawn. The access code must be selected before operation commences.

The keyloader is aligned for operation by two guide pins 88, 90 located in the security module optical interface cavity. Key transfer operation commences by pressing pushbutton 92 located on the side of keyloader 34, at which time the keyloader will send a wake-up message to the Key Distribution Interface creating an interrupt to the Key Distribution Interface controlling processor. The Key Distribution Interface processor reads the access code and presents it to keyloader 34 in a response message. If keyloader 34 determines that the access code is not identical to the access code previously loaded by key generator 32, the firmware program located inside keyloader 34 eliminates all keys by zeroizing the CMOS memory. If the access code is identical then "key load in progress" lamp 94 lights.

Only one key will be transferred at any one time across the interface until acknowledged. The Key Distribution Interface will stay locked on to the available network security module until all of the keys intended for that security module are loaded. It then retrieves from its log the next available channel determined during the scanning operation, lock onto that channel, and begin transfer as previously described. The Key Distribution Interface will continue until all of the security module channels have been serviced. At that time, it will send a Load Complete signal to the keyloader and operation will cease causing the "keyload in process" indicator on the front panel to extinguish. It should be noted that each key transferred across the interface will normally be cleared from keyloader 34 memory; no keys will remain after they have been loaded.

A control feature set at keyloading from key generator 32 to keyloader 34 allows each key to be given an "unload count" which is the number of times that specific key can be used. Each time that key is unloaded the count is decremented. When the count reaches zero, that key is cleared from key loader 34 and is no longer available.

While the above is addressed to the generation, transportation and use of major cipher keys, the system may also be used for secondary keys. These are cipher keys which would be entered into one of security modules 22, 24 and transported via the communications network to the other. (See FIG. 1.) Communication of a secondary key via the data network 26, for example, is followed by a verification signal in the reverse direction. Upon verification, the new secondary key replaces the old without the necessity of actually transporting key loader module 34 to both sites. The secondary key may be encrypted or not encrypted according to system and security requirements. Of course, the verification procedure may be and would be expected to be used after input of major or primary keys, as well. Flow charts of FIGS. 6, 7 and 8 and the chart of FIG. 10 are illustrative of the details for accomplishing input and verification of both primary and secondary keys in a preferred embodiment of the invention.

While the invention has been particularly shown and described with reference to a preferred embodiment thereof, it will be understood by those skilled in the art that various other modifications and changes may be made to the present invention from the principles of the invention described without departing from the spirit and scope thereof, as encompassed in the accompanying claims. Therefore, it is intended in the appended claims to cover all such equivalent variations as come within the scope of the invention as described.

What is claimed is:

1. In a data encryption/decryption system employing key word security wherein secure data is transferred between at least two security modules, the improvement comprising:

means for generating at least one key word, said generating means being responsive to the times of an operator's switch input to generate said at least one key word; and keyloading means for storing and transporting said at least one key word, said key loading means and said generating means having interfaces thereon for transferring said at least one key word from said generating means to said keyloading means in a form readable only by the system.

2. The system according to claim 1 further comprising:

means for interfacing said keyloading means with at least one of the security modules for transferring said at least one key word from said keyloading means to said at least one of the security modules in a form readable only by the system.

3. The system according to claim 2 further comprising:

means for destroying said at least one key word responsive to an unauthorized attempt to read said at least one key word contained in at least one of said generating means, said keyloading means and said security modules.

4. The system according to claim 2 further comprising:

means for destroying said at least one key word in said keyloading means responsive to said at least one key word being transferred from said keyloading means to a predetermined number of the security modules.

5. The system according to claim 2 wherein said at least one key word comprises at least one primary key and at least one secondary key.

6. The system according to claim 2 wherein said form comprises a predetermined format.

7. An improved method for generating a key word for an encryption/decryption system employing key word security, comprising the steps of:

clocking a pseudo random noise generator register at a rate too high for human resolution;

inputting a plurality of bits in said pseudo random noise generator register responsive to timing of manual switch operations to generate a random number;

operating on said random number with an encryption algorithm to generate the key word; and transferring the key word to a key loading module, the key word being in a form readable only by the encryption/decryption system.

8. The improved method according to claim 7 further comprising the step of:

transferring the key word from said key loading module to at least one encryption/decryption module of said encryption/decryption system, the key word being in a form readable only by the encryption/decryption system.

9. The improved method according to claim 8 further comprising the step of:

destroying the key word in said key loading module after said step of transferring the key word from said key loading module to said at least one encryption/decryption module.

10. The improved method according to claim 8 further comprising the step of:

destroying the key word in any of said modules of the system responsive to an unauthorized structural breach of said any module.

11. The method according to claim 8 wherein said key word comprises at least one primary key and at least one secondary key.

12. The method according to claim 8 wherein said form comprises a predetermined format.

* * * * *